United States Patent
Patil et al.

(10) Patent No.: US 9,936,479 B2
(45) Date of Patent: *Apr. 3, 2018

(54) TRAFFIC ADVERTISEMENT AND SCHEDULING IN A NEIGHBOR AWARE NETWORK DATA LINK

(71) Applicant: QUALCOMM Incorporated, San Diego, CA (US)

(72) Inventors: Abhishek Pramod Patil, San Diego, CA (US); Santosh Paul Abraham, San Diego, CA (US); Alireza Raissinia, Monte Sereno, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

This patent is subject to a terminal disclaimer.

(21) Appl. No.: 14/794,785

(22) Filed: Jul. 8, 2015

(65) Prior Publication Data

US 2016/0014715 A1  Jan. 14, 2016

Related U.S. Application Data

(60) Provisional application No. 62/127,108, filed on Mar. 2, 2015, provisional application No. 62/036,518, filed on (Continued)

(51) Int. Cl.
*H04W 68/00* (2009.01)
*H04L 1/16* (2006.01)
(Continued)

(52) U.S. Cl.
CPC ......... *H04W 68/005* (2013.01); *H04L 1/1607* (2013.01); *H04W 8/005* (2013.01);
(Continued)

(58) Field of Classification Search
CPC ......... H04W 52/0216; H04W 52/0209; H04W 52/0219; H04W 56/001; H04W 68/02;
(Continued)

(56) References Cited

U.S. PATENT DOCUMENTS 6,662,224 B1  12/2003  Angwin et al.
7,573,841 B2  8/2009  Lee et al.
(Continued)

FOREIGN PATENT DOCUMENTS

JP  2008306657 A  12/2008
JP  2008544704 A  12/2008
(Continued)

OTHER PUBLICATIONS

International Search Report and Written Opinion—PCT/US2015/039796—ISA/EPO—Oct. 22, 2015.
(Continued)

*Primary Examiner* — Rina Pancholi
(74) *Attorney, Agent, or Firm* — Toler Law Group, PC

(57) ABSTRACT

A method includes monitoring, at a first electronic device of a data link, a first wireless network during a first paging window corresponding to an active operating mode of electronic devices of the data link. The method also includes receiving, at the first electronic device, a traffic announcement message from a second electronic device of the data link during the first paging window.

56 Claims, 17 Drawing Sheets

Related U.S. Application Data on Aug. 12, 2014, provisional application No. 62/027,175, filed on Jul. 21, 2014, provisional application No. 62/022,615, filed on Jul. 9, 2014.

(51) Int. Cl.
*H04W 74/06* (2009.01)
*H04W 8/00* (2009.01)
*H04W 52/02* (2009.01)

(52) U.S. Cl.
CPC ... *H04W 52/0216* (2013.01); *H04W 52/0219* (2013.01); *H04W 74/06* (2013.01); *Y02B 60/50* (2013.01)

(58) Field of Classification Search
CPC .... H04W 72/0446; H04W 8/005; H04L 67/16
See application file for complete search history.

(56) References Cited

U.S. PATENT DOCUMENTS

| | | | |
|---|---|---|---|
| 8,274,894 B2 | 9/2012 | Kneckt et al. | |
| 8,326,332 B2 | 12/2012 | Collins et al. | |
| 8,660,548 B1 | 2/2014 | Lambert | |
| 2004/0063442 A1 | 4/2004 | Goldberg | |
| 2004/0105401 A1* | 6/2004 | Lee | H04W 52/0216 370/311 |
| 2005/0114262 A1 | 5/2005 | Howard et al. | |
| 2006/0088019 A1 | 4/2006 | Liebsch | |
| 2006/0172747 A1 | 8/2006 | Mohammed | |
| 2006/0193315 A1* | 8/2006 | Sinivaara | H04W 48/10 370/389 |
| 2006/0285528 A1 | 12/2006 | Gao et al. | |
| 2007/0133448 A1 | 6/2007 | Gao et al. | |
| 2007/0242634 A1* | 10/2007 | Calcev | H04W 52/0225 370/318 |
| 2008/0095091 A1 | 4/2008 | Surineni et al. | |
| 2008/0263674 A1* | 10/2008 | Yao | H04L 29/12783 726/26 |
| 2008/0298290 A1 | 12/2008 | Wentink | |
| 2009/0010231 A1 | 1/2009 | Laroia et al. | |
| 2009/0232042 A1* | 9/2009 | Kneckt | H04L 12/12 370/312 |
| 2009/0279449 A1 | 11/2009 | Kneckt et al. | |
| 2009/0320100 A1 | 12/2009 | Kitazoe | |
| 2010/0010899 A1 | 1/2010 | Lambert et al. | |
| 2010/0246502 A1 | 9/2010 | Gong et al. | |
| 2011/0153773 A1 | 6/2011 | Vandwalle et al. | |
| 2011/0158142 A1* | 6/2011 | Gong | H04W 52/54 370/311 |
| 2011/0188421 A1 | 8/2011 | Nakahara et al. | |
| 2012/0182915 A1 | 7/2012 | Wentink | |
| 2013/0094413 A1 | 4/2013 | Turunen et al. | |
| 2013/0122893 A1 | 5/2013 | Turtinen et al. | |
| 2013/0229959 A1 | 9/2013 | Ghosh et al. | |
| 2013/0322297 A1 | 12/2013 | Dominguez | |
| 2013/0346207 A1 | 12/2013 | Qi et al. | |
| 2014/0045422 A1 | 2/2014 | Qi et al. | |
| 2014/0080481 A1 | 3/2014 | Abraham et al. | |
| 2014/0082205 A1 | 3/2014 | Abraham et al. | |
| 2014/0112189 A1 | 4/2014 | Abraham et al. | |
| 2014/0112224 A1 | 4/2014 | Jafarian et al. | |
| 2014/0153444 A1 | 6/2014 | Zhou et al. | |
| 2014/0161012 A1 | 6/2014 | Zhong et al. | |
| 2014/0254426 A1 | 9/2014 | Abraham et al. | |
| 2014/0254569 A1 | 9/2014 | Abraham et al. | |
| 2015/0319675 A1* | 11/2015 | Park | H04W 48/16 370/338 |
| 2016/0014693 A1 | 1/2016 | Patil et al. | |
| 2016/0014694 A1 | 1/2016 | Patil et al. | |
| 2016/0014714 A1 | 1/2016 | Patil et al. | |
| 2016/0150008 A1 | 5/2016 | Shemar et al. | |

FOREIGN PATENT DOCUMENTS

| | | |
|---|---|---|
| WO | 2007002364 A2 | 1/2007 |
| WO | 2013155992 A1 | 10/2013 |
| WO | 2015057982 A1 | 4/2015 |

OTHER PUBLICATIONS

International Search Report and Written Opinion—PCT/US2015/039799—ISA/EPO—Oct. 23, 2015.
International Search Report and Written Opinion—PCT/US2015/039803—ISA/EPO—Oct. 14, 2015.
International Search Report and Written Opinion—PCT/US2015/039805—ISA/EPO—Oct. 23, 2015.
Lambert, P.A. (Marvell) "Service Discovery Proposal", 11-13/0893 r00, Jul. 2013, pp. 1-13, [retrieved on Jul. 18, 2013].
Henry J., "802.11 Mesh Networking", Certified Wireless Netowrk Professional Whitepaper, Nov. 2011.

* cited by examiner

800 ➤

Service Attribute 810

| Field | Size (octets) | Value | Description |
|---|---|---|---|
| Attribute ID | 1 | 0x0A | Identifies the type of NAN attribute |
| Length | 2 | 0x08 | Length of the following fields in the attribute |
| Service ID | 6 | | Contains hash of the service name (e.g., Gaming) |
| Instance ID | 1 | | Identifies an instance of the service (e.g., Chess) |
| Requestor Instance ID | 1 | | |
| Service Control | 1 | | Indicates NAN-DL attribute for service instance NAN-DL group |
| Binding Bitmap | 2 | | |
| Service Info Length | 1 | Variable | |
| Service Info | Variable | Variable | Carries Information regarding service instance (e.g., a chess instance of the gaming service) |

811 — Attribute ID
812 — Length / Service ID
813 — Instance ID
814 — Binding Bitmap
815 — Service Info Length
816 — Service Info NAN-DL Attribute 820

| Field | Size (octets) | Value | Description |
|---|---|---|---|
| Attribute ID | 1 | 221 | Identifies the type of NAN attribute |
| Length | 2 | | Length of the following fields in the attribute |
| OUI | 3 | | Vendor OUI |
| Vendor Attribute Type | 1 | 0x01 | NAN-DL attribute |
| NAN-DL Channel | 1 | 48 | Indicates operating channel of the NAN-DL |
| NAN-DL Control | 2 | | Carries information including PW repetition information |
| NAN-DL Group ID | 0-32 | | Indicates a name of the NAN-DL Group (e.g., Chess group) |

821 — Attribute ID
822 — NAN-DL Channel
823 — NAN-DL Control
824 — NAN-DL Group ID

*FIG. 8*

TRAFFIC ADVERTISEMENT AND SCHEDULING IN A NEIGHBOR AWARE NETWORK DATA LINK

I. CROSS REFERENCE TO RELATED APPLICATIONS

This application claims priority from U.S. Provisional Patent Application No. 62/022,615, filed Jul. 9, 2014 and entitled "TRAFFIC ADVERTISEMENT AND SCHEDULING IN A NEIGHBOR AWARE NETWORK", U.S. Provisional Patent Application No. 62/027,175, filed Jul. 21, 2014 and entitled "TRAFFIC ADVERTISEMENT AND SCHEDULING IN A NEIGHBOR AWARE NETWORK", U.S. Provisional Patent Application No. 62/036,518, filed Aug. 12, 2014 and entitled "TRAFFIC ADVERTISEMENT AND SCHEDULING IN A NEIGHBOR AWARE NETWORK", and U.S. Provisional Patent Application No. 62/127,108, filed Mar. 2, 2015 and entitled "TRAFFIC ADVERTISEMENT AND SCHEDULING IN A NEIGHBOR AWARE NETWORK"; the contents of each of the aforementioned applications are expressly incorporated herein by reference in their entirety.

II. FIELD

The present disclosure is generally related to traffic advertisement and scheduling in a neighbor aware network (NAN).

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Electronic devices, such as wireless telephones, may use wireless connections to access networks in order to transmit and receive data or to exchange information. For example, mobile electronic devices that are in close proximity to each other may form a wireless mesh network to perform data exchanges via the wireless mesh network (e.g., without involving wireless carriers, Wi-Fi access points, and/or the Internet). To enable functionality of the wireless mesh network, a particular wireless network, such as a particular wireless channel of the particular wireless network, may be reserved for transferring data between electronic devices of the wireless mesh network. For example, a first electronic device of the wireless mesh network may share a service, such as a music service, with other electronic devices in the wireless mesh network. For example, the first electronic device may transmit music data to a second electronic device in the wireless mesh network. Because the second electronic device does not know when the first electronic device will transmit the music data, the second electronic device continuously monitors the wireless mesh network for transmissions from the first electronic device. Accordingly, the second electronic device consumes power to monitor the wireless mesh network, even during time periods where the first electronic device is not transmitting data to the second electronic device.

IV. SUMMARY

The present disclosure is directed to systems and methods to enable electronic devices in a data link of a neighbor aware network (NAN) to coordinate times to announce traffic (e.g., data) to be transmitted to other electronic devices in the data link. As referred to herein, a data link, or a data link network, refers to one or more electronic devices that share a time period corresponding to an active operating mode of the electronic devices (e.g., a paging window) and that have common security credentials. For example, a data link may include a wireless mesh network, such as a "social Wi-Fi mesh." The one or more electronic devices of the data link may be a subset of electronic devices in the NAN. By coordinating the times of the announcements between each electronic device in the data link, an electronic device in the data link may be able to transition to the active operating mode during a particular time period to listen for data announcements. If the electronic device determines that the data announcements do not identify the electronic device as a recipient of data during a transmission window, the electronic device may enter a low-power operating mode (e.g., a "sleep mode") until a next time period corresponding to transmission of data announcements.

In the present disclosure, each electronic device in a data link may synchronize an internal clock based on synchronization beacons received from at least one electronic device of the NAN. In some aspects, communications between electronic devices of the NAN may occur via a first wireless channel, which may be referred to as the "NAN channel." Because the internal clock of each electronic device in the data link is synchronized, each electronic device may determine a common time period to transition to an active operating mode and listen for an indication of traffic (e.g., a data announcement). In a particular aspect, the data link may be a "multi-hop" data link, and the indication of traffic may be a traffic announcement message. In this aspect, the traffic announcement message may be transmitted from a first electronic device of the data link to other electronic devices of the data link during a paging window that is reserved for data transmissions between electronic devices of the data link. In some aspects, communications between electronic devices of the data link may occur via a second wireless channel, which may be referred to as a "data link channel." In another particular aspect, the data link may be a "single-hop" data link, and the indication of traffic may be a traffic announcement message. In this aspect, the traffic announcement message may be transmitted via the NAN channel during a paging window. In another particular aspect, the data link may be a single-hop data link, and the indication of traffic may be included in a service response filter (SRF) field of a service descriptor attribute included in a service discovery frame (SDF). In this aspect, the service discovery frame may be transmitted via the NAN channel during a discovery window of the NAN. In each of these aspects, a type of the indication of traffic may be identified by one or more bits of a data link control field of a data link attribute included in a SDF.

To illustrate, the first electronic device may transmit an indication of traffic to electronic devices of the data link other than the first electronic device. The indication of traffic may identify one or more electronic devices as recipients of data from the first electronic device during a transmission window. When the second electronic device receives the indication of traffic (e.g., the traffic announcement message or the SDF), the second electronic device may determine whether the indication of traffic identifies the second electronic device as a recipient of data from the first electronic device. In particular aspects, the recipients of the data may be identified or indicated by a traffic indication map or by a Bloom filter included in the traffic announcement message or the SDF. In response to determining that the second electronic device is not identified as the recipient, the second electronic device may transition to the low-power operating mode during the transmission window. In response to determining that the second electronic device is identified as the recipient, the second electronic device may remain in an active operating mode and may monitor the second wireless network (e.g., the data link network) for data transmissions from the first electronic device during the transmission window.

To reduce a likelihood that the first electronic device transmits data when the second electronic device is unable to receive the data, the second electronic device may be configured to transmit an acknowledgement to the first electronic device in response to determining that the second electronic device is identified as the recipient. The first electronic device may send the data to the second electronic device in response to receiving the acknowledgement. In a particular aspect, the acknowledgement may serve as, represent, and/or be interpreted as a power-save poll (PS-POLL) frame. In another particular aspect, the acknowledgement may be a quality of service null (QoS_NULL) frame. In some implementations, the QoS_NULL frame indicates a reverse direction grant (RDG) from the second electronic device to the first electronic device. For example, one or more bits of the QoS_NULL frame may indicate that the first electronic device may send data to the second electronic device during a transmit opportunity of the second electronic device. To illustrate, the first electronic device may transmit data without contending for a wireless communication medium. In other implementations, the QoS_NULL frame may not indicate a RDG. In another particular aspect, after transmitting the indication of traffic, the first electronic device may transmit a null frame to the second electronic device. The second electronic device may transmit an acknowledgement (ACK) frame to the first electronic device responsive to receiving the null frame.

In a particular aspect, a method includes monitoring, at a first electronic device of a data link, a first wireless network during a first paging window corresponding to an active operating mode of electronic devices of the data link. The method further includes receiving, at the first electronic device, a traffic announcement message from a second electronic device of the data link during the first paging window.

In another particular aspect, an apparatus includes a processor and a memory coupled to the processor. The memory may store instructions executable by the processor to perform operations including monitoring, at a first electronic device of a data link, a first wireless network during a first paging window corresponding to an active operating mode of electronic devices of the data link. The operations further include receiving, at the first electronic device, a traffic announcement message from a second electronic device of the data link during the first paging window.

In another particular aspect, an apparatus includes means for monitoring, at a first electronic device of a data link, a wireless network during a paging window corresponding to an active operating mode of electronic devices of the data link. The apparatus further includes means for receiving, at the first electronic device, a traffic announcement message from a second electronic device of the data link during the paging window.

In another particular aspect, a non-transitory computer readable medium may store instructions that, when executed by a processor, cause the processor to monitor, at a first electronic device of a data link, a wireless network during a paging window corresponding to an active operating mode of electronic devices of the data link. The instructions may further cause the processor to receive, at the first electronic device, a traffic announcement message from a second electronic device of the data link during the paging window.

One advantage provided by the disclosure is a reduction in power consumption at one or more electronic devices of the data link. Because the internal clocks of the electronic devices of the data link are synchronized based on synchronization from the NAN, each electronic device of the data link may determine a particular time period to transition to the active operating mode and to monitor a wireless network for indications of traffic. If a particular electronic device is not identified as a recipient of data in the indications of traffic, the particular electronic device may reduce power consumption by transitioning to the low-power operating mode during the transmission window or may perform operations corresponding to other data links or other networks during the transmission window.

Other aspects, advantages, and features of the present disclosure will become apparent after a review of the entire application, including the following sections: Brief Description of the Drawings, Detailed Description, and the Claims.

V. BRIEF DESCRIPTION OF THE DRAWINGS

FIG. 8 is a diagram illustrating examples of a service attribute and a NAN-DL attribute;

VI. DETAILED DESCRIPTION

Particular implementations of the present disclosure are described below with reference to the drawings. In the description, common features are designated by common reference numbers throughout the drawings.

Figure 1:
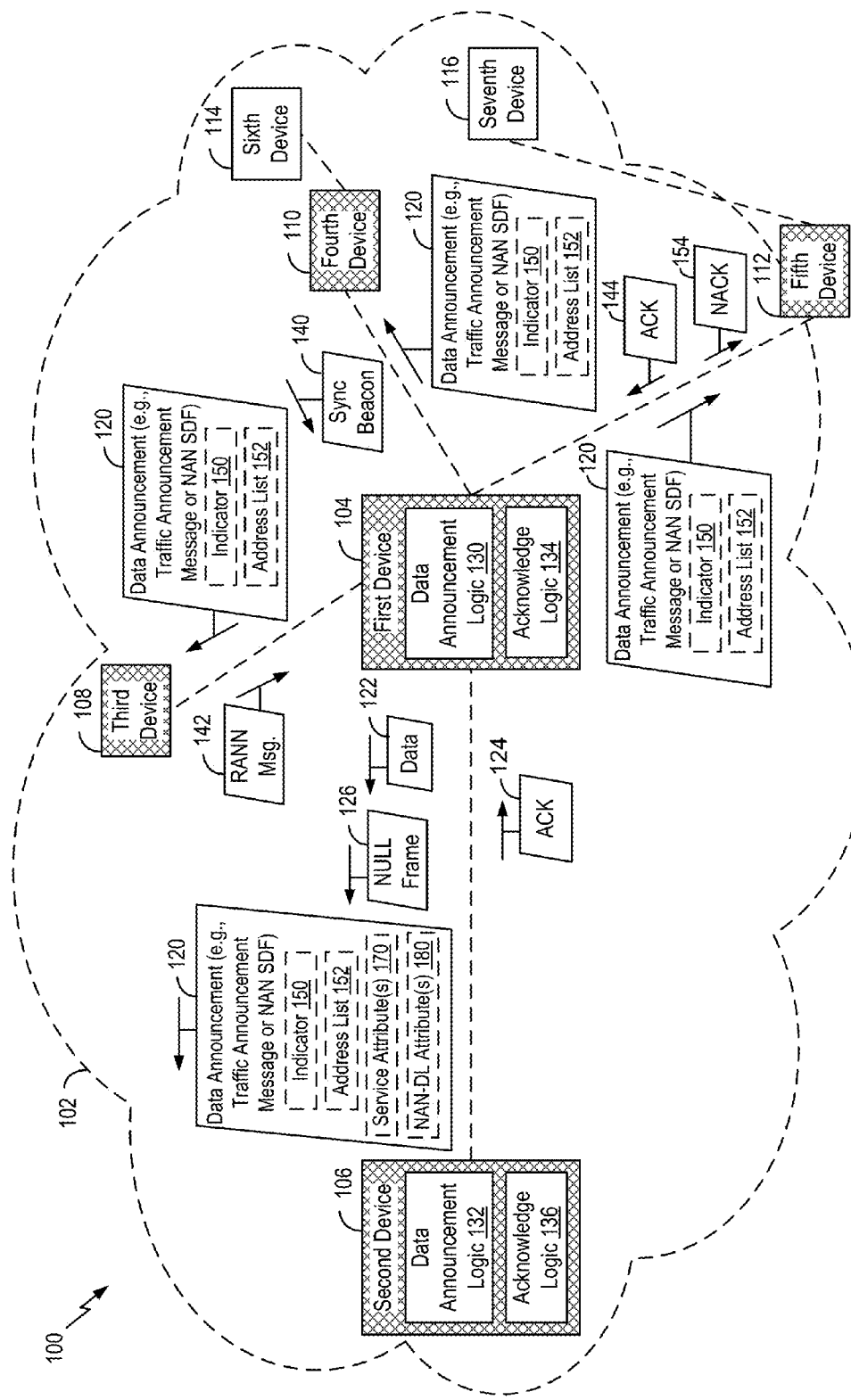
FIG. 1 is a diagram of a system that includes a neighbor aware network (NAN) that includes one or more electronic devices included in one or more data links.

Referring to FIG. 1, a system 100 that includes a neighbor aware network (NAN) 102 is shown. The NAN 102 includes one or more electronic devices 104-116 configured to perform data exchanges via wireless communications between the electronic devices 104-116. The data exchanges may be performed without involving wireless carriers, wireless fidelity (wi-fi) access points, and/or the Internet. For example, the NAN 102 may include a first electronic device 104, a second electronic device 106, a third electronic device 108, a fourth electronic device 110, a fifth electronic device 112, a sixth electronic device 114, and a seventh electronic device 116. The system 100 is illustrated for convenience only and is not limiting. For example, in other implementations the system 100 may include more electronic devices or fewer electronic devices than illustrated in FIG. 1, and the electronic devices may be located at different locations than illustrated in FIG. 1.

One or more of the electronic devices 104-116 may also be included in one or more "data links." A data link may also be referred to as a data link network, a group network, a NAN data link (NDL) network, a data path group, a data path group network, or a NAN data path group network. In some implementations, the data link may include a mesh network, such as a "social Wi-Fi mesh network," as an illustrative, non-limiting example. The data link may include multiple devices that are able to form a network, such as a decentralized wireless network. Additionally, each device of the data link may share a type of data announcement and may use shared security credentials. For example, security information, such as group keys or common network keys, may be shared between the electronic devices in the data link using wireless communication that is in band or out of band with respect to one or more group communication channels of the data link. In some implementations, the devices of the data link may be synchronized to have periodic wake-up times, such as time periods when each of the devices is awake to advertise a service and/or to receive traffic or other messages. Each data link may correspond to a service provided by one or more of the electronic devices 104-116, such as a music service, a social media sharing service, a file sharing service, a data sharing service, and/or other services. The electronic devices included in a data link may be a subset of the electronic devices in the NAN 102. For example, a particular data link may include the electronic devices 104-112 and not the electronic devices 114 and 116.

The electronic devices 104-116 may be configured to offer a service to other members of a data link. For example, in FIG. 1, the first electronic device 104 may provide a service to other electronic devices of a data link. The data link may be a "single-hop" data link or a "multi-hop" data link, as further described herein. The first electronic device may be configured to transmit a data announcement 120 to the electronic devices 106-112 that are within a "one-hop" range (e.g., within a distance that enables the electronic devices 106-112 to receive wireless communications from the first electronic device 104) if the first electronic device 104 has data 122 to transmit to another electronic device of the data link. The data announcement 120 may be a traffic announcement message or a service discovery frame (SDF), as further described herein. The data announcement 120 may identify a subset of electronic devices as recipients of the data 122 from the first electronic device 104.

The electronic devices 106-112 may be configured to receive the data announcement 120 and to determine a corresponding operating mode during a transmission window based on the data announcement 120. For example, the operating mode may be an active operating mode or a low-power operating mode based on whether the electronic devices 106-112 are identified as recipients. Devices identified as recipients are included in the subset of electronic devices. An electronic device that is identified as a recipient (e.g., the second electronic device 106) may be configured to send an acknowledgement (ACK) 124 in response to the data announcement. In some implementations, the acknowledgement 124 may include or may correspond to a power save poll (PS-POLL) message or a quality of service null (QoS_NULL) frame, as further described herein. In some implementations, the QoS_NULL frame may indicate a reverse direction grant (RDG). In other implementations, the QoS_NULL frame does not indicate an RDG. In another implementation, the acknowledgement 124 may be an ACK frame, and the acknowledgement 124 may be sent in response to a NULL frame 126 received from the first electronic device 104 after the data announcement 120, as further described herein. The first electronic device 104 may be further configured to transmit the data 122 in response to receiving the acknowledgement 124. Although the first electronic device 104 has been described as the provider of the service, in other implementations, any of the electronic devices 104-116 may provide the service and transmit the data announcement 120 to other electronic devices within a one-hop range.

Each of the electronic devices 104-116 may be a fixed electronic device or a mobile electronic device. For example, the electronic devices 104-116 may include or correspond to mobile phones, laptop computers, tablet computers, multimedia devices, peripheral devices, data storage devices, or a combination thereof. Additionally or alternatively, each of the electronic devices 104-116 may include a processor, such as a central processing unit (CPU), a digital signal processor (DSP), a network processing unit (NPU), etc., a memory, such as a random access memory (RAM), a read-only memory (ROM), etc., and a wireless interface configured to send and receive data via one or more wireless networks or wireless communication channels, as further described with reference to FIG. 22. The wireless interface may interface with a wireless receiver and a wireless transmitter. Although certain operations described herein may be described with reference to a "receiver" or a "transmitter," in other implementations a transceiver may perform both data receiving and data transmitting operations. The first electronic device 104 may include data announcement logic 130 and acknowledge logic 134, and the second electronic device 106 may include data announcement logic 132 and acknowledge logic 136. The data announcement logics 130, 132 may correspond to data announcement logic 2264 of FIG. 22, and the acknowledge logics 134, 136 may correspond to the acknowledge logic 2266 of FIG. 22. The illustration in FIG. 1 is for convenience only, and each of the electronic devices 108-116 may include corresponding data announcement logic and acknowledge logic.

The electronic devices 104-116 may exchange data and/or services via one or more wireless networks. As used herein, a transmission "via" a wireless network may include, but is not limited to, a "point-to-point" transmission between two electronic devices of the wireless network. As another example, a transmission via the wireless network may include a communication that is "broadcast" (e.g., transmitted) from a particular electronic device of the wireless network to multiple other electronic devices of the wireless network. As used herein, the electronic devices 104-116 may be configured to operate in accordance with one or more wireless protocols and/or standards, such as an Institute of Electrical and Electronics Engineers (IEEE) 802.11 standard. For example, the electronic devices 104-116 may operate in accordance with an IEEE 802.11a, b, g, n, s, aa, ac, ad, ae, af, or mc standard. Additionally, the electronic devices 104-116 may operate in accordance with one or more NAN standards or protocols. Additionally, one or more of the electronic devices 104-116 may be configured to communicate with a cellular network via one or more cellular communication protocols and/or standards, such as a code division multiple access (CDMA) protocol, an orthogonal frequency division multiplexing (OFDM) protocol, an orthogonal frequency division multiple access (OFDMA) protocol, a time division multiple access (TDMA) protocol, a space division multiple access (SDMA) protocol, etc. Additionally, one or more of the electronic devices 104-116 may be configured to operate in accordance with one or more near-field communications standards, such as a Bluetooth standard. Additionally, one or more of the electronic devices 104-116 may exchange data via infrared or other near-field communications.

Each of the electronic devices 104-116 may enter and exit the NAN 102 at various times during operation. For example, an electronic device that is not within the NAN 102 may detect a discovery beacon and may associate with the NAN 102 during a discovery window identified by the discovery beacon, in accordance with a NAN standard or protocol. Additionally, the electronic devices 104-116 may disassociate from the NAN 102 at any time. While within the NAN 102, the electronic devices 104-116 may be configured to transmit or to receive service discovery frames (SDFs) that advertise a service provided by at least one electronic device of the NAN 102. Additionally, while within the NAN 102, the electronic devices 104-116 may be configured to transmit or to receive synchronization beacons to or from one or more electronic devices of the NAN 102. A synchronization beacon may indicate synchronization information and may be formed in accordance with one or more NAN standards or protocols. Each of the electronic devices 104-116 may be configured to synchronize a respective internal clock based on the synchronization beacons. For example, the internal clock may be included in timing circuitry of the data announcement logic 130, 132. The synchronization beacons may be retransmitted (e.g., rebroadcast) by some of the electronic devices 104-116 within the NAN 102, in accordance with a NAN standard or protocol, to enable the synchronization beacons to reach electronic devices that are beyond a wireless communication range of the electronic device that transmits the synchronization beacon. In a particular implementation, the synchronization beacons may be transmitted between electronic devices of the NAN 102 via a first wireless channel, such as a "NAN channel." As used referred to herein, a "NAN channel" is a particular wireless channel that is reserved for electronic devices to perform NAN discovery operations and NAN synchronization operations. As used herein, the "NAN channel" corresponds to the NAN 102, and communications in the NAN 102 may be performed via the NAN channel.

As described above, in addition to being included in the NAN 102, one or more of the electronic devices 104-116 may be included in one or more data links. A data link may correspond to a service provided by one of the electronic devices 104-116. For example, in FIG. 1, the first electronic device 104 may provide a service to other electronic devices in a data link. The service may be a music service, a social media or message sharing service, etc. As another example, the first electronic device 104 may be part of another network, such as an access point (AP) based network or an independent basic service set (IBSS) network, and the first electronic device 104 may be configured to advertise the other network to enable other electronic devices of the NAN 102 to join the other network via the first electronic device 104.

The data links may include "single-hop" data links or "multi-hop" data links. A single-hop data link may include one or more electronic devices that are within a wireless communication range (e.g., distance) of a provider. A provider may be an electronic device that provides a service to electronic devices of a data link. A multi-hop data link may include one or more electronic devices that are outside a wireless communication range of the provider. In the multi-hop data link, at least one electronic device may receive a message (including data) from the provider and may rebroadcast the message to another electronic device that outside of the wireless communication range of the provider. In a particular implementation, the data link may be a multi-hop data link that includes the electronic devices 104-116. In this implementation, wireless communications from the first electronic device 104 to the sixth electronic device 114 or to the seventh electronic device 116 may be routed by the fourth electronic device 110 or the fifth electronic device 112, respectively. In another particular implementation, the data link may be a single-hop data link that includes the electronic devices 104-112. The sixth electronic device 114 and the seventh electronic device 116 may not be included in the single-hop data link because the sixth electronic device 114 and the seventh electronic device 116 are not within a wireless communication range of the first electronic device 104.

If the first electronic device 104 is configured to provide a service, such as by operating as a provider of the service, the first electronic device 104 may transmit data to other electronic devices of the data link. For example, to share a music service, the first electronic device 104 may transmit music data to another electronic device in the data link. As another example, to share a social media service, the first electronic device 104 may transmit text data, image data, video data, or a combination thereof, to another electronic device in the data link. In a particular implementation, the data may be transmitted between electronic devices of the data link via a second wireless channel, such as a "data link" channel. As used herein, a "data link channel" is a particular wireless channel that is reserved for electronic devices in a corresponding data link to communicate data corresponding to sharing a service. Additionally, the data link channel may be used for sharing security information, for performing association operations, and for performing routing operations (in multi-hop data links). In some implementations, the data link channel and the NAN channel may be different wireless channels that correspond to different wireless frequency bands. In a particular implementation, the NAN channel may be a 2.4 gigahertz (GHz) channel, and the data link channel may be a 5 GHz channel. In particular implementations, the data link channel and the NAN channel may be the same wireless channel. For example, one or more of the electronic devices 104-116 may share data with the data link via the NAN 102 (e.g., via the NAN channel). In some implementations, the NAN 102 may include multiple data links, and each of the multiple data links may correspond to a distinct data link channel. The multiple data links may correspond to different services provided by different electronic devices in the NAN 102. In other implementations, electronic devices of the multiple data links may share data via the NAN 102.

During operation, one of the electronic devices of the NAN 102 may generate and transmit a synchronization (sync) beacon 140 in accordance with a NAN standard or protocol. For example, the fourth electronic device 110 may transmit the synchronization beacon 140 via the NAN channel. Although illustrated in FIG. 1 as being transmitted to the first electronic device 104, this illustration is for convenience only, and the synchronization beacon 140 may be transmitted to any electronic device within a one-hop range of the fourth electronic device 110, and may be retransmit such that the synchronization beacon 140 propagates throughout the NAN 102. Each of the electronic devices 104-116 may receive the synchronization beacon 140 and may perform synchronization operations based on the synchronization beacon 140. For example, the first electronic device 104 may synchronize timing circuitry, such as an internal clock, included in the data announcement logic 130 based on the synchronization beacon 140, and the second electronic device 106 may synchronize timing circuitry included in the data announcement logic 132 based on the synchronization beacon 140

After performing the synchronization operations, the first electronic device 104 may begin operating as a provider of a service to electronic devices of a data link. If the first electronic device 104 has the data 122 to transmit to other electronic devices in the data link, the first electronic device 104 may generate the data announcement 120, via the data announcement logic 130. The data announcement 120 may identify a subset of electronic devices as recipients of the data 122 from the first electronic device 104. For example, the data announcement 120 may identify the second electronic device 106 as the recipient of the data 122. In some implementations, the data announcement 120 includes a recipient type indicator 150 and an address list 152 that identifies and/or indicates recipients of the data 122. In these implementations, the address list 152 may be represented by a traffic indication map or by a Bloom filter, as further described herein. In other examples, any of the electronic devices 108-112 may be identified as recipients of the data 122 in the data announcement 120. In some implementations, the data announcement 120 may also include one or more service attributes 170, as further described with reference to FIGS. 7-10. The data announcement 120 may further include one or more NAN-data link (DL) attributes 180. An indicator in the one or more service attributes 170 may identify one or more of the NAN-DL attributes 180. A single data announcement 120 in FIG. 1 is illustrated as including the one or more service attributes 170 and the one or more NAN-DL attributes 180 for convenience; however, each of the data announcements 120 in FIG. 1 may include the one or more service attributes 170 and the one or more NAN-DL attributes 180.

The first electronic device 104 may determine a particular time period (a paging window), via the data announcement logic 130, and may transmit the data announcement 120 to the electronic devices 106-112 during the particular time period. The electronic devices 106-112 may determine the particular time period. For example, the second electronic device 106 may determine the particular time period via the data announcement logic 132. Because the data announcement logic 130 and the data announcement logic 132 include timing circuitry that are synchronized based on the synchronization beacon 140, the particular time period determined by the first electronic device 104 may be the same, or substantially similar to, the particular time period determined by the second electronic device 106. The electronic devices 108-112 may determine the particular time period via corresponding data announcement logic, which is not illustrated for convenience. In some implementations, the particular time period (e.g., the paging window) may be determined based on a particular NAN-DL attribute of the one or more NAN-DL attributes 180 that corresponds to an instance of a service provided by the first electronic device 104.

After determining the particular time period, the electronic devices 106-112 may operate in an active operating mode and may receive the data announcement 120 during the particular time period. The electronic devices 108-112 may determine, via the data announcement logic 132 (or data announcement logic corresponding to the electronic devices 108-112) that the data announcement 120 identifies the second electronic device 106 as the recipient of the data 122. In response to determining that the electronic devices 108-112 are not identified by the data announcement 120 as recipients of the data 122, the corresponding data announcement logic of the electronic devices 108-112 may transition the electronic devices 108-112 from the active operating mode to a low-power operating mode, such as a "sleep mode," during a transmission window of the data link. Alternatively, the electronic devices 108-112 may perform operations corresponding to other networks or other data links during the transmission window. In response to determining that the second electronic device 106 is identified as the recipient of the data 122, the data announcement logic 132 of the second electronic device 106 may maintain the second electronic device 106 in an active operating mode during the transmission window.

Additionally, in response to determining that the second electronic device 106 is identified as the recipient of the data 122, the second electronic device 106 may generate the acknowledgement 124 via the acknowledge logic 136. After generating the acknowledgement 124, the second electronic device 106 may transmit the acknowledgement 124 via the data link channel to the first electronic device 104. In some implementations, the first electronic device 104 may generate, via the acknowledge logic 134, the NULL frame 126 and may transmit the null frame 126 to the second electronic device 106 via the data link channel. In this implementation, the second electronic device 106 may transmit the acknowledgement 124 in response to the NULL frame 126. After transmitting the acknowledgement 124, the second electronic device 106 may monitor the data link channel for data transmissions from the first electronic device 104.

The first electronic device 104 may receive the acknowledgement 124, and, via the acknowledge logic 134, determine to transmit the data 122 to the second electronic device 106 in response to receiving the acknowledgement 124. The first electronic device 104 may transmit the data 122 to the second electronic device 106 via the data link channel. In some implementations, the data announcement 120 may further identify a second subset of electronic devices as recipients of second data from the first electronic device 104 via a second data link. For example, the data announcement 120 may identify the third electronic device 108 as a recipient of the second data. The third electronic device 108 and the first electronic device 104, via a second data link channel, may perform acknowledgement and data transmission operations similar to the above-described operations between the second electronic device 106 and the first electronic device 104.

In a particular implementation, the data link is a multi-hop data link. For example, the data link may include the electronic devices 104-116. In this implementation, the data announcement 120 may be a traffic announcement message. In this implementation, the first electronic device 104 may generate the traffic announcement message via the data announcement logic 130 may transmit the traffic announcement message via the data link channel. Additionally, in this implementation, the particular time period may be a paging window of the data link. The paging window may be a time period that is reserved within the data link for the exchange of traffic announcement messages between the electronic devices 104-116. The paging window may occur during a discovery period corresponding to the NAN 102. The discovery period may refer to a period between two subsequent discovery windows. Timing of the paging window is further described with reference to FIGS. 2 and 3. In some implementations, information, such as a duration, a schedule, and/or other information corresponding to the paging window may be included in a data link attribute of a service discovery frame, as further described herein. In other implementations, information corresponding to paging windows may be included in a NAN-DL attribute, such as the one or more NAN-DL attributes 180, as further described herein. In other implementations, the information, such as the schedule, may be included in a further availability attribute (FAA), as further described herein.

In this implementation, each of the electronic devices 104-116 may operate in the active operating mode during the paging window and may monitor the data link channel to receive (or to send) traffic announcement messages. In FIG. 1, the electronic devices 104-116 monitor the data link channel and the electronic devices 106-112 receive the traffic announcement from the first electronic device 104. The electronic devices 114, 116 may receive traffic announcement messages transmitted by the electronic devices 110, 112, respectively. In this implementation, the electronic devices 104-116 may also monitor the data link channel during the paging window to perform routing operations, to perform association operations, or to exchange security information. Routing operations, association operations, and exchange of security information may occur during the paging window because each of the electronic devices 104-116 will be operating in the active operating mode and monitoring the data link channel during the paging window.

In this implementation, a duration of the paging window may be variable. The duration of the paging window may be determined by the electronic device that is operating as the provider (e.g., the first electronic device 104) of a service, and may be included in a data link attribute of a service discovery frame or in one of the one or more NAN-DL attributes 180, as further described herein. Thus, each of the electronic devices 106-112 that receive the service discovery frame from the first electronic device 104 will be able to determine the duration of the paging window. The duration of the paging window may be determined based on a number of electronic devices that are offering services within the first data link. The number of electronic devices that are offering services may be determined based on a number of root announcement (RANN) messages received by the first electronic device 104. For example, each of the electronic devices 104-116 may generate and transmit a RANN, via the NAN channel, if the corresponding electronic device is offering a service to the data link. In a particular implementation, the RANN may be generated in accordance with a hybrid wireless mesh protocol (HWMP) as described in the IEEE 802.11s standard. The RANN may enable other electronic devices to determine paths to the transmitting electronic device through the NAN 102. The first electronic device 104 may maintain a count of RANN messages received and may determine the duration of the paging window based on the count. In a particular implementation, the first electronic device 104 may determine the duration of the paging window by mapping the count of RANN messages to a value in a mapping table. For example, a count of five RANN messages (indicating five providers) may map to a paging window duration of five milliseconds (ms). As another example, a count of one hundred RANN messages may map to a paging window duration of 20 ms. In another implementation, the first electronic device 104 may determine the duration of the paging window based on the count of RANN messages using an algorithm. In at least one implementation, the count of RANN messages may be proportional to the duration of the paging window. For example, a large count value of RANN messages may correspond to a longer paging window duration than a small count value of RANN messages.

In another particular implementation, the data link is a single-hop data link. For example, the data link may include the electronic devices 104-112 and not the electronic devices 114, 116. In this implementation, the data announcement 120 may be a traffic announcement message. In this implementation, the first electronic device 104 may generate the traffic announcement message via the data announcement logic 130 and may transmit the traffic announcement message via the NAN channel. Additionally, in this implementation, the particular time period may be a paging window of the data link. The paging window may be a time period that is reserved within the data link for the exchange of traffic announcement messages between the electronic devices 104-116. The paging window may occur during a discovery period corresponding to the NAN 102. Timing of the paging window is further described with reference to FIGS. 2 and 4. In some implementations, information (e.g., a duration, a schedule, etc.) corresponding to the paging window may be included in a data link attribute of a service discovery frame, as further described herein. In other implementations, information corresponding to paging windows may be included in a NAN-DL attribute, such as the one or more NAN-DL attributes 180, as further described herein. In other implementations, the information, such as the schedule, may be included in a further availability attribute (FAA), as further described herein.

In this implementation, each of the electronic devices 104-116 may operate in the active operating mode during the paging window and may monitor the NAN channel to receive (or to send) traffic announcement messages. In FIG. 1, the electronic devices 104-112 monitor the NAN and the electronic devices 106-112 receive the traffic announcement message (e.g., the data announcement 120) from the first electronic device 104. The traffic announcement message may identify the first electronic device 104 as a sender, identify a subset of electronic devices (e.g., the second electronic device 106) as recipients of the data 122 from the first electronic device, and identify a data link and/or a data link channel corresponding to transmission of the data 122. In some implementations, the traffic announcement message may include information corresponding to multiple data links. For example, the traffic announcement message may further identify the first electronic device 104 as the sender, identify the second electronic device 106 as the recipient of the data 122 via the first data link channel, and identify the third electronic device 108 as a recipient of additional data via a second data link channel corresponding to a second data link.

In this implementation, each of the electronic devices 104-112 may operate in the active operating mode during the paging window and may monitor the NAN channel to receive (or to send) traffic announcement messages. In this implementation, a duration of the paging window may be a particular value. For example, the duration of the paging window may correspond to the service being provided by the first electronic device 104. The duration of the paging window may be included in a data link attribute of a service discovery frame, as further described herein.

The electronic devices 106-112 may determine whether to change a channel of a receiver and a transmitter (or a transceiver) based on the traffic announcement message. For example, the second electronic device 106 may receive and process the traffic announcement message via the data announcement logic 132. In response to determining that the second electronic device 106 is indicated as a recipient of the data 122, the data announcement logic 132 may change a channel of a receiver and a transmitter (or a transceiver) of the second electronic device 106 to the data link channel in order to send the acknowledgement 124 and to receive the data 122. In response to determining that the electronic devices 108-112 are not indicated as recipients of the data 122, each of the electronic devices 108-112 may maintain a channel of a receiver and a transmitter (or a transceiver) set to the NAN channel. The electronic devices 108-112 may also transition to the low-power operating mode until a next paging window, when the electronic devices 108-112 may transition to the active operating mode to monitor the NAN channel for additional traffic announcement messages. By preventing the electronic devices 108-112 from changing the channel of the receiver and the transmitter (or the transceiver), the system 100 may enable the electronic devices to reduce power consumption when the data announcement 120 is the traffic announcement message that is transmitted via the NAN channel.

In some implementations, the first electronic device 104 may provide a service to a small number of other electronic devices. For example, the first electronic device 104 may provide a service to the second electronic device 106 and the third electronic device 108. In these implementations, when the first electronic device 104 has data to be transmitted to other electronic devices, the first electronic device 104 may provide individual data announcements to each electronic device. For example, the first electronic device 104 may unicast a second data announcement to the second electronic device 106. A unicast data announcement message may be referred to as an announcement traffic indication message (ATIM). The second data announcement may indicate that the first electronic device 104 has data to send to the second electronic device 106. In response to receiving the second data announcement, the second electronic device 106 may transmit an acknowledgement (ACK) to the first electronic device. After receiving the ACK corresponding to the second data announcement, the first electronic device 104 may unicast a third data announcement (e.g., an ATIM) to the third electronic device 108. In response to receiving the third data announcement, the third electronic device 108 may transmit an ACK to the first electronic device. In some implementations, the data announcements are transmitted and the corresponding ACKs are received during a single paging window. In other implementations, the second data announcement and the third data announcement may be transmitted during different paging windows. In some implementations, the second data announcement and the third data announcement may be ATIMs formed in accordance with one or more standards, such as an IEEE 802.11 standard or a Wi-Fi Alliance standard, as non-limiting examples. Because the second data announcement and the third data announcement are addressed to individual recipients (e.g., the second electronic device 106 and the third electronic device 108), the second data announcement and the third data announcement may not include traffic indicator maps with identifiers that are generated during association processes. Thus, the data announcements, such as the ATIMs, may be used to indicate data for services that do not require an association process.

In some implementations, if the data announcement 120 is the traffic announcement message, such as in multi-hop data links and in single-hop data links, the traffic announcement message may include the recipient type indicator 150. A logical value of the recipient type indicator 150 may indicate whether the address list 152 that identifies and/or indicates the recipients of the data 122 is represented by a traffic indication map (TIM) or by a Bloom filter. For example, if the recipient type indicator 150 has a logical value of zero, the address list 152 may be represented by the TIM, and if the recipient type indicator 150 has a logical value of one, the address list 152 may be represented by the Bloom filter. In other implementations, the recipient type indicator 150 has a logical value of one if the address list 152 is represented by the TIM and has a logical value of zero if the address list 152 is represented by the Bloom filter.

In some implementations, the data announcement 120 is a service discovery frame (SDF). The SDF frame may be used to indicate that traffic is to be sent from the first electronic device 104 to other electronic devices of the NAN 102. In a particular implementation, the SDF may include a traffic announcement attribute. The traffic announcement attribute may include multiple fields and may include indications of recipients of data, such as a TIM or a Bloom filter. A particular implementation of the traffic announcement attribute is shown in Table 1. The traffic announcement attribute shown in Table 1 is illustrative and is not limiting. In other implementations, the traffic announcement attribute may include fewer fields or more fields than shown in Table 1 and/or the fields may be arranged in a different order. In other implementations, the data announcement 120 may have a different form. As a non-limiting example, the data announcement 120 may be a management frame or action frame that is different than a SDF.

TABLE 1

| Field | Size (octets) | Description |
| --- | --- | --- |
| Attribute ID | 1 | Identifies the type of attribute |
| Length | 2 | Length of traffic announcement attribute |
| Data Link Group ID | 6 | Data link group identifier |
| Traffic Indicator | variable | Type Length Value (TLV) field carrying traffic announcement for multiple recipients. The "Type" field indicates the type of the traffic indicator (TIM element, Bloom Filter, or list of MAC addresses that indicate recipients of data) and the "Length" field indicates the length of the "Value" field that carries the traffic indicator. |

As shown in Table 1, the traffic announcement attribute may include an attribute identifier (ID) field, a length field, a data link group ID field, and a traffic indicator field. In a particular implementation, the attribute ID field may have a vendor specific attribute ID. The length field may be a variable length field indicating a length of the traffic announcement attribute. The data link group ID field may include an identifier of the data link that the traffic announcement belongs to. In a particular implementation, the traffic indicator field may be a variable length field that includes the recipient type indicator 150 and a TIM or a Bloom filter (or other list of MAC addresses) based on a value of the recipient type indicator 150. In other implementations, the traffic announcement attribute may not include the recipient type indicator 150. In a particular implementation, the traffic indicator field is a "type length value" (TLV) field that includes a type field, a length field, and a value field. The type field may indicate the type of traffic announcement that is included in the value field, such as a TIM element, a Bloom filter, or a list of MAC addresses that indicate recipients of data. The length field may indicate a length of the value field, and the value field may include the traffic indicator. The traffic indicator may include a TIM element, a Bloom filter, or a list of MAC addresses.

If the recipient type indicator 150 has a logical value corresponding to the TIM, the address list 152 may be represented by a TIM that is included in the traffic announcement message. The TIM may be a bitmap that indicates whether electronic devices are included in the subset of electronic devices designated as recipients of the data 122. Each bit of the TIM may correspond to a different electronic device of the data link, and a value of each bit may indicate whether or not the corresponding electronic device is a recipient of the data 122. A correspondence between the bit of the TIM and each electronic device may be based on an association identification (AID) assigned by the first electronic device 104 during an association with the first electronic device 104. For example, when the second electronic device 106 associates with the first electronic device 104, the electronic devices 104, 106 may generate and exchange AID numbers. To illustrate, the second electronic device 106 may associate with the first electronic device 104 and may receive an AID of 2 from the first electronic device 104. The electronic devices 108-112 may receive AIDs of 3, 4, and 5, respectively, during association with the first electronic device 104. The AIDs may be used by the electronic devices 106-112 to identify corresponding bits in the TIM. For example, a second bit of the TIM may correspond to the second electronic device 106 due to the AID of 2. In this example, a third bit, a fourth bit, and a fifth bit of the TIM may correspond to the electronic devices 108-112, respectively (a first bit of the TIM may be reserved).

Each of the electronic devices 106-112 may determine whether it is a recipient of the data 122 based on the corresponding bit in the TIM. For example, the electronic devices 106-112 may determine that the second electronic device 106 is a recipient of the data 122 may be based on the second bit of the TIM having a logical value of one, and the electronic devices 106-112 may determine that the electronic devices 108-112 are not recipients may be based on the third bit, the fourth bit, and the fifth bit of the TIM having logical zero values. In a particular implementation, an AID space of the first electronic device may be partitioned into groups corresponding to multiple data links. For example, AIDs 2-10 may correspond to the first data link, and AIDs 11-20 may correspond to a second data link. In this example, when the second electronic device 106 associates with the first electronic device 104 as part of the first data link, the second electronic device 106 may receive an AID of 2. When the second electronic device 106 associates with the first electronic device 104 as part of the second data link, the second electronic device 106 may receive an AID of 12. The TIM may be similarly partitioned to represent recipients of data via multiple data links. For example, the second electronic device 106 may be indicated as a recipient via the first data link based on a value of the second bit of the TIM, and the second electronic device 106 may be indicated as a recipient via second data link based on a value of the twelfth bit of the TIM. In this manner, the first electronic device 104 may generate a single TIM that is included in the traffic announcement message to indicate data to be transmitted via multiple data links. Each of the electronic devices 106-112 may check multiple values in the TIM to determine whether data is to be received via the multiple data links.

If the recipient type indicator 150 has a logical value corresponding to the Bloom filter, the address list 152 may be represented by a Bloom filter that is included in the traffic announcement message. The Bloom filter is a data structure (e.g., a string of bits) that indicates membership in a set without explicitly identifying members of the set. The set may be a set of recipients of the data 122. The Bloom filter may be smaller (e.g., use less storage space) than a TIM and thus may reduce overhead in the networks and may reduce power consumed to transmit the Bloom filter as compared to transmitting the TIM. An electronic device may be indicated as a recipient of the data 122 in the Bloom filter using a set of hash functions corresponding to the Bloom filter. For example, the Bloom filter may be a bit array of m bits that are initialized to a logical zero value, and the Bloom filter may correspond to a set of k hash functions. To indicate that a particular electronic device is a recipient of the data 122, a string of bits corresponding to the particular electronic device may be passed through the k hash functions to generate a set of bit positions, and each bit in the Bloom filter corresponding to the set of bit positions is set to a logical one value. In a particular implementation, the string of bits is a media access control (MAC) address of the particular electronic device. Other electronic devices may be indicated as recipients of the data 122 by determining corresponding sets of bit positions based on corresponding strings of bits (e.g., MAC addresses) and by setting each bit in the Bloom filter corresponding to the sets of bit positions to a logical one value.

In a particular implementation, a hash function H(j, X, M) representing a jth index has of a bit string X (e.g., a MAC address) for a Bloom filter having length M is computed in three steps. A first intermediate result A(j, X) may be determined based on Equation 1.

$$A(j,X)=[j||X] \quad \text{(Eq. 1)}$$

In Equation 1, || represents a concatenation operation and j is represented in one byte. Thus, A(j, X) may represent a concatenation of a one byte index (e.g., a jth index) with a MAC address (e.g., bit string X). A second intermediate result B(j, X) may be determined based on Equation 2.

$$B(j,X)=CRC32(A(j,X))\&0x0000FFFF \quad \text{(Eq. 2)}$$

In Equation 2, CRC32( ) is a 32-bit cyclic redundancy check operation defined in a NAN standard. Thus, B(j, X) may represent the last two bytes of a result of a 32-bit CRC operation performed on the first intermediate result A(j, X). The hash function H(j, X, M) may be determined based on Equation 3.

$$H(j,X,M)=B(j,X)\bmod M \quad \text{(Eq. 3)}$$

In Equation 3, mod represents a modulo or modulus operation. In this manner, multiple hash functions can be determined for multiple different j indices using Equations 1-3. In other implementations, different hash functions may be used and communicated to the electronic devices of the data link.

In a particular implementation, a set of four hash functions corresponds to the Bloom filter. A bloom filter index may be included in the traffic announcement message to identify and/or indicate the set of four hash functions that corresponds to the Bloom filter. In a particular implementation, the bloom filter index is a two-bit number that indicates one of four sets of four hash functions determined based on different index values using Equations 1-3. In this implementation, set of hash functions identified and/or indicated by the bloom filter index are shown in Table 2.

TABLE 2

| Bloom Filter Set | Index (Binary) | Hash Functions | | | |
|---|---|---|---|---|---|
| | | 1 | 2 | 3 | 4 |
| 1 | 00 | H(0x00,X,M) | H(0x01,X,M) | H(0x02,X,M) | H(0x03,X,M) |
| 2 | 01 | H(0x04,X,M) | H(0x05,X,M) | H(0x06,X,M) | H(0x07,X,M) |
| 3 | 10 | H(0x08,X,M) | H(0x09,X,M) | H(0x0A,X,M) | H(0x0B,X,M) |
| 4 | 11 | H(0x0C,X,M) | H(0x0D,X,M) | H(0x0E,X,M) | H(0x0F,X,M) |

In the implementation where the traffic announcement message (e.g., the data announcement 120) includes the Bloom filter, the first electronic device 104 may select a particular set of hash functions to correspond to the Bloom filter and may generate the Bloom filter based on the particular set of hash functions and based on MAC addresses of the electronic devices that are to receive the data 122. For example, the first electronic device 104 may determine that the second electronic device 106 is to be a recipient of the data 122, and the first electronic device 104 may generate the Bloom filter based on the particular set of hash functions and based on a MAC address of the second electronic device 106. The first electronic device 104 may have previously stored the MAC addresses of one or more of the electronic devices 106-112 during performance of association operations.

The Bloom filter, the Bloom filter index, and a size of the Bloom filter may be included in the traffic announcement message generated by the first electronic device 104. The Bloom filter index may indicate the particular set of hash functions that corresponds to the Bloom filter (as shown in Table 2). The size of the Bloom filter may indicate a number of bits in the data structure. The size may be determined based on a target false positive percentage corresponding to the Bloom filter. For example, the Bloom filter may generate false positive matches and a percentage of false positive matches generated by the Bloom filter may be related to the size of the Bloom filter. A false positive match may erroneously indicate that a particular electronic device is a recipient of the data 122. The first electronic device 104 may determine the size such that the false positive percentage approaches a target false positive percentage. To illustrate, increasing the size of the Bloom filter may decrease the false positive percentage, while decreasing the size of the Bloom filter may reduce overhead used to transmit the Bloom filter at a cost of increasing the false positive percentage.

Each of the electronic devices 106-112 may determine whether it is a recipient of the data 122 based on the Bloom filter, the set of hash functions indicated by the Bloom filter index, and a corresponding MAC address. For example, the second electronic device 106 may determine a set of bit positions by passing a MAC address of the second electronic device 106 through the set of hash functions. The second electronic device 106 may compare bit(s) in the Bloom filter corresponding to each of the set of bit positions to a particular value (e.g., a logical one value). If the bit(s) corresponding to the set of bit positions each have the particular value, the second electronic device 106 may determine that it is identified as a recipient of the data 122. If one or more of the bit(s) corresponding to the set of bit positions do not have the particular value (e.g., one or more of the bit(s) has a logical zero value), the second electronic device 106 may determine that it is not identified as a recipient of the data 122. In response to determining that the second electronic device 106 is identified as a recipient of the data 122 in the Bloom filter, the second electronic device 106 may remain the active operating mode in order to receive the data 122 from the first electronic device 104 during the data transmission portion of the transmission window. In response to determining that the second electronic device 106 is not identified as a recipient of the data 122 in the Bloom filter, the second electronic device 106 may transition into the low-power operating mode during the data transmission portion of the transmission window.

In another particular implementation, the data link is a single-hop data link. For example, the data link may include the electronic devices 104-112 and not the electronic devices 114, 116. In this implementation, the data announcement 120 may be a service discovery frame (SDF). In this implementation, the first electronic device 104 may generate the SDF via the data announcement logic 130 and may transmit the SDF via the NAN channel. Additionally, in this implementation, the particular time period may be a discovery window of the NAN 102. The discovery window may be a time period that is reserved within the NAN 102 for performing discovery operations and synchronization operations. Timing of the discovery window is further described with reference to FIGS. 2 and 5. Information (e.g., a duration, a schedule, etc.) corresponding to the discovery window may be included in a service discovery message that is transmitted by one or more electronic devices of the NAN 102, in accordance with a NAN standard or protocol. Each of the electronic devices 104-112 may operate in the active operating mode during the discovery window and may monitor the NAN channel to receive (or transmit) service discovery messages and/or synchronization beacons, in accordance with a NAN standard or protocol.

The SDF may be a frame within a discovery beacon or a service discovery message of the NAN 102. For example, when the first electronic device 104 provides a service, the first electronic device 104 may generate a discovery beacon (or a service discovery message) that includes the SDF, via the data announcement logic 130. The SDF may include one or more attributes that provide information about the service. For example, the SDF may include a service descriptor attribute. The service descriptor attribute may include multiple fields that provide information, such as a service name (or a hash of the service name), an instance ID corresponding to the service, a control bitmap that corresponds to the service, and other information, as described in a NAN standard or protocol. The service descriptor attribute may also include a service response filter (SRF) field. The SRF field may be used to identify a subset of electronic devices as recipients of data. The SRF field may include multiple fields. A particular implementation of the SRF field is shown in Table 3. It is to be noted that the particular implementations shown in the tables herein are illustrative and are not to be considered limiting. In various implementations, data structures exemplified by the tables may include more, less, and/or different data than shown. Moreover, the order of data within a data structure may be changed. For example, in other implementations, the SRF field may include fewer or more fields than included in Table 3 and/or the fields may be arranged in a different order.

TABLE 3

| Field | Size (octets) | Value (hex) | Description |
|---|---|---|---|
| SRF control | 1 | Variable | Includes control information corresponding to the SRF (see Table 4) |
| Address set | Variable | Variable | List of partial MAC addresses or Bloom filter, depending on SRF type bit in the SRF control field |

As shown in Table 3, the SRF includes an SRF control field and an address set field. The SRF control field may indicate control information corresponding to the SRF field. The address set may correspond to the address list 152 and may be represented by a sequence of MAC addresses or by a Bloom filter, based on information indicated in the SRF control field. The SRF control field may include multiple fields. A particular implementation of the SRF control filed is shown in Table 4. The particular implementation in Table 4 is illustrative and not limiting. In other implementations, the SRF control field may fewer or more bits than included in Table 4 and/or the bits may be arranged in a different order.

TABLE 4

| Bit(s) | Information | Notes |
|---|---|---|
| 0 | SRF type bit | Indicates whether the address set is represented by a sequence of partial MAC addresses or represented by a Bloom filter. |
| 1 | Inclusion bit | Indicates whether the address set indicates devices included in a list of recipients of traffic or excluded from the list of recipients of traffic |
| 2-3 | Bloom filter index | Identifies the Bloom filter index being used |
| 4-8 | Reserved | Reserved |

As shown in Table 4, the SRF control field includes an SRF type bit, an inclusion bit, a Bloom filter index, and reserved bits. The SRF type bit indicates whether the address set (e.g., the address list 152) is represented by a sequence of partial MAC addresses or by a Bloom filter. The Bloom filter may be used to indicate a large set of MAC addresses without individually listing each partial MAC address. In a particular implementation, the address set is represented by the partial list of MAC addresses if the SRF type bit is 0, and the address set is represented by the Bloom filter if the SRF type bit is 1. In another implementation, the address set is represented by the partial list of MAC addresses if the SRF type bit is 1, and the address set is represented by the Bloom filter if the SRF type bit is 0. The inclusion bit may indicate whether the address set indicates an "include list" or an "exclude list." An include list may indicate a list of electronic devices that are recipients of the data 122, and an exclude list may indicate a list of electronic devices that are not recipients of the data 122 (e.g., each of the electronic devices 106-112 are recipients of the data 122 except the electronic devices indicated in the exclude list). In a particular implementation, the address set is the include list if the inclusion bit is 1, and the address set is the exclude list if the inclusion bit is 0. If the address set is represented by the Bloom filter, the Bloom filter index may identify a set of hash functions that corresponds to the Bloom filter (as shown in Table 2).

In this manner, the address set of the SRF in the service descriptor attribute of the SDF may identify the subset of electronic devices as recipients of data from the first electronic device 104. The electronic devices 106-112 may determine whether to change a channel of a receiver and a transmitter (or a transceiver) and whether to change an operating mode based on the address set of the SRF. For example, the second electronic device 106 may receive and process the SDF via the data announcement logic 132. In response to determining that the address set of the SRF identifies the second electronic device 106 as a recipient of the data 122 (e.g., based on the partial list of MAC addresses or the Bloom filter included in the SRF), the data announcement logic 132 may change a channel of a receiver and a transmitter (or a transceiver) of the second electronic device 106 to the data link channel in order to send the acknowledgement 124 and to receive the data 122. In response to determining that the electronic devices 108-112 are not indicated as recipients of the data 122 in the address set of the SRF, each of the electronic devices 108-112 may maintain a channel of a receiver and a transmitter (or a transceiver) set to the NAN channel. The electronic devices 108-112 may also transition to the low-power operating mode until a next paging window, when the electronic devices 108-112 may transition to the active operating mode to monitor the NAN channel for additional traffic announcement messages.

In some implementations, a SDF that is generated and transmitted by the first electronic device 104 may include a data link attribute. In a particular implementation, where the data announcement 120 includes or corresponds to the SDF, the data link attribute may be included in the same SDF as the service descriptor attribute. In another implementation where the data announcement 120 includes or corresponds to the traffic announcement message, the SDF may be generated and transmitted by the first electronic device 104 prior to the traffic announcement message. In both implementations, the SDF may be transmitted by the first electronic device 104 via the NAN channel during the discovery window, as further described with reference to FIG. 2. In other implementations, the data announcement 120 may include the one or more service attributes 170 and the one or more NAN-DL attributes 180, as further described with reference to FIGS. 7-10.

The data link attribute may include multiple fields. A particular implementation of the data link attribute is shown in Table 5. The data link attribute shown in Table 5 is illustrative and is not limiting. In other implementations, the data link attribute may include fewer fields or more fields than shown in Table 5 and/or the fields may be arranged in a different order. An additional or alternate implementation, referred to as a NAN-DL attribute, is illustrated in FIG. 8. In other implementations, information corresponding to a data link or a NAN-DL may be indicated in a different manner.

TABLE 5

| Field | Size (octets) | Description |
|---|---|---|
| Attribute ID | 1 | Vendor-specific attribute identifier |
| Length | 1 | Length of data link attribute |
| OUI | 3 | Vendor-specific OUI |
| Vendor Attribute Type | 1 | Identifies this attribute as a data link attribute |
| Data link Key | 4 | Data link key |
| Data link Operating Class and Channel | 1 | Identifies the operating class and the wireless channel corresponding to the data link channel |
| Data link Control | 2 | Includes additional information corresponding to the data link (see Table 6) |
| Data link ID | Variable | Data link ID |

As shown in Table 5, the data link attribute may include an attribute identifier (ID) field, a length field, an organizationally unique identifier (OUI) field, a vendor attribute type field, a data link key field, a data link channel field, a data link control field, and a data link ID field. In a particular implementation, the attribute ID field may have a vendor specific attribute ID. The length field may be a variable length field indicating a length of the data link attribute. In a particular implementation, the OUI field may have a vendor specific OUI value. In a particular implementation, the vendor attribute field may indicate a data link (e.g., a mesh network) attribute. In a particular implementation, the data link key field may distinguish two data links with a common data link ID. For example, the data link key field may store a hash value of a current data link key. The data link channel field may identify the wireless channel corresponding to the data link (e.g., the data link channel). In a particular implementation, the data link ID field may store a data link ID element, in accordance with an IEEE 802.11 standard.

In some implementations, the data link attribute may indicate a logical channel corresponding to the data link. For example, one of the above-described fields, or another field, of the data link attribute may indicate the logical channel. As used herein, a logical channel refers to a data link channel and one or more time periods, such as one or more transmission windows, during which the electronic devices of the data link may communicate regarding the particular service via the data link channel. Information corresponding to logical channels may also be referred to as scheduling information. In some implementations, the data link attribute may indicate a logical channel selected by the first electronic device 104. In other implementations, the data link attribute may indicate a set of logical channels that are available for use by the first electronic device 104, and a receiving device may select one of the available logical channels for use in receiving the service.

One or more of the fields of the data link attribute may indicate the logical channels. For example, data link attribute may include a list of indices corresponding to the logical channels. The list of indices may be based on mapping data that maps indices to logical channel(s) of a plurality of logical channels. The mapping data may be accessible to one or more of the electronic devices 104-116. For example, the mapping data may be stored at memories of the electronic devices 104-116. In some implementations, the mapping data may be programmed into the electronic devices 104-116 by a device manufacturer. In some implementations, the mapping data may be in accordance with one or more industry standards, such as an IEEE 802.11 standard or a Wi-Fi Alliance standard, as non-limiting examples. In a particular implementation, the data link attribute includes an indicator that identifies a particular logical channel of the plurality of logical channels used by the first electronic device 104 to provide the particular service. In another implementation, the data link attribute includes an indicator that identifies a particular set of logical channels of the plurality of logical channels available to the first electronic device 104 for providing the particular service.

In a particular implementation, the data link attribute may indicate the logical channels without using a list of indices. For example, the data link attribute may indicate a particular logical channel of the plurality of logical channels by including a channel number corresponding to the particular logical channel and by including one or more offsets corresponding to one or more transmission windows of the particular logical channel.

In other implementations, scheduling information (e.g., the indication of logical channels) may be included in a further availability attribute (FAA). The FAA may be distinct from the data link attribute. The data link attribute may include a field that indicates (or points to) the FAA. The FAA may be formed in accordance with one or more industry standards, such as a Wi-Fi Alliance standard, as a non-limiting example.

Figure 10:
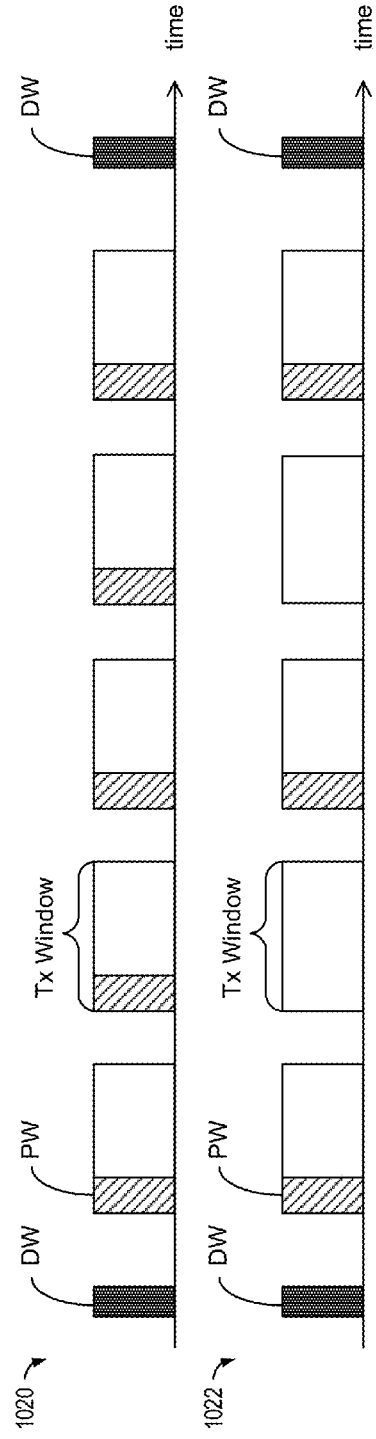
FIG. 10 is a diagram illustrating an example of a NAN-DL control field and examples of paging windows defined by the NAN-DL control field.

The data link control field may indicate additional information corresponding to the data link. A particular implementation of the data link control field is shown in Table 6. The data link control field shown in Table 6 is illustrative and is not limiting. In other implementations, the data link control field may include fewer fields or more fields than shown in Table 6 and/or the fields may be arranged in a different order. Additionally, the fields may indicate information using different values than described in Table 6. An additional or alternate implementation, referred to as a NAN-DL control field, is illustrated in FIG. 10.

TABLE 6

| Bit(s) | Information | Description |
|---|---|---|
| 0 | Data link transmission (Tx) Repeat | Indicated whether data link Tx window repeats multiple times between consecutive discovery windows |
| 1-2 | Type of Data Announcement | Indicates a type of the data announcement 120 |
| 3-4 | DW Offset | Indicates when the data link Tx window starts after a discovery window |
| 5-6 | Data link Tx Offset | Indicates Tx window start time offsets between consecutive data link Tx windows |
| 7-8 | Data link Tx Window Size | Indicates a size of the data link Tx window |
| 9-10 | Data link PW Size (if bits 1-2 = 0) | Indicates a size of the data link paging window |
| 9-10 | NAN PW Repetitions (if bits 1-2 = 1) | Indicates a number of repetitions of a NAN paging window between two consecutive discovery windows |
| 9-10 | Repeat Recipient Assignments Duration (if bits 1-2 = 2) | Indicates a duration of time that data recipient assignments identified in the SRF are repeated |
| 11-12 | Data link Heartbeat | Indicates a threshold "data link heartbeat" |
| 13-15 | Reserved | |

As shown in Table 6, in a particular implementation, the data link control field may include sixteen bits. A value of bit 0 may indicate whether a data link transmission window repeats between consecutive discovery windows in the NAN 102. A value of bits 1-2 may indicate a time period corresponding to the data announcement 120 (e.g., when and how data is advertised). In a particular implementation, the value may be set as follows—0: the data announcement 120 is the traffic announcement message transmitted during a data link channel paging window; 1: the data announcement 120 is the traffic announcement message transmitted during a NAN channel paging window; 2: the data announcement 120 is the SDF transmitted via the NAN channel during a discovery window, 3: reserved. A value of bits 3-4 may indicate a number of TUs between termination of a discovery window and a start of a data link transmission window. In a particular implementation, a value may be set as follows—0:0 TU; 1:16 TU; 2:32 TU; 3:64 TU. A value of bits 5-6 may indicate a number of TUs between consecutive data link transmission windows. In a particular implementation, the value may be set as follows—0:0 TU; 1:16 TU; 2:32 TU; 3:64 TU. A value of bits 7-8 may indicate a size of the data link transmission window. In a particular implementation, the value may be set as follows—0:64 TU; 1:128 TU; 2:256 TU; 3: reserved.

A value of bits 9-10 may indicate timing information of data transmissions corresponding to the data link. The timing information indicated by the value of bits 9-10 may depend on the value of bits 1-2. In a particular implementation, if the value of bits 1-2 is 0, the value of bits 9-10 may indicate a duration of a data link paging window. In this implementation, the value may be set as follows—0:2 TU; 1:5 TU; 2:8 TU; 3:12 TU. In a particular implementation, if the value of bits 1-2 is 1, the value of bits 9-10 may indicate a number of repetitions of a NAN paging window between two consecutive discovery windows of the NAN 102. In this implementation, the value may be set as follows—0:32 TU; 1:64 TU; 2:128 TU; 3:256 TU. In a particular implementation, if the value of bits 1-2 is 2, the value of bits 9-10 may indicate a duration of time that data recipient assignments identified in the SRF are repeated. During this time period, the provider (e.g., the first electronic device 104) of the service may not advertise the service to the NAN 102 and may continue to send data via the data link channel to recipients identified in the SDF. In this implementation, the value may be set as follows—0:2 discovery windows; 1:5 discovery windows; 2:8 discovery windows; 3:15 discovery windows.

A value of bits 11-12 may indicate a "data link heartbeat." The data link heartbeat may correspond to a threshold time period (in second(s)) that no message or data transmission occurs via the data link channel and the electronic devices 104-116 will consider the data link as valid. To further illustrate, the data link heartbeat may indicate a duration of time that a device of the data link is to remain associated with the data link in the absence of receiving a message related to the data link. In a particular implementation, the value may be set as follows—0:30 s; 1:60 s; 2:120 s; 3:300 s. The electronic devices 104-116 may set heartbeat counters based on the data link heartbeat. In some implementations, a longer data link heartbeat may enable a longer duration of a low-power operating mode for the electronic devices 104-116. For example, a longer data link heartbeat may enable the electronic devices 104-116 to operate in the low-power operating mode for a longer time without exceeding the data link heartbeat. Such longer data link heartbeats may be useful in particular applications, such as sensor networks.

If no message is received by the electronic devices 104-116 via the data link channel for a time period that exceeds the threshold time period (e.g., the data link heartbeat), the electronic devices 104-116 may determine that the data link no longer is valid and the electronic devices 104-116 may disassociate from the data link. To illustrate, the electronic devices 104-116 may cease monitoring the data link channel during paging windows of the data link. Additionally or alternatively, after disassociating from the data link and during a paging window of the data link, the electronic devices 104-116 may enter the low-power operating mode, monitor a second data link channel of a second data link, monitor a particular channel of the NAN 102, or may broadcast a message via the particular channel, as illustrative, non-limiting examples.

The data link control field may further include reserved bits. The reserved bits may be bits 13-15 in a particular implementation. In an alternate implementation, one or more of the reserved bits may be replaced with a paging window repetition indicator. The paging window repetition indicator may indicate how many transmission windows (between consecutive discovery windows) include paging windows, as further described with reference to FIG. 10.

In a particular implementation, the data link may also have a "data link lifetime." The data link lifetime may correspond to a threshold time that indicates when the data link will expire or when a "major" transaction (e.g., a renegotiation of a data link schedule, merging of two or more NAN clusters, etc.) is to occur. In a particular implementation, the data link lifetime may be indicated in the data link attribute. Alternatively, one or more of the bits of the data link control field may be used to indicate the data link lifetime.

An initial value of the data link lifetime may be set by an electronic device that creates or provides the data link. For example, if the first electronic device 104 is a provider of the data link, the first electronic device 104 may initially set the value of the data link lifetime. The data link lifetime may be extended (e.g., the value of the data link lifetime may be increased) by one or more electronic devices of the data link. The electronic device that extends the data link lifetime may be the same electronic device that initially set the value of the data link lifetime or a different electronic device. For example, in a one-to-many wireless device topology, the service provider device may extend the data link lifetime. As another example, in a one-to-one wireless device topology or a many-to-many wireless device topology, the service provider device or a subscriber device may extend the data link lifetime. To further illustrate, the first electronic device 104 or one of the other electronic devices 106-112 may extend the data link lifetime. When a counter reaches the second threshold time (e.g., when the data link lifetime expires), electronic devices of the data link may join other data links or may negotiate other data link schedules. Because electronic devices within a NAN are synchronized and the data link lifetime is indicated to electronic devices of the NAN, all electronic devices of the NAN may determine an end of the data link lifetime at the same time. If a data link is no longer being used by the electronic devices of the data link (e.g., if no electronic device has data to send), the data link lifetime may not be extended and each of the electronic devices of the data link may leave the data link when the data link lifetime expires (e.g., when a counter reaches the second threshold time). However, if one or more electronic devices have additional data to send or receive from other electronic devices of the data link, the one or more electronic devices may extend the data link lifetime.

In some implementations, transmission windows may be designated to carry multicast traffic or non-multicast traffic, such as unicast traffic. A periodicity of transmission windows that are designated for multicast traffic may be indicated by one or more messages or elements exchanged in the data link. For example, the periodicity may be indicated by a field in a data link attribute or a NAN data link (NDL) attribute. As one illustrative example, if the field has a value of four, each fourth transmission window may be designated for multicast traffic. In other implementations, the periodicity of transmission windows may be indicated or determined during negotiation of a data link schedule (also referred to as a NDL schedule) between devices of the data link. Other transmission windows may be designated for non-multicast traffic. In some implementations, if the first electronic device 104 indicates that a particular transmission window is designated for multicast traffic, each of the electronic devices 106-112 may remain in the active operating mode during the data transmission portion of the particular transmission window. In some implementations, there is no data announcement and/or no paging window during a transmission window that is designated for multicast traffic. In these implementations, the electronic devices 106-112 remain in the active operating mode based on the indication that the transmission window is designated for multicast traffic. In other implementations, the transmission window designated for multicast traffic includes a paging window, and the data announcement 120 is transmitted during the paging window. In some implementations, if the data announcement 120 is received during a paging window of a transmission window that is designated for multicast traffic, the data announcement 120 does not need to be acknowledged by the electronic devices 106-112. In implementations where every transmission window is designated for multicast traffic (e.g., pure multicast), the transmission windows do not include paging windows and each of the electronic devices 104-112 remain in the active operating mode during the transmission windows. A pure multicast application may be indicated by the periodicity field in the data link attribute (or in a different attribute) having a value of one.

In some implementations, the electronic devices 104-112 may be configured to perform contention-mitigation techniques to reduce collisions during a paging window. To perform contention mitigation, each of the electronic devices 104-112 may include, store, and/or maintain a first backoff counter (c_dw) and a second backoff counter (c_dwb). The backoff counters may be used to determine when, during a paging window, a service discovery frame (SDF) and/or a synchronization beacon are to be transmitted. To illustrate, at the beginning of a discovery window the first electronic device 104 may set the first backoff counter (c_dw) to a value that is randomly drawn from a uniform distribution over the interval [0, CW] where CW is a first contention window parameter. In some implementations, CW has a particular value, such as a preprogrammed value or a value that is set by one or more standards. In other implementations, CW is based on a length of the paging window, as further described herein. Additionally, a timer is set to a value that is randomly drawn from a uniform distribution over the interval [$T_{pkt}(p)$, TEndDW], where $T_{pkt}(p)$ is a time that a packet p is available for transmission, and TEndDW is an end of the discovery window. In this implementation, p is a SDF. The first backoff counter and the timer are configured to count down after being set at the beginning of the discovery window.

If the first backoff counter (c_dw) reaches zero, the SDF (e.g., the data announcement 120) is transmitted by the first electronic device 104. If the timer reaches zero before the first backoff counter (c_dw) reaches zero, a random count value is drawn from a uniform distribution over the interval [0, CW_RS], where CW_RS is a second contention window parameter. In a particular implementation, CW_RS has a set value of 15 time units (TUs), as a non-limiting example. In other implementations, CW_RS may be a different value. In some implementations, CW_RS may be defined in one or more standards. If the residual value of the first backoff counter (c_dw) is less than the random count value, c_dw is set to the random count value. The residual value of the first backoff counter (c_dw) refers to a value of the first backoff counter (c_dw) at the time when the timer reaches zero. If the residual value of the first backoff counter (c_dw) is equal to or exceeds the random count value, the residual value is maintained. After the first backoff counter (c_dw) reaches zero, the SDF may be transmitted by the first electronic device 104.

The second backoff counter (c_dwb) may be set to a random value that is drawn from a uniform distribution over the interval [0, CW_RS] if the first electronic device 104 is operating as an anchor master device in the NAN 102. For example, if a hop count to the anchor master device is zero, such as when the first electronic device 104 is operating as the anchor master device, the random value is drawn from the uniform distribution over the interval [0, CW_RS]. If the first electronic device 104 is not operating as the anchor master device (e.g., if the hop count to the anchor master device is greater than zero), the second backoff counter (c_dwb) is set to a random value that is drawn from a uniform distribution over a particular interval. In some implementations, the particular interval is [0, 31], as a non-limiting example. In other implementations, the particular interval is a different interval. When the second backoff counter (c_dwb) reaches zero, a synchronization beacon may be transmitted by the first electronic device 104.

In some implementations, the value of CW may be based on a duration of the paging window. In these implementations, the paging window has a fixed duration referred to as paging time. For example, the duration of a paging window may be 10% of the duration of the transmission window that includes the paging window, and the duration of the transmission window (and the duration of the paging window) may be indicated by one or more elements of the data announcement 120. The value of CW may be based on the duration of the paging window, a target collision probability for messages that are communicated during the paging window, and length of the messages. To illustrate, if a paging message (e.g., the data announcement 120) is approximately 50 octets, if each paging message is acknowledged, and if the paging message and the acknowledgement are sent at approximately 6 Mbps, approximately 178 microseconds (μs) are used to exchange the paging message. If the target collision probability is 10%, then CW is approximately 10*number of paging devices, such that each device has approximately 90 μs of contention interval. To accommodate the paging message size and the target collision probability, a paging window is 268 μs (178+90)*a number of paging devices. Stated another way, there are approximately 3.7 devices per 1 millisecond (ms) of the paging window. Because the paging window has a fixed duration paging time, the value of CW may be selected based on the equation CW=10*paging time/3.7. Thus, the first electronic device 104 may select a value of the first contention window parameter (CW) based on the duration of the paging window, the size of the data announcement 120, and a target collision probability of paging messages during the paging window. In other implementations, CW may have a different value based on a different target collision probability and/or a different size of paging messages.

In some implementations, the first contention window parameter (CW) may also be used for transmitting data during the data transmission portion of the transmission window. In these implementations, the data transmission portion of the transmission window has a fixed duration referred to as $T_{Data}$. For example, the duration of the data portion may be 90% of the duration of the transmission window. The value of CW may be based on the duration of the transmission window, a target collision probability for messages that are communicated during the transmission window, and length of the messages. To illustrate, a data unit (e.g., the data 122) may take approximately 620 μs to transmit. If the target collision probability is 10%, then CW is approximately 10*number of transmitting devices, such that each device has approximately 90 μs of contention interval. To accommodate the data unit size and the target collision probability, a total time to satisfy N devices is 710 μs (620+90)*a number of transmitting devices. Stated another way, given the duration $T_{Data}$, a number of transmitting devices is $T_{Data}/710$. The value of CW may be selected based on the equation CW=10*$T_{Data}/710$. Thus, the first electronic device 104 may select a value of the first contention window parameter (CW) based on the duration of the transmission window, the size of the data 122, and a target collision probability of messages during the transmission portion of the transmission window. In other implementations, CW may have a different value based on a different target collision probability and/or a different size of transmit messages.

After receiving the data announcement 120, the second electronic device 106 may send the acknowledgement 124. In some implementation, the acknowledgement 124 may serve as or represent a power-save poll (PS-POLL) message. For example, in response to receiving the data announcement 120, the second electronic device 106 may generate, via the acknowledge logic 136, the acknowledgement 124 that serves as the PS-POLL message. The acknowledgement 124 may be generated in a similar manner to generation of a PS-POLL message in a traditional access point (AP) based wireless network. However, in the system 100, the acknowledgement 124 message may include or correspond to a broadcast message that serves as the PS-POLL message, as compared to a unicast PS-POLL message in the traditional AP based wireless network. The second electronic device 106 may transmit acknowledgement 124 message via the data link channel during an acknowledgement window that occurs prior to a data transmission portion of a transmission window, as further described with reference to FIG. 2. In a particular implementation, if the acknowledgement 124 serves as the PS-POLL message, the acknowledgement 124 may be transmitted at a low data rate to increase reliability of the acknowledgement 124 being received the first electronic device 104. The first electronic device 104 may monitor the data link channel during the acknowledgement window and may receive and process the acknowledgement 124 serving as the PS-POLL message via the acknowledge logic 134. In response to receiving the acknowledgement 124, the first electronic device 104 may transmit the data 122 to the second electronic device 106 via the data link channel during the data transmission portion of the transmission window.

In some implementations, if the acknowledgement 124 serves as the PS-POLL message, each of the electronic devices may store a minimum wait time value and a maximum wait time value. For example, the minimum wait time may be the minimum wait time 2270 of FIG. 22, and the maximum wait time may be the maximum wait time 2272 of FIG. 22. In this implementation, the second electronic device 106 may initiate a timer (included in timing circuitry of the acknowledge logic 136) after transmitting the acknowledgement 124 and may monitor the data link channel. If the second electronic device 106 determines that the data link channel is idle for a period of time that exceeds the minimum wait time value and that the first electronic device 104 has not transmitted the data 122, the second electronic device 106 may transition to the low-power operating mode during the data transmission portion of the transmission window. If the second electronic device 106 determines that the data link channel is busy (e.g., other electronic devices are transmitting data) for a period of time that exceeds the maximum wait time value and that the first electronic device 104 has not transmitted the data 122, the second electronic device 106 may transition to the low-power operating mode during the data transmission portion of the transmission window. Changing the operation mode based on the time period may enable the second electronic device 106 to reduce power consumption at times when the first electronic device 104 is unable to contend for the data link channel to transmit the data 122. Additionally, if the second electronic device 106 receives at least one frame of the data 122, and the at least one frame indicates additional data is to be transmitted, the second electronic device 106 may not transition to the low-power operating mode during the data transmission portion of the transmission window.

In another particular implementation, the acknowledgement 124 may be a quality of service null (QoS_NULL) frame. For example, in response to receiving the data announcement 120, the second electronic device 106 may generate, via the acknowledge logic 136, a QoS_NULL frame as the acknowledgement 124. In some implementations, the QoS_NULL frame indicates a reverse direction grant (RDG) from the second electronic device 106. For example, value(s) of one or more bits in the QoS_NULL frame may indicate the RDG. The RDG may be similar to a RDG in a physical protocol data unit (PPDU), in accordance with one or more wireless standards or protocols, but may be included in the QoS_NULL frame instead of the PPDU. The RDG may authorize a recipient of the QoS_NULL frame to use a transmit opportunity (tx_op) of a sender of the QoS_NULL frame to transmit data during a tx_op of the sender. For example, the first electronic device 104 may generate a QoS_NULL frame that indicates a RDG and may transmit the QoS_NULL frame (as the acknowledgement 124) to the first electronic device 104 via the data link channel. The QoS_NULL frame with the RDG may authorize the first electronic device 104 to send a frame of the data 122 to the second electronic device 106 during a tx_op of the second electronic device 106. In other implementations, the QoS_NULL frame does not include the RDG.

The first electronic device 104 may receive and process the QoS_NULL frame via the acknowledge logic 134. In response to receiving the QoS_NULL frame, the first electronic device 104 may transmit a frame of the data 122 to the second electronic device 106 via the data link channel during the tx_op of the second electronic device 106. Thus, if the QoS NULL frame indicates a RDG, the first electronic device 104 may not have to contend for the data link channel to transmit the frame of the data 122. If the data 122 is a single frame, an entirety of the data 122 may be transmitted from the first electronic device 104 to the second electronic device 106 in response to the QoS_NULL frame. If the data 122 includes more than one frame, the first electronic device 104 may indicate, via one or more specific bits in a frame header of the frame of the data 122, that additional frames of the data 122 are to be transmitted. As one example, the first electronic device 104 may indicate that additional frames of the data 122 are to be transmitted by setting a more data (e.g., "MORE") bit in the frame header to a particular value such as a one value. As another example, the first electronic device 104 may indicate that additional frames of the data 122 are to be transmitted by setting an end-of-service-period (EOSP) bit to a particular value, such as a one value.

In response to receiving the frame of the data 122 with an indication that additional frames of the data 122 are to be transmitted, the second electronic device 106 may contend for the data link channel and, upon successful contention, the second electronic device 106 may transmit another QoS_NULL frame to the first electronic device 104 to cause the first electronic device 104 to transmit another frame of the data 122. This process may be repeated until the first electronic device 104 has transmitted an entirety of the data 122 or until a termination of the transmission window. In some implementations, the second electronic device 106 may be indicated as a recipient of data from multiple other electronic devices. In these implementations, the second electronic device 106 may transmit a QoS_NULL frame to the multiple electronic devices and may receive data responsive to the QoS_NULL frames from each of the multiple electronic devices. If the second electronic device 106 has received a data frame in response to each QoS_NULL frame, and if the data frame does not indicate that more data is to be transmitted, the second electronic device 106 may transition to the low-power operating mode for a remainder of the transmission window. If at least one data frame indicates that more data is to be transmitted to the second electronic device 106, the second electronic device 106 may remain in the active operating mode and may continue to transmit QoS_NULL frames.

In another particular implementation, the second electronic device 106 may not transmit the acknowledgement 124 after receiving the data announcement 120. In this implementation, after transmitting the data announcement 120, the first electronic device 104 may generate, via the acknowledge logic 134, a NULL frame 126. For example, the NULL frame 126 may include a preamble or a header without a payload portion. In a particular implementation, the NULL frame 126 may be a QoS_NULL frame, which may have a higher priority than other null frames. The first electronic device 104 may transmit the NULL frame 126 to the second electronic device 106 via the data link channel to provoke the acknowledgement. In a particular implementation, the NULL frame 126 may be transmitted during an acknowledgement window that occurs prior to a data transmission portion of a transmission window, as further described with reference to FIG. 2.

The second electronic device 106 may receive and process the NULL frame via the acknowledge logic 136. In response to receiving the NULL frame 126 from the first electronic device 104, the second electronic device 106 may contend for the data link channel and, upon successful contention, may transmit the acknowledgement 124 to the first electronic device 104 via the data link channel. In a particular implementation, the acknowledgement 124 may be an acknowledgement (ACK) frame. The first electronic device 104 may receive and process the acknowledgement 124, via the acknowledge logic 134. In response to receiving the acknowledgement 124, the first electronic device 104 may contend for the data link channel and, upon successful contention, transmit the data 122 to the second electronic device 106 via the data link channel during the data transmission portion of the transmission window.

In another particular implementation, if the data announcement 120 (e.g., the traffic announcement message or the SRF) includes the Bloom filter, the acknowledgement 124 may be generated in response to determining that the second electronic device 106 is identified as a recipient of the data 122 instead of in response to receiving the data announcement 120. For example, in response to determining that the second electronic device 106 is identified as a recipient of the data 122 in the data announcement 120 based on the Bloom filter, the second electronic device 106 may generate, via the acknowledge logic 136, the acknowledgement 124. In this implementation, the acknowledgement 124 may be a PS-POLL message or may be a QoS_NULL frame, as described above. The second electronic device 106 may remain in the active operating mode after sending the acknowledgement 124 in order to receive the data 122 during the data transmission portion of the transmission window.

To reduce a likelihood that an electronic device may be in the active mode due to a false positive match based on the Bloom filter, the first electronic device 104 may be configured to respond to received acknowledgements. For example, the first electronic device 104 may receive the acknowledgement 124 from the second electronic device 106 and may receive an acknowledgement 144 from the fifth electronic device 112. The first electronic device 104 may determine whether the acknowledgements 124 and 144 are received from electronic devices that are to receive the data 122 or whether the acknowledgements 124 and 144 are erroneously transmitted based on false positive matches. To illustrate, the second electronic device 106 may correctly identify itself as a recipient of the data 122 and may transmit the acknowledgement 124 to the first electronic device 104, and the fifth electronic device 112 may erroneously identify itself as a recipient of the data 122 (e.g., based on a false positive match) and may transmit the acknowledgement 144 to the first electronic device 104. The first electronic device 104 may compare the second electronic device 106 and the fifth electronic device 112 to a list of the recipients of the data 122 to determine a respective response to the acknowledgements 124 and 144. For example, based on determining that the second electronic device 106 is to receive the data 122, the first electronic device 104 may send the data 122 to the second electronic device 106, as described above.

Based on determining that the fifth electronic device 112 is not to receive the data 122, the first electronic device 104 may transmit a negative-acknowledgement (NACK) 154 to the fifth electronic device 112. The fifth electronic device 112 may transition into the low-power operating mode in response to receiving the NACK 154 to reduce power consumption during a data transmission portion of a transmission window that no data will be received. Additionally or alternatively, if the fifth electronic device 112 determines that a time period after the acknowledgement 144 is transmitted exceeds a threshold time period, and that no data has been received from the first electronic device 104 during the time period, the fifth electronic device 112 may transition into the low-power operating mode during a remainder of the data transmission portion the transmission window to reduce power consumption.

One advantage provided by the system 100 is a reduction in power consumption at one or more of the electronic devices 104-116 of the NAN 102. For example, the electronic devices 108-112 may transition to the low-power operating mode during a transmission window based on determining that the data announcement 120 does not identify the electronic devices 108-112 as recipients of the data 122. Thus, the electronic devices 108-112 may conserve power while the first electronic device 104 and the second electronic device 106 exchange the data 122, as compared to other wireless mesh networks where each electronic device continuously monitors a corresponding wireless channel for data transmissions (e.g., a system without a defined paging window or a SDF that indicates recipients of data). Additionally, because the second electronic device 106 transmits the acknowledgement 124 to the first electronic device 104, the first electronic device 104 may avoid wasting processing resources and consuming power to transmit the data 122 when the second electronic device 106 is unable to receive the data 122. Preventing transmissions of the data 122 when the second electronic device 106 is unable to receive the data 122 may reduce repeated transmissions, thereby reducing an amount of transmissions or congestion on the data link channel.

Figure 2:
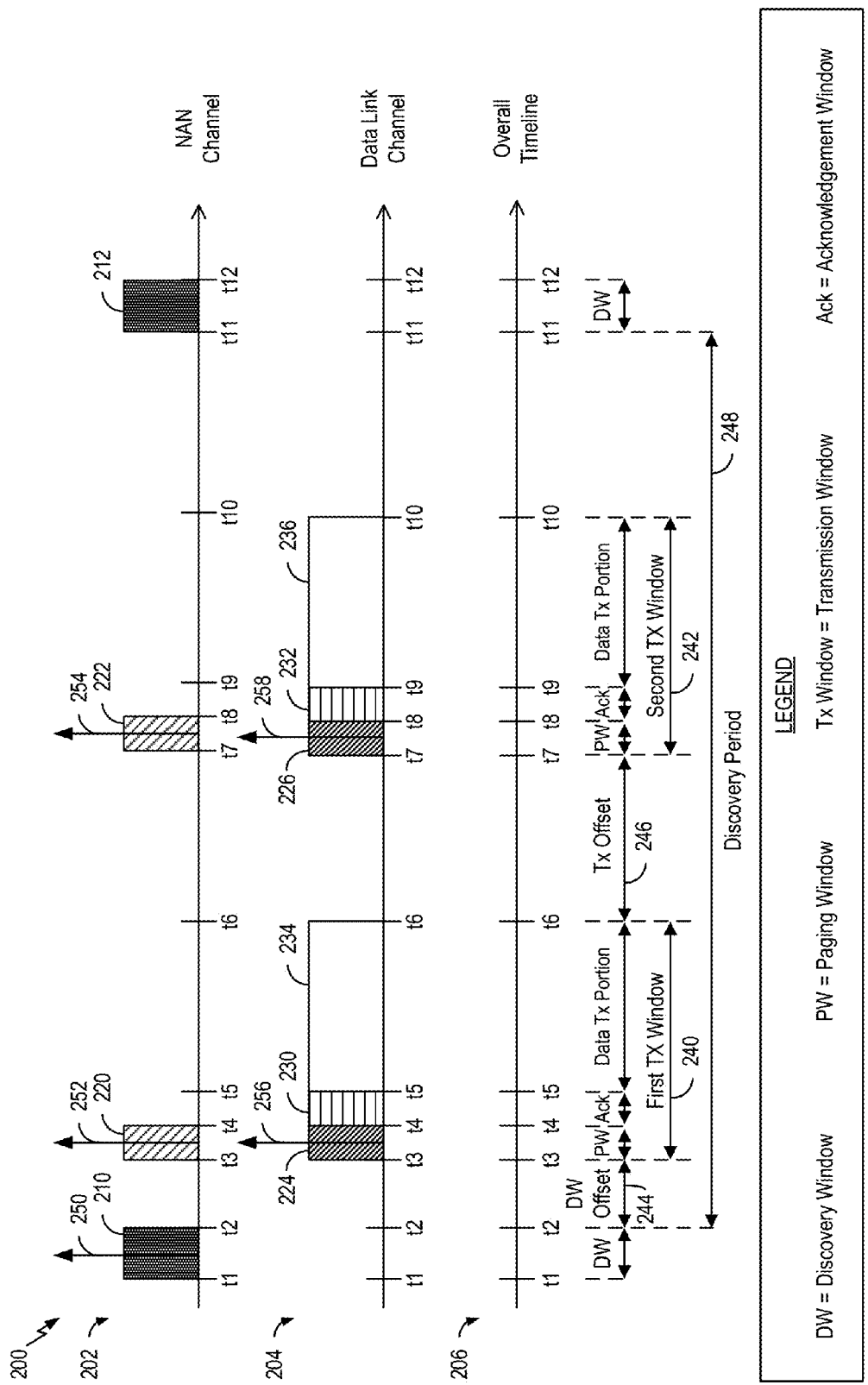
FIG. 2 is a diagram of operation of the system of FIG. 1.
Figure 3:
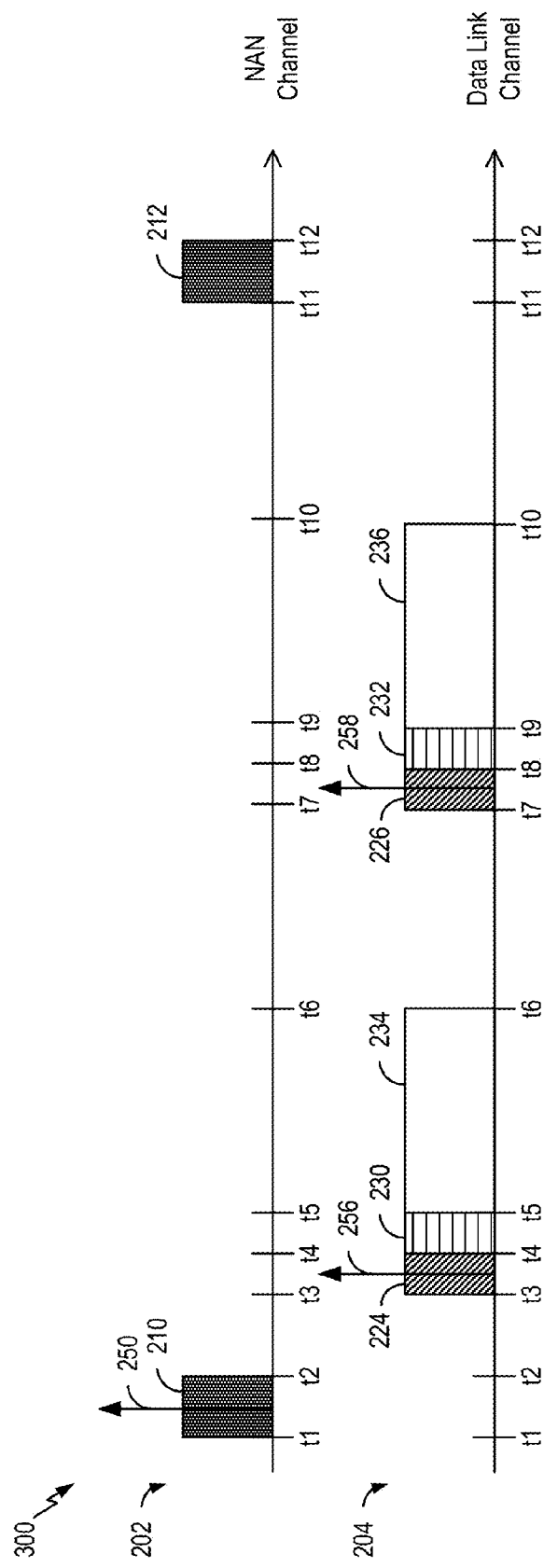
FIG. 3 is a diagram illustrating operation of a multi-hop data link of the system of FIG. 1.
Figure 4:
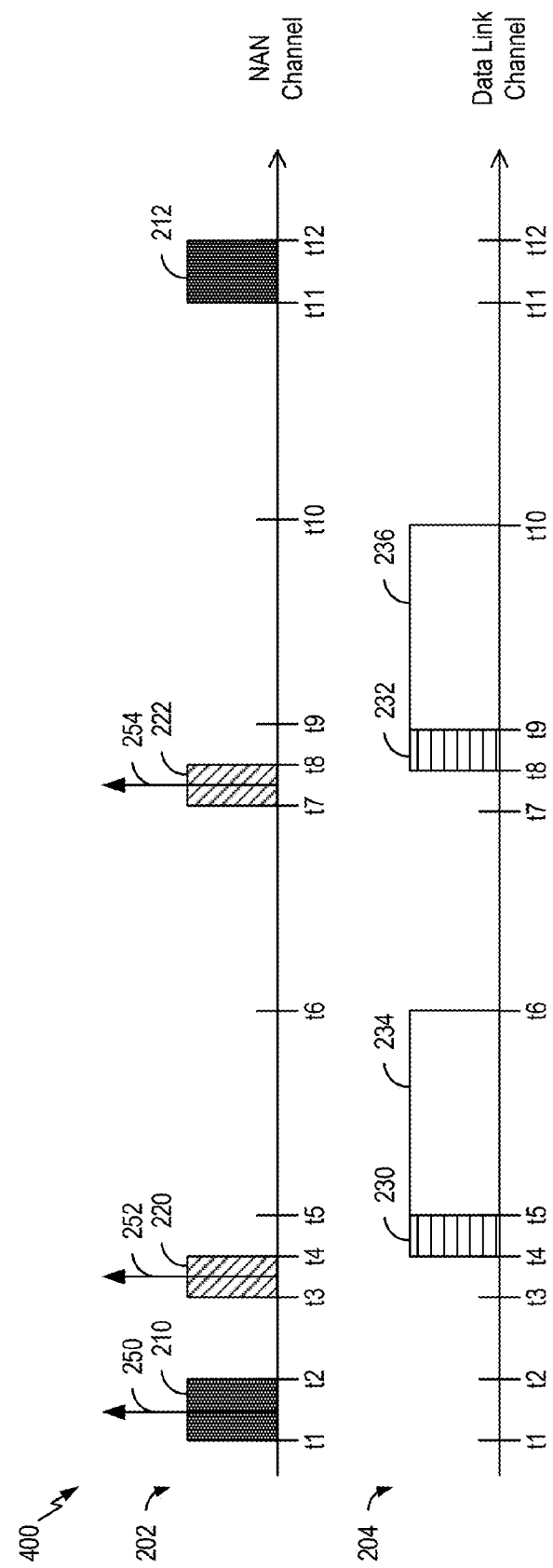
FIG. 4 is a diagram illustrating a first example of operation of a single-hop data link of the system of FIG. 1.
Figure 5:
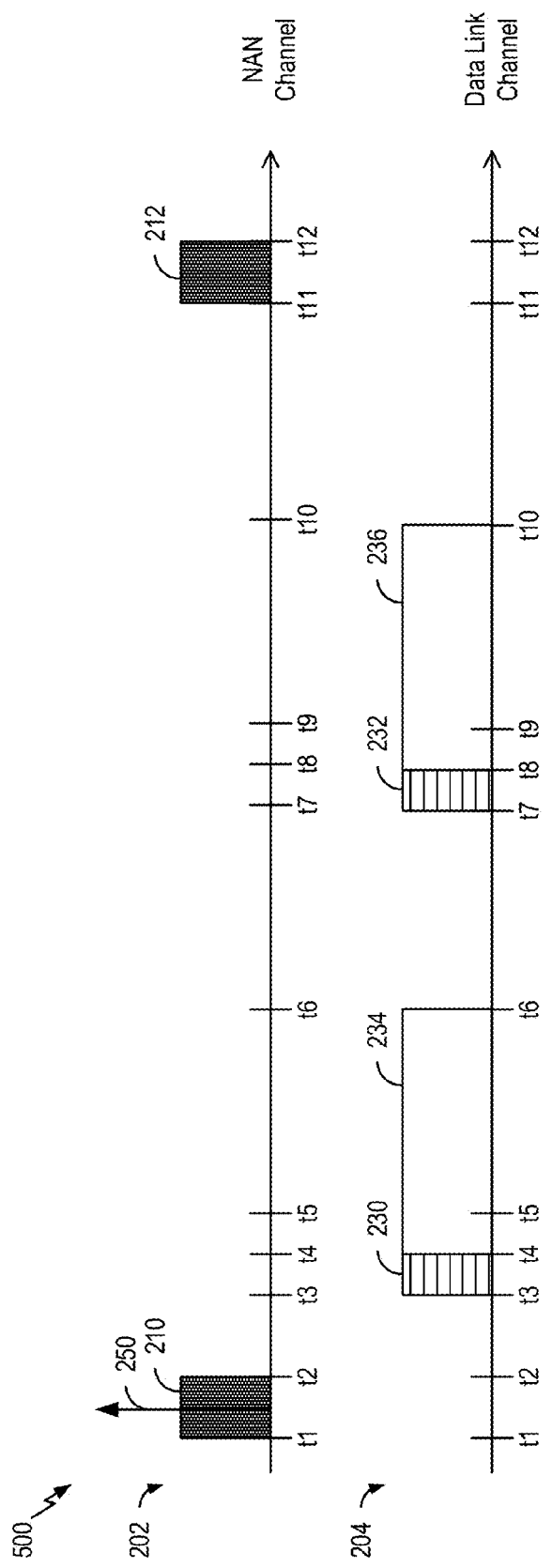
FIG. 5 is a diagram illustrating a second example of operation of a single-hop data link of the system of FIG. 1.

Referring to FIG. 2, operation at the system 100 of FIG. 1 is shown and generally designated 200. In FIG. 2, operations performed by one or more of the electronic devices 104-116 of FIG. 1 via a NAN channel 202 and a data link channel 204 are illustrated with reference to an overall timeline 206. In FIG. 2, multiple implementations described in FIG. 1 are overlaid together to illustrate timing of operations (e.g., timing related to discovery windows, paging windows, and transmission windows) among the various implementations. Timing information related to the particular implementations of data announcement messages and data announcement time periods are illustrated in FIGS. 3-5. The timing and operations shown in FIG. 2 are for illustration and are not limiting. In other implementations, additional or fewer operations may be performed and the timing may be different. In some implementations, as illustrated in FIGS. 2-5, the data link channel 204 and the NAN channel 202 may be different wireless channels. In alternate implementations, the data link channel 204 and the NAN channel 202 may be the same wireless channel.

As illustrated in FIG. 2, a first discovery window 210 and a second discovery window 212 may correspond to the NAN channel 202. As described with reference to FIG. 1, the discovery windows 210, 212 may be time periods reserved for the electronic devices 104-116 to perform discovery operations and synchronization operations corresponding to the NAN 102. A first discovery window 210 may begin at time t1 and may end at time t2, and a second discovery window 212 may begin at time t11 and end at time t12. The discovery windows 210, 212 may have a same discovery window duration (e.g., a period of time between time t1 and time t2 may be the same as a period of time between time t11 and time t12). The discovery window duration may be determined in accordance with a NAN standard or protocol. A time period between consecutive discovery windows, such as the first discovery window 210 and the second discovery window 212, may be referred to as a discovery period 248. In a particular implementation, a duration of the discovery period 248 may be 500 time units (TU) in accordance with a NAN standard or protocol. For example, each TU may correspond to 1024 microseconds (µs), as described in an IEEE 802.11-2012 specification, and 500 TUs may be approximately 512 ms.

During the first discovery window 210, a service discovery frame (SDF) 250 may be transmitted via the NAN channel 202. For example, the first electronic device 104 may transmit the SDF 250 via the NAN channel 202 to advertise a service being provided by the first electronic device 104 to the data link. In some implementations, the SDF 250 may include a service descriptor attribute and a data link attribute, as described with reference to FIG. 1. The service descriptor attribute may include one or more frames that indicate information corresponding to the service, such as the one or more service attributes 170, and the data link attribute may include one or more frames that indicate information corresponding to the data link. In other implementations, the SDF 250 may include the one or more service attributes 170 and the one or more NAN-DL attributes 180, as described further herein with reference to FIGS. 7-10. In some implementations, the SDF 250 may correspond to the data announcement 120, as further described with reference to FIG. 5. In other implementations, the SDF 250 may be distinct from the data announcement 120, as described with reference to FIGS. 3 and 4.

In some implementations, one or more paging windows may occur during the discovery period 248. In a particular implementation, if the data announcement 120 is a traffic announcement message that is transmitted via the NAN channel 202, a first NAN paging window 220 and a second NAN paging window 222 may occur during the discovery period. A first traffic announcement message 252 and a second traffic announcement message 254 may be transmitted during the NAN paging windows 220, 222, respectively, by the first electronic device 104 via the NAN channel 202, as further described with reference to FIG. 4. In another particular implementation, if the data announcement 120 is a traffic announcement message that is transmitted via the data link channel 204, a first paging window 224 and a second paging window 226 may occur during the discovery period. The first paging window 224 and the second paging window 226 may correspond to the data link, and other data links may have other corresponding paging windows. A third traffic announcement message 256 and a fourth traffic announcement message 258 may be transmitted during the data link paging windows 224, 226, respectively by the first electronic device 104 via the data link channel 204, as further described with reference to FIG. 3.

In each of the above-described implementations, one or more transmission windows may occur during the discovery period 248. For example, a first transmission window 240 and a second transmission window 242 may occur during the discovery period 248. As described with reference to FIG. 1, the transmission windows 240, 242 may be periods of time that are reserved for exchanging data transmissions between the electronic devices 104-116 via the data link channel. As illustrated in FIG. 3, the first transmission window 240 may occur from time t3 to time t6, and the second transmission window 242 may occur from time t7 to time t10. The first transmission window 240 may begin one discovery window offset 244 (e.g., from time t2 to time t3) after termination of the first discovery window 210. The discovery window offset 244 may be indicated by a data link control field of the data link attribute of the SDF 250, as described with reference to FIG. 1, or by the one or more NAN-DL attributes 180, as further described with reference to FIG. 10. The second transmission window 242 may begin one transmission window offset 246 (e.g., from time t6 to time t7) after termination of the first transmission window 240. The transmission window offset 246 may be indicated by the data link control field, as described with reference to FIG. 1, or by the one or more NAN-DL attributes 180, as further described with reference to FIG. 10. Although each of the transmission windows 240 and 242 is illustrated as including a corresponding paging window (e.g., the NAN paging windows 220 and 222 or the data link paging windows 224 and 226), in other implementations, one or more transmission windows may not include corresponding paging windows.

The first transmission window 240 may include a first data transmission portion 234 and the second transmission window 242 may include a second data transmission portion 236. In some implementations, the first data transmission portion 234 may occur from time t5 to time t6 and the second data transmission portion 236 may occur from time t9 to t10. Data corresponding to services, such as the data 122 in FIG. 1, may be exchanged between the electronic devices 104-116 during the data transmission portions 234, 236. In some implementations, the transmission windows 240, 242 may include the data link paging windows 224, 226, respectively, as further described with reference to FIG. 3. In some implementations, the transmission windows 240, 242 may include (or may start subsequent to termination of) the NAN paging windows 220, 222, respectively, as further described with reference to FIG. 4. In some implementations, the transmission windows 240, 242 may not include paging windows and may begin at times t3, t7, respectively, as further described with reference to FIG. 5. In some implementations, the transmission windows 240, 242 may include a first acknowledgement window 230 that occurs from time t4 to time t5 and a second acknowledgement window 232 that occurs from time t8 to time t9. The acknowledgement windows 230, 232 may represent time periods reserved for performing one or more acknowledgement operations. For example, in some implementations, acknowledgements such as the acknowledgement 124 of FIG. 1 may be generated and transmitted via the data link channel 204 during the acknowledgement windows 230, 232.

The timing illustrated in FIG. 2 provides may reduce power consumption at some of the electronic devices 104-116 of FIG. 1. For example, a subset of the electronic devices 106-116 may receive the data announcement 120, either as the SDF 250 during the first discovery window 210 or as one of the traffic announcement messages 252, 254, 256, 258 during the NAN paging windows 220, 222 or the data link paging windows 224, 226, respectively. Based on the data announcement 120, one or more of the electronic devices may determine that no traffic is indicated for transmission during the transmission windows 240, 242, and the one or more electronic devices may transition to the low-power operating mode during at least a portion of the transmission windows 240, 242, which may reduce power consumption at the at least one electronic device as compared to remaining in the active operating mode during an entirety of the transmission windows 240, 242.

Referring to FIG. 3, operation at the system 100 of FIG. 1 in an implementation where data announcements are traffic announcement messages that are transmitted via the data link channel 204 is shown and generally designated 300. The timing illustrated in FIG. 3 may correspond to a multi-hop data link (e.g., the data link includes the electronic devices 104-116), as described with reference to FIG. 1. The operations illustrated in FIG. 3 are not limiting. In other implementations, operations may be performed by different electronic devices of the electronic devices 104-116 and may occur more or less and at different times than illustrated in FIG. 3.

During the first discovery window 210, the first electronic device 104 may transmit the SDF 250 via the NAN channel 202. The SDF 250 may include a data link attribute that indicates information corresponding to the data link, such as timing of data link paging windows and an indication of the data link channel 204, as described with reference to FIG. 1. The first electronic device 104 may transmit the third traffic announcement message 256 (corresponding to the data announcement 120) via the data link channel 204 during the first paging window 224. During the first paging window 224, each of the electronic devices 106-116 may monitor the data link channel 204 and the electronic devices 106-112 (e.g., the electronic devices within a single-hop range of the first electronic device 104) may receive the third traffic announcement message 256. If the third traffic announcement message 256 identifies data to be transmitted to one of the electronic devices 114, 116, one or more electronic devices within a one-hop range of the electronic devices 114, 116, may generate and transmit a traffic announcement message to the electronic devices 114, 116, during a later paging window. If the electronic devices 114 and 116 do not receive a traffic announcement message during a data link paging window, the electronic devices 114 and 116 may transition to the low-power operating mode during a corresponding transmission window.

In a particular implementation, the third traffic announcement message 256 may identify the second electronic device 106 as the recipient of the data 122, as described with reference to FIG. 1. In other implementations, other electronic devices may be identified as recipients. Based on determining that the electronic devices 108-112 are not identified as recipients of the data 122, the electronic devices 108-112 may transition to the low-power operating mode during a remainder of the first transmission window 240 (e.g., the first acknowledgement window 230 and the first data transmission portion 234). Based on determining that the second electronic device 106 is identified as the recipient of the data 122, the second electronic device 106 may remain in the active operating mode and may monitor the data link channel 204 during the remainder of the first transmission window 240. In some implementations, the first transmission window 240 may include the first acknowledgement window 230, and the second electronic device 106 may transmit the acknowledgement 124 via the data link channel 204 during the first acknowledgement window 230. In other implementations, the first transmission window 240 may not include the first acknowledgement window 230, and the second electronic device 106 may transmit the acknowledgement 124 via the data link channel 204 during the first data transmission portion 234. The first electronic device 104, in response to receiving the acknowledgement 124, may send the data 122 to the second electronic device 106 via the data link channel 204 during the first data transmission portion 234.

Each of the electronic devices 104-112 that is operating in the low-power mode may transition to the active operating mode during the second paging window 226. During the second paging window 226, the first electronic device 104 may transmit the fourth traffic announcement message 258 via the data link channel 204. The electronic devices 106-112 may monitor the data link channel 204 and may receive the fourth traffic announcement message 258 via the data link channel 204 during the second paging window 226. In a particular implementation, the fourth traffic announcement message 258 may identify the third electronic device 108 and the fifth electronic device 112 as recipients of additional data. Based on determining that the electronic devices 106 and 110 are not identified as recipients of the data 122, the electronic devices 106 and 110 may transition to the low-power operating mode during a remainder of the second transmission window 242 (e.g., the second acknowledgement window 232 and the second data transmission portion 236). Based on determining that the electronic devices 108 and 112 are identified as the recipients of the additional data, the electronic devices 108 and 112 may remain in the active operating mode and may perform acknowledgement operations and may receive the additional data via the data link channel 204 in a similar manner to the second electronic device 106 during the first transmission window 240.

Although each of the transmission windows 240 and 242 is illustrated as including a corresponding paging window, in other implementations, one or more transmission windows may not include corresponding paging windows, as described further with reference to FIG. 10. For example, the first transmission window 240 may include the first paging window 224 and the second transmission window 242 may not include a paging window. In this example, the electronic devices may operate in the same operating mode during a transmission window that includes a paging window and during a subsequent transmission window that does not include a paging window. The electronic devices may remain in the same operating mode because a pattern of data transmissions (e.g., a traffic session) may be the same during subsequent transmission windows that do not include paging windows. To illustrate, if the second electronic device 106 is identified as a recipient of the data 122 by the third traffic announcement message 256 transmitted during the first paging window 224, the second electronic device 106 may remain in the active operating mode during the first transmission window 240, and the electronic devices 108-112 may transition into the low-power operating mode during the first transmission window 240. The second electronic device 106 may remain in the active operating mode during the second transmission window 242 to receive additional data by participating in another traffic session, and the electronic devices 108-112 may remain in the low-power operating mode during the second transmission window 242.

The operation of the system 100 illustrated in FIG. 3 allow one or more electronic devices of a multi-hop data link to reduce power consumption by changing an operating mode to a low-power operating mode based on a traffic announcement message transmitted via the data link channel 204.

Referring to FIG. 4, operation at the system 100 of FIG. 1 in an implementation where data announcements are traffic announcement messages that are transmitted via the NAN channel 202 is shown and generally designated 400. The timing illustrated in FIG. 4 may correspond to a single-hop data link (e.g., the data link includes the electronic devices 104-112), as described with reference to FIG. 1. The operations illustrated in FIG. 4 are not limiting. In other implementations, operations may be performed by different electronic devices of the electronic devices 104-112 and may occur more or less and at different times than illustrated in FIG. 4.

During the first discovery window 210, the first electronic device 104 may transmit the SDF 250 via the NAN channel 202. The SDF 250 may include a data link attribute that indicates information corresponding to the data link, such as timing of data link paging windows and an indication of the data link channel 204, as described with reference to FIG. 1. The first electronic device 104 may transmit the first traffic announcement message 252 (corresponding to the data announcement 120) via the NAN channel 202 during the first NAN paging window 220. During the first NAN paging window 220, each of the electronic devices 106-112 may monitor the NAN channel 202 and may receive the first traffic announcement message 252.

In a particular implementation, the first traffic announcement message 252 may identify the second electronic device 106 as the recipient of the data 122, as described with reference to FIG. 1. In other implementations, other electronic devices may be identified as recipients. Based on determining that the electronic devices 108-112 are not identified as recipients of the data 122, the electronic devices 108-112 may transition to the low-power operating mode during a remainder of the first transmission window 240 (e.g., the first acknowledgement window 230 and the first data transmission portion 234). Additionally, the electronic devices 108-112 may not change a configuration of a transmitter and a receiver (or a transceiver). For example, the transmitter and the receiver may continue transmitting and receiving data via the NAN channel 202. Based on determining that the second electronic device 106 is identified as the recipient of the data 122, the second electronic device 106 may remain in the active operating mode, may configure a transmitter and a receiver (or a transceiver) to transmit and receive data via the data link channel 204, and may monitor the data link channel 204 during the remainder of the first transmission window 240. In some implementations, the first transmission window 240 may include the first acknowledgement window 230, and the second electronic device 106 may transmit the acknowledgement 124 via the data link channel 204 during the first acknowledgement window 230. In other implementations, the first transmission window 240 may not include the first acknowledgement window 230, and the second electronic device 106 may transmit the acknowledgement 124 via the data link channel 204 during the first data transmission portion 234. The first electronic device 104, in response to receiving the acknowledgement 124, may transmit the data 122 to the second electronic device 106 via the data link channel 204 during the first data transmission portion 234.

Each of the electronic devices 104-112 that is operating in the low-power operating mode may transition to the active operating mode during the second NAN paging window 222. During the second NAN paging window 222, the first electronic device 104 may transmit the fourth traffic announcement message 258 via the NAN channel 202. The electronic devices 106-112 may monitor the NAN channel 202 and may receive the second traffic announcement message 254 via the NAN channel 202 during the second NAN paging window 222. In a particular implementation, the second traffic announcement message 254 may identify the third electronic device 108 and the fifth electronic device 112 as recipients of additional data. Based on determining that the electronic devices 106 and 110 are not identified as recipients of the data 122, the electronic devices 106 and 110 may transition to the low-power operating mode during a remainder of the second transmission window 242 (e.g., the second acknowledgement window 232 and the second data transmission portion 236). Additionally, the electronic devices 106 and 110 may configure a transmitter and a receiver (or a transceiver) to continue transmitting and receiving data via the NAN channel 202. Based on determining that the electronic devices 108 and 112 are identified as the recipients of the additional data, the electronic devices 108 and 112 may remain in the active operating mode, may configure a transmitter and a receiver (or a transceiver) to transmit and receive data via the data link channel 204, and may perform acknowledgement operations and may receive the additional data via the data link channel 204 in a similar manner to the second electronic device 106 during the first transmission window 240.

The operation of the system 100 illustrated in FIG. 4 may allow one or more electronic devices of a single-hop data link to reduce power consumption by preventing the one or more electronic devices from changing a configuration of a transmitter and a receiver (or a transceiver) from the NAN channel 202 to the data link channel 204 based the traffic announcement messages 252, 254.

Referring to FIG. 5, operation at the system 100 of FIG. 1 in an implementation where the data announcement corresponds to the SDF 250 that is transmitted via the NAN channel 202 is shown and generally designated 500. The timing illustrated in FIG. 5 may correspond to a single-hop data link (e.g., the data link includes the electronic devices 104-112), as described with reference to FIG. 1. The operations illustrated in FIG. 5 are not limiting. In other implementations, operations may be performed by different electronic devices of the electronic devices 104-112 and may occur more or less and at different times than illustrated in FIG. 5.

During the first discovery window 210, the first electronic device 104 may transmit the SDF 250 via the NAN channel 202. The SDF 250 may include a data link attribute that indicates information corresponding to the data link, such as timing of data link paging windows and an indication of the data link channel 204, as described with reference to FIG. 1. The SDF 250 may also include a service descriptor attribute (e.g., one or more fields) that includes a service response filter (SRF) field that indicates a subset of the electronic devices that are to receive data. In this manner, the SDF 250 may correspond to the data announcement 120 of FIG. 1. The data link attribute of the SDF 250 may identify the SRF field of the SDF 250 as a data announcement. In accordance with a NAN standard or protocol, each of the electronic devices 106-112 may monitor the NAN channel 202 during the first discovery window 210 and may receive the SDF 250.

In a particular implementation, the SDF 250 may identify the second electronic device 106 as the recipient of the data 122, as described with reference to FIG. 1. In other implementations, other electronic devices may be identified as recipients. Based on determining that the electronic devices 108-112 are not identified as recipients of the data 122, the electronic devices 108-112 may transition to the low-power operating mode during a remainder of the first transmission window 240 (e.g., the first acknowledgement window 230 and the first data transmission portion 234). Additionally, the electronic devices 108-112 may not change a configuration of a transmitter and a receiver (or a transceiver). For example, the transmitter and the receiver may continue transmitting and receiving data via the NAN channel 202. Based on determining that the second electronic device 106 is identified as the recipient of the data 122, the second electronic device 106 may remain in the active operating mode, may configure a transmitter and a receiver (or a transceiver) to transmit and receive data via the data link channel 204, and may monitor the data link channel 204 during the remainder of the first transmission window 240. In some implementations, the first transmission window 240 may include the first acknowledgement window 230, and the second electronic device 106 may transmit the acknowledgement 124 via the data link channel 204 during the first acknowledgement window 230. In other implementations, the first transmission window 240 may not include the first acknowledgement window 230, and the second electronic device 106 may transmit the acknowledgement 124 via the data link channel 204 during the first data transmission portion 234. The first electronic device 104, in response to receiving the acknowledgement 124, may transmit the data 122 to the second electronic device 106 via the data link channel 204 during the first data transmission portion 234. Because the SDF 250 applies to each transmission window in the discovery period 248, during the second transmission window 242, the electronic devices 104-112 may operate in the same operating modes and may perform the same functions as during the first transmission window 240.

The operation of the system 100 illustrated in FIG. 5 may allow one or more electronic devices of a single-hop data link to reduce power consumption by preventing the one or more electronic devices from changing a configuration of a transmitter and a receiver (or a transceiver) from the NAN channel 202 to the data link channel 204 based the SDF 250. Additionally, the implementation of FIG. 5 may further reduce power consumption of the one or more electronic devices as compared to the implementations of FIGS. 3 and 4, because the one or more electronic devices may not have to operate in the active operating mode during paging windows.

Figure 6:
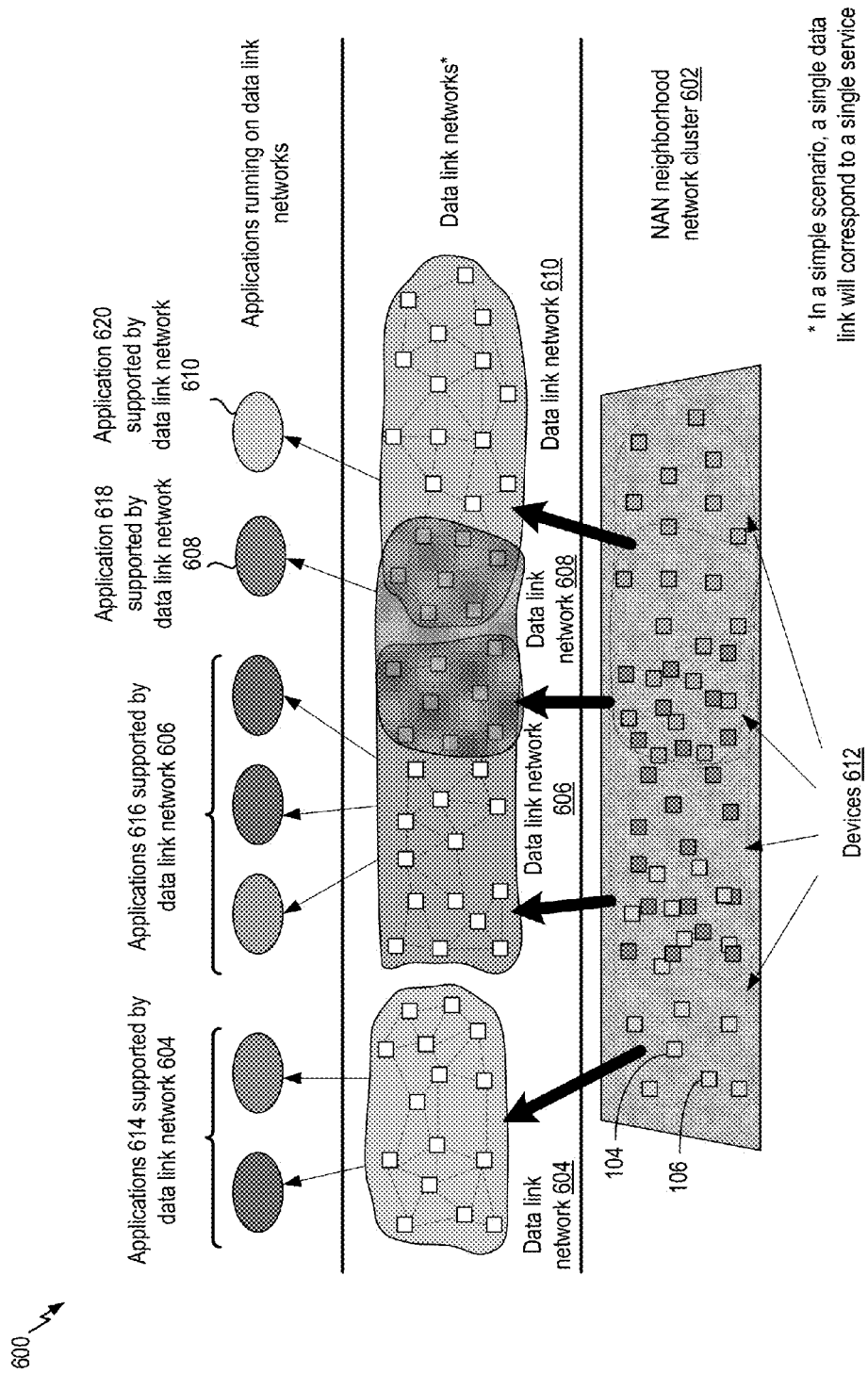
FIG. 6 is a diagram of a system operable to perform data link network communication. The system of FIG. 6 may include one or more of the electronic devices of FIG. 1.

Referring to FIG. 6, a particular implementation of a system is shown and generally designated 600. In a particular implementation, the system 600 may include one or more of the electronic devices 104-116 of FIG. 1.

The system 600 may include a NAN cluster 602. Devices 612 may participate in the NAN cluster 602. Clocks of the devices 612 may be synchronized to enable the devices 612 to wake up (e.g., switch to an active operating mode) periodically during discovery windows of the NAN cluster 602. For example, the clocks may include or correspond to the timing and/or counting circuitry 2274, 2276, of FIG. 22. Each electronic device of the devices 612 may monitor a same NAN channel during the discovery windows. In a particular implementation, the NAN cluster 602 may be identified by a NAN cluster identifier (ID). The NAN cluster ID may be included in each NAN message, such as in a discovery message. An electronic device that initiates formation of the NAN cluster 602 may select the corresponding NAN cluster ID.

A subset of the devices 612 may transmit synchronization beacons via the NAN channel corresponding to the NAN cluster 602. Discovery messages and synchronization beacons may be transmitted by one or more of the devices 612 during the discovery windows over the NAN channel.

A subset of the devices 612 may transmit discovery beacons over the NAN channel corresponding to the NAN cluster 602. A discovery beacon may be used by an electronic device to discover the NAN cluster 602 to enable the electronic device to join the NAN cluster 602, in accordance with a NAN standard or protocol.

In a particular implementation, the NAN cluster 602 may have a tree structure anchored at a particular electronic device of the devices 612 called an anchor master. A timing (or time information) of the anchor master may be propagated to all devices 612 of the NAN cluster 602 via NAN synchronization (sync) devices and NAN master devices. The NAN sync devices and the NAN master devices may provide time synchronization within the NAN cluster 602.

There may be one or more data link networks (e.g., a data link network 604, a data link network 606, a data link network 608, and a data link network 610) corresponding to the NAN cluster 602. Data links within the NAN cluster 602 may also be referred to as NAN data links (NAN-DLs). As described with reference to FIG. 1, the data links may be single-hop data links or multi-hop data links. In a particular implementation, the data link networks (e.g., the data link networks 604-610) or the NAN-DLs may correspond to distinct applications, distinct types of electronic devices, distinct operating systems, or a combination thereof. In a particular implementation, the data link of FIG. 1 and/or the data link channel 204 of FIGS. 2-5 may correspond to the data link network 604, the data link network 606, the data link network 608, or the data link network 610.

In a particular implementation, the data link network 604 may include a first subset of the devices 612, the data link network 606 may include a second subset of the devices 612, the data link network 608 may include a third subset of the devices 612, and the data link network 610 may include a fourth subset of the devices 612. In a particular implementation, the first subset may overlap the second subset, may overlap the third subset, may overlap the fourth subset, or a combination thereof. For example, a particular electronic device of the devices 612 may join multiple data link networks (e.g., the data link networks 604, 606, 608, and/or 610) or multiple NAN-DLs. To illustrate, the particular electronic device may be a provider electronic device of a first service in a particular data link network (e.g., the data link network 604) or a particular NAN-DL, may be a "consumer" electronic device of the first service, a second service, and/or a third service in another data link network (e.g., the data link networks 606, 608, and/or 610) or another NAN-DL, or a combination thereof. A consumer device refers to an electronic device that receives or accesses a service provided by another electronic device.

In a particular implementation, a particular data link network or NAN-DL may correspond to a single application or service. In an alternative implementation, a particular data link network or NAN-DL may correspond to multiple applications or services. For example, each of the data link networks 604, 606, 608, and 610 may correspond to one or more applications 614, 616, 618, and 620, respectively. In a particular implementation, the data link network 604 may correspond to two applications 614, the data link network 606 may correspond to three applications 616, the data link network 608 may correspond to one application 618, and the data link network 610 may correspond to one application 620, as illustrated in FIG. 6. A particular service may correspond to each of the one or more applications 614, 616, 618, and 620. For example, the service provided by the first electronic device 104 may correspond to one of the two applications 614 if the data link corresponds to the data link network 604. In other implementations, multiple data link networks or multiple NAN-DLs may correspond to different instances of a single application or service. For example, a gaming service may have a chess instance and a checkers instance, and each instance may correspond to a different data link network or NAN-DL.

In a particular implementation, at least the first electronic device 104 and the second electronic device 106 of FIG. 1 may be included in the devices 612, and may participate in the data link network 604. In other implementations, the first electronic device 104 and the second electronic device 106 may participate in the data link networks 606, 608, and/or 610. If the first electronic device 104 offers a service (e.g., a service corresponding to one or more of the applications 614) and has data to transmit to another electronic device, the first electronic device 104 may transmit the data announcement 120 of FIG. 1 to a subset of the devices 612 (including the second electronic device 106) corresponding to the data link network 604. In a particular implementation, the data announcement 120 may be a traffic announcement messages that is transmitted over a data link channel (e.g., the data link channel 204) corresponding to the data link network 604. In another implementation, the data announcement 120 may be a traffic announcement message that is transmitted over the NAN channel corresponding to the NAN cluster 602. In yet another implementation, the data announcement 120 may be a SDF that is transmitted over the NAN channel corresponding to the NAN cluster 602. The data announcement 120 may indicate one or more of the devices 612 (e.g., the second electronic device 106) as recipients of data. In response to receiving the data announcement 120, the second electronic device 106 may transmit the acknowledgement 124 to the first electronic device 104 and may receive the data 122 from the first electronic device 104 over the data link channel corresponding to the data link network 604.

The system 600 may enable a provider electronic device to provide data corresponding to a particular application to other electronic devices in a same data link network. When the provider electronic device has data to provide to the other electronic devices in the same data link network, the provider device may transmit a data announcement message (e.g., the data announcement 120 of FIG. 1) to the other electronic devices. One or more electronic devices in the data link network that receive the data announcement message and are not identified as recipients of data in the data announcement message may transition into the low-power operating mode or may perform activities via other networks, thereby reducing power consumption or providing additional services at one or more electronic devices in the data link network.

Figure 7:
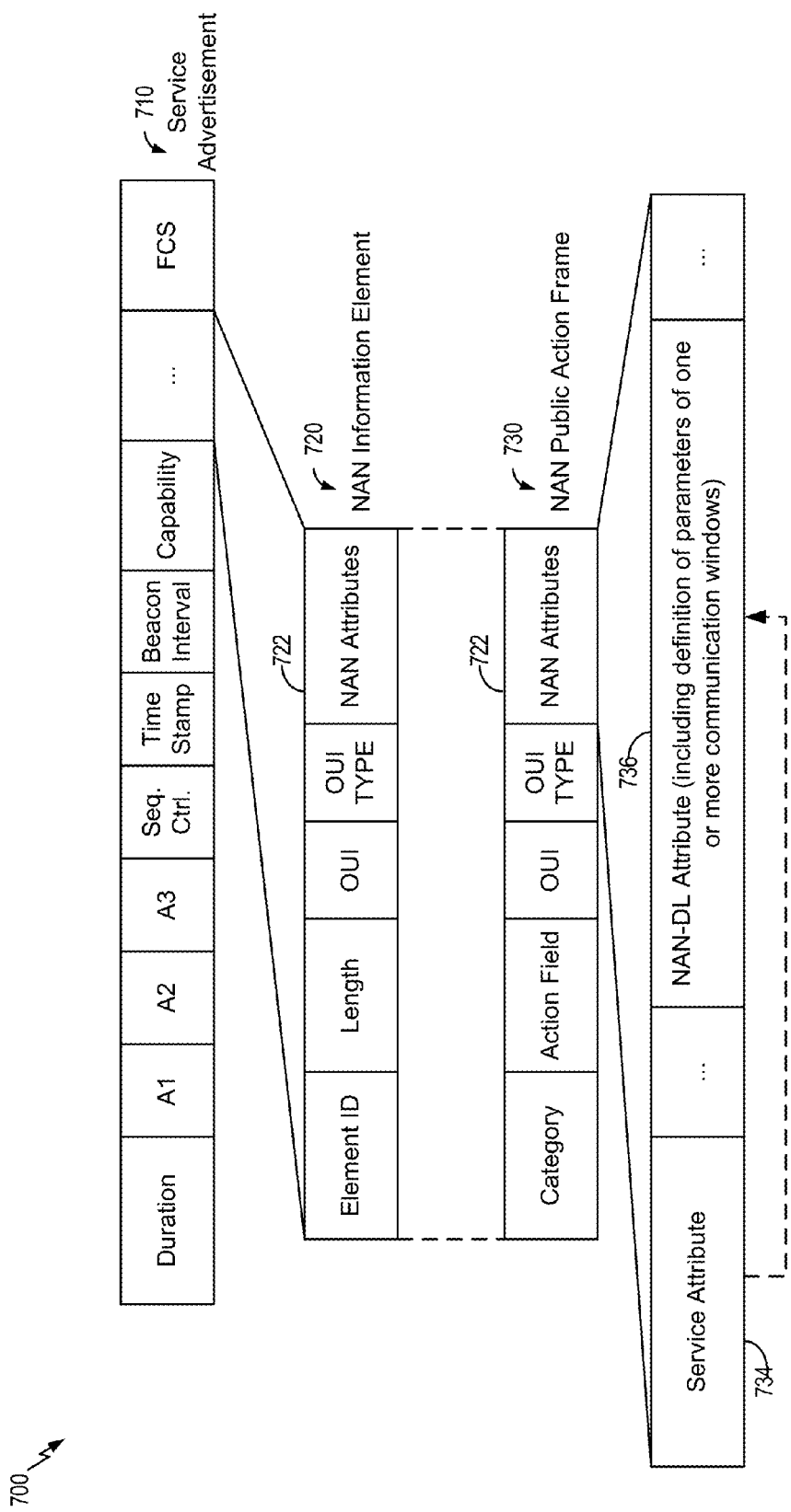
FIG. 7 is a diagram illustrating an example of a service advertisement.

Referring to FIG. 7, a diagram 700 of an example of a service advertisement 710 is shown. In a particular implementation, the service advertisement 710 may include or correspond to the data announcement 120. For example, if the data announcement 120 is the SDF, the service advertisement 710 may correspond to the SDF. In other implementations, the service advertisement 710 may include or correspond to a beacon message. The service advertisement 710 may include header fields, such as a duration field, address fields A1, A2, and A3, a sequence control (seq. ctl.) field, a time stamp field, a beacon interval field, a capability field, a frame check sequence (FCS) field, or a combination thereof. In a particular implementation, the A3 field may indicate a NAN cluster ID.

The service advertisement 710 may further include a NAN information element 720 or a NAN public action frame 730. For example, the NAN information element 720 may correspond to a beacon message, and the NAN public action frame 730 may correspond to a NAN service discovery frame. The NAN information element 720 may include an element ID field, a length field, an organizationally unique identifier (OUI) field, an OUI type field, or a combination thereof. The NAN public action frame 730 may include a category field, an action field, an OUI field, an OUI type field, or a combination thereof. Both the NAN information element 720 and the NAN public action frame 730 may include one or more NAN attributes 722.

Figure 9:
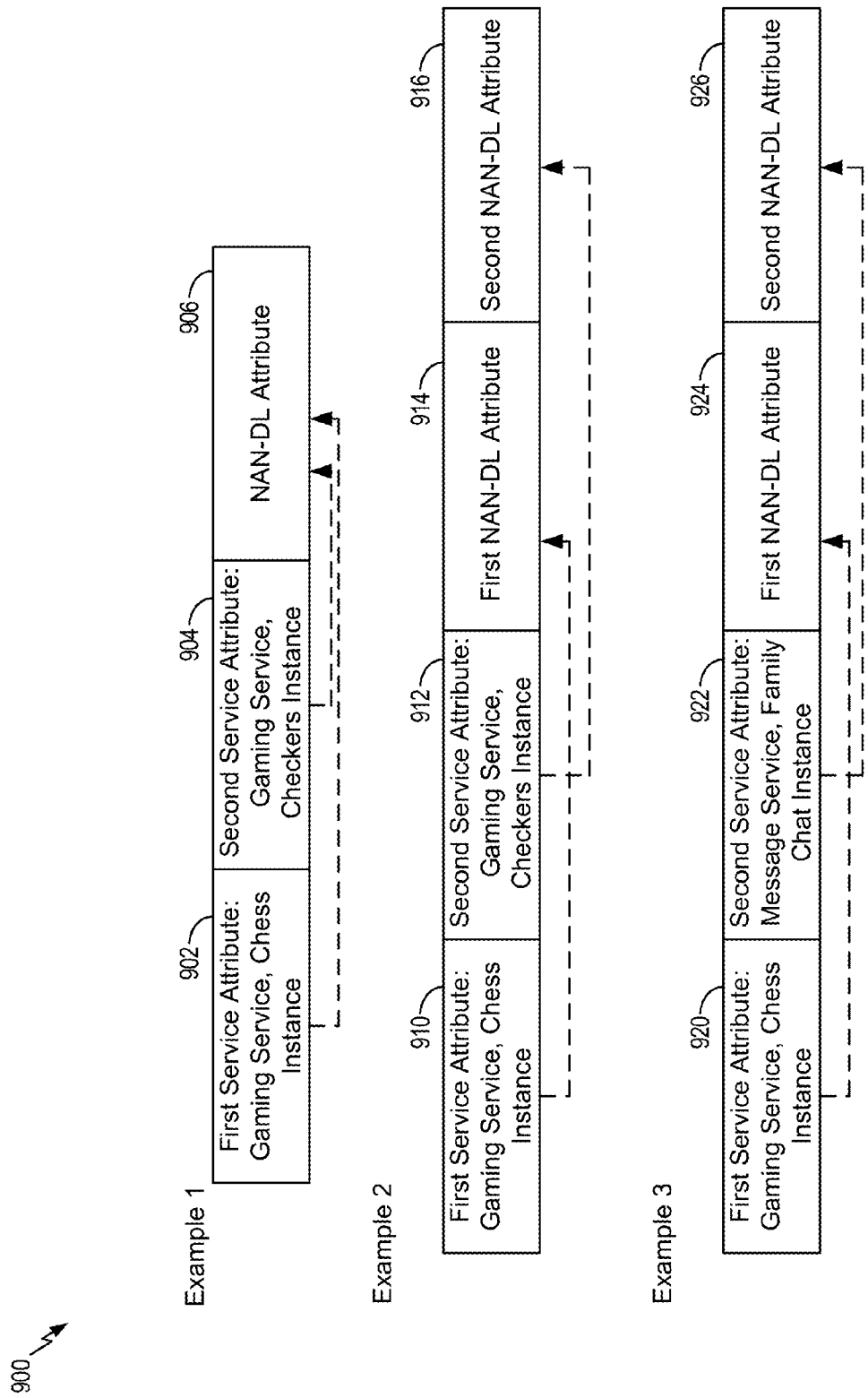
FIG. 9 is a diagram illustrating examples of service instances mapped to NAN-DL attributes.

In the illustrated example, the one or more NAN attributes 722 include a service attribute 734 and a NAN-DL attribute 736. In other examples, the NAN attributes 722 may include more than one service attribute and/or more than one NAN-DL attribute. The service attribute 734 may include data descriptive of a service (e.g., a gaming service) offered by a provider device, such as the first electronic device 104 of FIG. 1. The service attribute 734 may include an indicator that identifies the NAN-DL attribute 736, as described further herein with reference to FIG. 9. The NAN-DL attribute 736 may be descriptive of a NAN-DL used to provide the service described by or corresponding to the service attribute 734. The NAN-DL attribute 736 may define one or more parameters of one or more communication windows corresponding to the NAN data link, as further described herein with reference to FIG. 10. As a particular example, the NAN-DL attribute 736 may indicate a paging window repetition rate corresponding to the NAN-DL. Thus, the service advertisement 710 may identify one or more services and one or more NAN data links, and the service advertisement 710 may map the one or more services to the one or more NAN-DLs. Additional examples of mapping services to NAN-DLs are illustrated in FIG. 9.

In some implementations, the NAN-DL attribute 736 may indicate one or more logical channels corresponding to the NAN-DL. For example, one of the fields of the NAN-DL attribute 736 may indicate the one or more logical channels. In some implementations, the NAN-DL attribute 736 may indicate a logical channel selected by a provider device. In other implementations, the NAN-DL attribute 736 may indicate a set of logical channels that are available for use by the provider device. The NAN-DL attribute 736 may indicate the one or more logical channels using one or more indices or a channel number (or other channel identifier). In other implementations, the one or more NAN attributes 722 may include a FAA that indicates the one or more logical channels, as described with reference to FIG. 1.

Referring to FIG. 8, a diagram 800 illustrating examples of a service attribute 810 and a NAN-DL attribute 820 is shown. The service attribute 810 may include or correspond to the service attributes 170 or to the service attribute 734 and the NAN-DL attribute 820 may include or correspond to the NAN-DL attributes 180 or to the NAN-DL attribute 736.

The service attribute 810 may include an attribute ID field 811 that includes a value that identifies the service attribute 810 as a service attribute. To illustrate, a message (e.g., the service advertisement 710) may include attributes selected from a plurality of attribute types. A particular value (e.g., hexadecimal value 0x0A) included in the attribute ID field 811 may identify the service attribute 810 as a service attribute.

The service attribute 810 may further include a length field that includes a value identifying a length of the service attribute 810. The service attribute 810 may further include a service ID field 812 that includes a value identifying a service described by the service attribute 810. For example, the service ID field 812 may include a value that corresponds to a gaming service or a messaging service. In a particular example, the service ID includes a hash value generated based on a service name (e.g., "Gaming").

The service attribute 810 may further include an instance ID field 813 that identifies an instance of the service described by the service attribute 810. To illustrate, a provider device (e.g., the first electronic device 104) may support two or more instances of a service. For example, the service may be a gaming service, and the provider device may support two instances of the gaming service, a chess instance and a checkers instance. The instance ID field 813 may identify an instance of the service that the service attribute 810 describes. For example, the instance ID field 813 may include a first value that corresponds to a chess instance of the gaming service.

The service attribute 810 may further include a "binding" bitmap field 814 (e.g., an indicator). The binding bitmap field 814 may include a bitmap that indicates a NAN-DL attribute included in a message with the service attribute 810. That is, the bitmap indicates a NAN-DL (of one or more NAN-DLs in a message) that is used to provide the service (or service instance) described by the service attribute 810. To illustrate, a message (such as the service advertisement 710) may include one or more NAN-DL attributes. A binding bitmap value of 0x0001 may identify a first NAN-DL attribute included in the message. A binding bitmap value of 0x0002 may identify a second NAN-DL attribute included in the message. In other implementations, other values may indicate other NAN-DL attributes. In this manner, the binding bitmap field 814 may include an indicator, such as the binding bitmap, that identifies a NAN-DL that is used to provide the service (or service instance) described by the service attribute 810. While the service attribute 810 is shown including the binding bitmap field 814, other types of indicators may be used to identify a NAN-DL attribute descriptive of a NAN-DL used to provide the service (or service instance).

The service attribute 810 may further include a requester instance ID field, a service control field, a service information length field 815, and a service information field 816. The service information length field 815 may include a value indicating a length of the service information field 816. The service information field 816 may include information regarding the service (or service instance) described by the service attribute 810. For example, the service information field 816 may include information describing a chess game service instance. In other implementations, service attributes may include more fields or fewer fields than are illustrated in FIG. 8.

The NAN-DL attribute 820 may include an attribute ID field 821 that includes a value that identifies the NAN-DL attribute 820 as a NAN-DL attribute. The NAN-DL attribute 820 may further include a length field, an OUI field, a vendor attribute type field, and a NAN-DL channel field 822 that includes a value indicating a channel the NAN-DL operates on. For example, the NAN-DL channel field 822 may identify a wireless channel via which data is transmitted between devices of the NAN-DL. The wireless channel may be similar to the data link channel described with reference to FIGS. 2-5. The NAN-DL attribute 820 may further include a NAN-DL control field 823. The NAN-DL control field 823 may define one or more parameters of one or more communication windows corresponding to the NAN-DL, as further described herein with reference to FIG. 10. As a particular example, the NAN-DL control field 823 may indicate a paging window repetition rate corresponding to the NAN-DL. The NAN-DL attribute 820 may further include a NAN-DL group ID field 824 that includes a value naming the NAN-DL. For example, the NAN-DL Group ID field 824 may identify the NAN-DL group as a "Chess group" when the NAN-DL attribute 820 corresponds to the chess instance of the gaming service. In other implementations, NAN-DL attributes may include more fields or fewer fields than are illustrated in FIG. 8.

Thus, the diagram 800 illustrates a service attribute that may indicate or identify a NAN-DL attribute used to provide a service (or service instance) described by the service attribute. Examples of messages that include service attributes that indicate NAN-DL attributes are described further herein with reference to FIG. 9.

Referring to FIG. 9, a diagram 900 illustrating examples of service instances mapped to NAN-DL attributes is shown. In a first example, a message (e.g., the service advertisement 710) that includes two service attributes describing different instances of a common service that identify a common NAN-DL is shown. The message includes a first service attribute 902, a second service attribute 904, and a NAN-DL attribute 906. The first service attribute 902 and the second service attribute 904 may include fields as illustrated with respect to the service attribute 810 of FIG. 8.

The first service attribute 902 may correspond to a first instance (e.g., chess) of a service offered by a provider device (e.g., the first electronic device 104), and the second service attribute 904 may correspond to a second instance (e.g., checkers) of the service offered by the provider device. To illustrate, the first service attribute 902 may include a field corresponding to the service ID field 812. The service ID field 812 may include a value that indicates that the first service attribute 902 describes the gaming service. The first service attribute 902 may further include a field corresponding to the instance ID field 813 that indicates that the first service attribute 902 describes a chess instance of the gaming service. The first service attribute 902 may further include a field corresponding to the binding bitmap field 814 that includes a value identifying the NAN-DL attribute 906. For example, the binding bitmap field 814 may include a value 0x0001 identifying a first NAN-DL attribute included in the message (e.g., the NAN-DL attribute 906). The first service attribute 902 may further include a field corresponding to the service information field 816 that includes information describing the chess instance of the gaming service.

The second service attribute 904 may include a field corresponding to the service ID field 812. The service ID field 812 may include a value that indicates that the second service attribute 904 describes the gaming service. The second service attribute 904 may further include a field corresponding to the instance ID field 813 that indicates that the second service attribute 904 describes a checkers instance of the gaming service. The second service attribute 904 may further include a field corresponding to the binding bitmap field 814 that includes a value identifying the NAN-DL attribute 906. For example, the binding bitmap field 814 may include a value 0x0001 identifying a first NAN-DL attribute included in the message (e.g., the NAN-DL attribute 906). The second service attribute 904 may further include a field corresponding to the service information field 816 that includes information describing the checkers instance of the gaming service.

The NAN-DL attribute 906 may include fields as illustrated with respect to the NAN-DL attribute 820 of FIG. 8. For example, the NAN-DL attribute 906 may include a field corresponding to the attribute ID field 821. The attribute ID field 821 may include a value that indicates the NAN-DL attribute 906 is a NAN-DL attribute. The NAN-DL attribute 906 may further include a field corresponding to the NAN-DL channel field 822 that indicates a channel (e.g., 48) used for communication by electronic devices of the NAN-DL described by the NAN-DL attribute 906. For example, the NAN-DL channel field 822 may identify a wireless channel used by electronic devices of the NAD-DL to transmit or receive data. The NAN-DL attribute 906 may further include a field corresponding to the NAN-DL control field 823 that defines parameters of one or more communication windows corresponding to the NAN-DL, as further described with reference to FIG. 10. The NAN-DL attribute 906 may further include a field corresponding to the NAN-DL group ID field 824 that includes a field identifying a group name ("e.g., Gaming Group") of the NAN-DL described by the NAN-DL attribute 906. Thus, in the first example, a message may advertise two different instances of a service and indicate that both instances are provided by a provider device via a common NAN-DL.

In a second example, a message (e.g., the service advertisement 710) that includes two service attributes describing different instances of a common service that identify different NAN-DLs is shown. The message includes a first service attribute 910, a second service attribute 912, a first NAN-DL attribute 914, and a second NAN-DL attribute 916.

The first service attribute 910 may correspond to a first instance (e.g., chess) of a service offered by a provider device (e.g., the first electronic device 104), and the second service attribute 912 may correspond to a second instance (e.g., checkers) of the service offered by the provider device. As explained above, the first service attribute 910 and the second service attribute 912 may include a service ID field 812 that indicates that the first service attribute 910 and the second service attribute 912, respectively, describe a gaming service. The first service attribute 910 and the second service attribute 912 may each further include an instance ID field 813 and a service information field 816. The instance ID field 813 of the first service attribute 910 may indicate that the first service attribute 910 describes a chess instance of the gaming service, and the service information field 816 of the first service attribute 910 may include information describing the chess instance of the gaming service. The instance ID field 813 of the second service attribute 912 may indicate that the second service attribute 912 describes a checkers instance of the gaming service, and the service information field 816 of the second service attribute 912 may include information describing the checkers instance of the gaming service.

The first service attribute 910 may also include a binding bitmap field 814 that includes a value identifying the first NAN-DL attribute 914. For example, the binding bitmap field 814 of the first service attribute 910 may include a value 0x0001 identifying a first NAN-DL attribute included in the message (e.g., the first NAN-DL attribute 914). The second service attribute 912 may also include a binding bitmap field 814 that includes a value identifying the second NAN-DL attribute 916. For example, the binding bitmap field 814 of the second service attribute 912 may include a value 0x0002 identifying a second NAN-DL attribute included in the message (e.g., the second NAN-DL attribute 916). Thus, by including binding bitmap fields 814 with different values, the first service attribute 910 and the second service attribute 912 may identify different NAN-DLs.

The first NAN-DL attribute 914 may include fields as illustrated with respect to the NAN-DL attribute 820 of FIG. 8. For example, the first NAN-DL attribute 914 may include an attribute ID field 821 that includes a value that indicates the first NAN-DL attribute 914 is a NAN-DL attribute. The first NAN-DL attribute 914 may further include a NAN-DL channel field 822 that indicates a channel (e.g., 48) used for communication by electronic devices of the NAN-DL described by the first NAN-DL attribute 914. The first NAN-DL attribute 914 may further include a NAN-DL control field attribute that defines parameters of one or more communication windows corresponding to the NAN-DL described by the first NAN-DL attribute 914. The first NAN-DL attribute 914 may further include a NAN-DL group ID field that includes a field identifying a group name ("e.g., Chess Gaming Group") of the NAN-DL described by the first NAN-DL attribute 914.

The second NAN-DL attribute 916 may include fields as illustrated with respect to the NAN-DL attribute 820 of FIG. 8. For example, the second NAN-DL attribute 916 may include an attribute ID field that includes a value that indicates the second NAN-DL attribute 916 is a NAN-DL attribute. The second NAN-DL attribute 916 may further include a NAN-DL channel field that indicates a channel (e.g., 30) used for communication by electronic devices of the NAN-DL described by the second NAN-DL attribute 916. The channel indicated by the second NAN-DL attribute 916 may be different than the channel indicated by the first NAN-DL attribute 914. The second NAN-DL attribute 916 may further include a NAN-DL control field attribute that defines parameters of one or more communication windows corresponding to the NAN-DL described by the second NAN-DL attribute 916. The parameters of the one or more communication windows may be different for the second NAN-DL attribute 916 than for the first NAN-DL attribute 914. The second NAN-DL attribute 916 may further include a NAN-DL group ID field that includes a field identifying a group name ("e.g., Checkers Gaming Group") of the NAN-DL described by the second NAN-DL attribute 916.

Thus, in the second example, a message may advertise two different instances of a service and indicate that the instances are provided by a provider device via different NAN-DLs. The different instances may be provided via different channels and may have different communication window parameters.

In a third example, a message (e.g., the service advertisement 710) that includes two service attributes describing different services that identify different NAN-DLs is shown. The message includes a first service attribute 920, a second service attribute 922, a first NAN-DL attribute 924, and a second NAN-DL attribute 926.

In the third example, the first service attribute 920 and the second service attribute 922 correspond to different services. For example, the first service attribute 920 may correspond to an instance (e.g., chess) of a first service offered by a provider device (e.g., the first electronic device 104) and the second service attribute 922 may correspond to an instance (e.g., family messaging) of a second service offered by the provider device. To illustrate, the first service attribute 920 may include a service ID field that includes a value that indicates that the first service attribute 920 describes a gaming service, and the second service attribute 922 may include a service ID field that includes a value that indicates that the second service attribute 922 describes a messaging service. The first service attribute 920 and the second service attribute 922 may also include the fields described above with respect to the first and second examples that describe the gaming service or the messaging service, respectively. Additionally, the first service attribute 920 may include a binding bitmap field that includes a value identifying the first NAN-DL attribute 924. For example, the binding bitmap field may include a value 0x0001 identifying a first NAN-DL attribute included in the message (e.g., the first NAN-DL attribute 924). The second service attribute 922 may further include a field corresponding to the binding bitmap field 814 that includes a value identifying the second NAN-DL attribute 926. For example, the binding bitmap field may include a value 0x0002 identifying a second NAN-DL attribute included in the message (e.g., the second NAN-DL attribute 926). Thus, the different service attributes 920 and 922 may identify different NAN-DLs.

The first NAN-DL attribute 924 and the second NAN-DL attribute 926 may include fields, as described above with respect to the NAN-DL attributes 914 and 916, that describe the corresponding NAN-DLs. For example, the first NAN-DL attribute 924 may include a NAN-DL channel field 822 that indicates a channel used for communication by electronic devices of the NAN-DL described by the first NAN-DL attribute 924 and a NAN-DL control field 823 that defines parameters of one or more communication windows that correspond to the NAN-DL described by the first NAN-DL attribute 924. Additionally, the second NAN-DL attribute 926 may include a NAN-DL channel field 822 that indicates a channel used for communication by electronic devices the NAN-DL described by the second NAN-DL attribute 926 and a NAN-DL control field 823 that defines parameters of one or more communication windows that correspond to the NAN-DL described by the second NAN-DL attribute 926. The channel and the parameters corresponding to the first NAN-DL attribute 924 may be different than the channel and parameters corresponding to the second NAN-DL attribute 926.

Thus, in the third example, a message may advertise two different services and indicate that the two different services are provided by a provider device via different NAN-DLs. The two different services may be provided via different channels and may have different communication window parameters.

Referring to FIG. 10, a diagram 1000 illustrating the NAN-DL control field 823 is shown. The NAN-DL control field 823 may be a field of the NAN-DL attributes 180 or to the NAN-DL attribute 736 and may define one or more parameters of one or more communication windows (e.g., paging windows, transmission windows, or both) of a NAN-DL described by the NAN-DL attributes 180 or the NAN-DL attribute 736. In a particular implementation, the NAN-DL control field 823 may include sixteen bits.

The NAN-DL control field 823 may include a discovery window offset indicator 1011. To illustrate, the discovery window offset indicator 1011 (e.g., a value of bits 0-1) may indicate a time period between the end of a discovery window and a beginning of a transmission window. The NAN-DL control field 823 may further include a DL transmission window offset indicator 1012. To illustrate, the DL transmission window offset indicator 1012 (e.g., a value of bits 2-3) may indicate a time period between transmission windows. The NAN-DL control field 823 may further include a DL transmission window size indicator 1013. To illustrate, the DL transmission window size indicator 1013 (e.g., a value of bits 4-5) may indicate a size of transmission windows for the NAN-DL. The NAN-DL control field 823 may further include a paging window size indicator 1014. To illustrate, the paging window size indicator 1014 (e.g., a value of bits 6-7) may indicate a size of paging windows for the NAN-DL.

The NAN-DL control field 823 may further include a DL transmission window repeat indicator 1015. To illustrate, the DL transmission window repeat indicator 1015 (e.g., a value of bit 8) may indicate whether transmission windows repeat between consecutive discovery windows. The NAN-DL control field 823 may further include a "data link heartbeat" indicator 1016. To illustrate, the data link heartbeat indicator 1016 (e.g., a value of bits 9-10) may indicate a threshold time period that, if no data transmission occur via the NAN-DL channel, electronic devices of the NAN-DL will consider the NAN-DL to no longer be valid. The data link heartbeat may be similar to the data link heartbeat described with reference to FIG. 1. The NAN-DL control field 823 may further include a paging window repetition indicator 1017 and a reserved bit 1018 (e.g., bit 15). To illustrate, the paging window repetition indicator 1017 (e.g., a value of bits 11-14) may indicate a number NUM_PW. Paging windows may be defined for one transmission window of each NUM_PW transmission windows between consecutive discovery windows. FIG. 10 illustrates two examples based on different values of the paging window repetition indicator 1017.

In a first example 1020, the paging window repetition indicator 1017 has a value of one. This value corresponds to each transmission window having a defined paging window. As illustrated in FIG. 10, in the first example 1020, each of the five transmission windows includes a paging window.

In a second example 1022, the paging window repetition indicator 1017 has a value of two. This value corresponds to one out of every two transmission windows having a defined paging window. As illustrated in FIG. 10, in the second example 1022, the first transmission window, the third transmission window, and the fifth transmission window each include a paging window, and the second transmission window and the fourth transmission window do not include paging windows.

During transmission windows that do not have paging windows, data transmission patterns may be repeated from a previous transmission window having a paging window. Transmission windows may be relatively longer if a paging window is absent. To illustrate, in the second example 1022, during the first paging window, a first electronic device may transmit a data announcement message that indicates that data is available for a second electronic device. During the first transmission window, the first electronic device and the second electronic device may remain in an active operating mode to transmit or receive data, and other electronic devices may transition into a low-power operating mode to conserve power. During the second transmission window, the first electronic device and the second electronic device may remain in the active operating mode to continue transmitting or receiving data and the other electronic devices may remain in the low-power operating mode. In this manner, the data transmission pattern of the first transmission window (which included the first paging window) may be repeated during subsequent transmission windows that do not include paging windows. During a subsequent paging window, each of the electronic devices may operating in the active operating mode to transmit data announcement messages or to monitor for data announcement messages. Thus, for services that perform the same data transmission pattern for multiple transmission windows, reducing a number of paging windows may enable electronic devices that are not scheduled to receive data to remain in the low-power operating mode during multiple transmission windows and thereby reduce power consumption.

Figure 11:
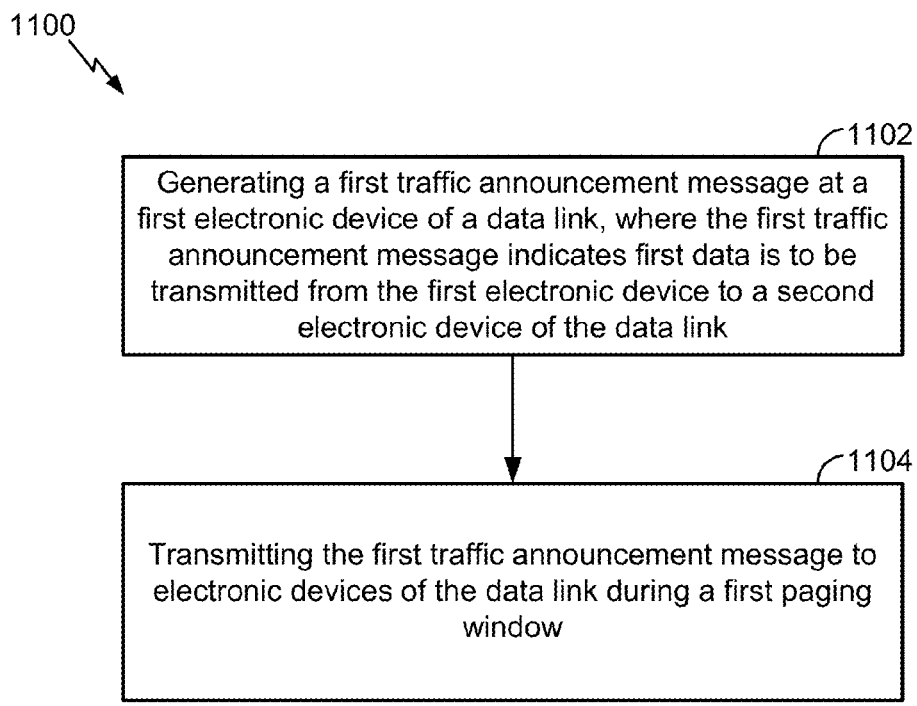
FIG. 11 is a flow diagram of a first illustrative method of operation at an electronic device of a data link.

Referring to FIG. 11, a method 1100 of operation at an electronic device of a data link is shown. The method 1100 may be performed at any of the electronic devices 104-116 of FIG. 1 (e.g., the method 1100 may correspond to a multi-hop data link) or any of the devices 612 of FIG. 6.

The method 1100 includes generating a first traffic announcement message at a first electronic device of a data link, where the first traffic announcement message indicates first data is to be transmitted from the first electronic device to a second electronic device of the data link, at 1102. For example, with reference to FIG. 1, the first electronic device 104 may generate the data announcement 120 to indicate the data 122 for transmission to the second electronic device 106.

The method 1100 further includes transmitting the first traffic announcement message to electronic devices of the data link during a first paging window, at 1104. For example, with reference to FIG. 1, the first electronic device 104 may transmit the data announcement 120 to the second electronic device 106 during a first paging window, such as the first NAN paging window 220 or the first paging window 224 of FIGS. 2-5. Alternatively, the first paging window may include or correspond to another reserved time period or slot during which the intended recipients of the data announcement 120 are expected to be in the active operating mode (e.g., "awake," as opposed to being in a "sleep" or power-save mode).

In some implementations, the traffic announcement message may be transmitted via a first wireless network that is reserved for data transmissions within the data link. For example, communications via the first wireless network may be performed via the data link channel 204 of FIGS. 2-5. In this implementation, the first paging window may occur during a time period corresponding to an active operating mode of the electronic devices. For example, the first paging window may include or correspond to the first paging window 224 of FIGS. 2 and 3. The first time period (e.g., the first paging window) begins one discovery window offset period after a first discovery window of a neighbor awareness network (NAN). For example, with reference to FIG. 2, the first paging window 224 may occur one discovery window offset 244 after the first discovery window 210. A first portion of a first transmission window of the data link may include the first paging window. For example, with reference to FIG. 2, the first transmission window 240 may include the first paging window 224.

Prior to generating the first traffic announcement message, the first electronic device may receive a service discovery message at the first electronic device via a first wireless network. For example, with reference to FIG. 1, prior to generating the data announcement 120, the first electronic device 104 may receive a service discovery message from one or more of the electronic devices 106-112. The first wireless network may be reserved for discovery operations and synchronization operations within a neighbor aware network (NAN). For example, communications via the second wireless network may be performed via the NAN channel 202 of FIGS. 2-5. Subsequent to receiving the service discovery message and prior to transmitting the first traffic announcement message, the first electronic device may be configured to transmit via a second wireless network. The second wireless network may be reserved for data transmissions within the data link. For example, subsequent to receiving a service discovery message and prior to receiving the third traffic announcement message 256, a transmitter (or a transceiver) of the first electronic device 104 may be configured from transmitting via the NAN channel 202 to transmitting via the data link channel 204.

The NAN may include a first plurality of electronic devices and the data link may include a second plurality of electronic devices. The second plurality of electronic devices may be a subset of the first plurality of electronic devices. For example, the first plurality of electronic devices may include the electronic devices 104-116 and the second plurality of electronic devices may include the electronic devices 104-112 of FIG. 1.

If the first wireless network is reserved for data transmissions within the data link, the method 1100 may also include transmitting, via the first wireless network, the first data from the first electronic device to the second electronic device during a second portion of the first transmission window. For example, the first electronic device 104 may transmit the data 122 to the second electronic device 106 during the first data transmission portion 234 of FIGS. 2 and 3. Additionally, the first traffic announcement message may indicate second data to be transmitted from the first electronic device to the third electronic device, such as the third electronic device 108 of FIG. 1 of the data link. The method 1100 may include transmitting, via the first wireless network, the second data may be transmitted from the first electronic device to a third electronic device.

The first electronic device may be configured to generate a second traffic announcement message that indicates second data to be transmitted from the first electronic device to a third electronic device of the data link. For example, the first electronic device 104 may generate the fourth traffic announcement message 258 that indicates second data to be transmitted to the third electronic device 108. The second traffic announcement message may be transmitted via the first wireless network to electronic devices of the data link during a second paging window of the data link. For example, with reference to FIGS. 2-3, the fourth traffic announcement message 258 may be transmitted via the data link channel 204 during the second paging window 226. The first transmission window and a second transmission window occur during a first discovery window interval that occurs between the first discovery window and a second discovery window of the NAN. For example, with reference to FIG. 2, the first transmission window 240 and the second transmission window 242 may occur during the discovery period 248 that occurs between the first discovery window 210 and the second discovery window 212.

A duration of the first paging window may be based on a number of electronic devices of the data link that offer services to other electronic devices of the data link. For example, the first electronic device may be configured to maintain a count of root announcement (RANN) messages received at the first electronic device, such as the RANN 142 of FIG. 1. Each of the RANN messages received at the first electronic device may indicate and/or identify a corresponding electronic device of the data link that offers a service to other electronic devices of the data link. The first electronic device may be configured to determine a duration of the first paging window based on the count. For example, the duration of the first paging window may be determined as a function of the count (e.g., based on one or more algorithms) or may be determined based on comparing the count to a mapping table. In a particular implementation, a duration of the first paging window may be based on a size of a data link time block corresponding to the data link. As a non-limiting example, the data link time block may have a size of 32 time units (TU). The duration of the first paging window may be a percentage of the data link time block. For example, the duration of the paging window may be 10% of the size of the data link time block (e.g., 3.2 TU). In some implementations, the duration of the paging window may not exceed a threshold value. For example, the duration of the paging window may be 10% of the size of the data link time block if such a duration does not exceed a threshold value of 10 TU.

In other implementations, the traffic announcement message is transmitted via the first wireless network that is reserved for discovery operations and synchronization operations within a neighbor aware network (NAN). For example, communications via the first wireless network may be performed via the NAN channel 202 of FIGS. 2-5, and the first paging window may include or correspond to the first NAN paging window 220 of FIGS. 2 and 4. In such implementations, the first paging window begins one discovery window offset period after termination of a first discovery window of the NAN. For example, the first NAN paging window 220 may occur one discovery window offset 244 after the first discovery window 210. After transmitting the first traffic announcement message via the first wireless network, the first electronic device may be configured to transmit via the second wireless network and the first electronic device may transmit the first data to the second electronic device via the second wireless network. The second wireless network may be reserved for data transmissions within the data link. For example, after transmitting the first traffic announcement message 252, a transmitter (or a transceiver) of the first electronic device 104 may be configured from transmitting the NAN channel 202 to transmitting via the data link channel 204, and the data 122 may be transmitted from the first electronic device 104 to the second electronic device 106 via the data link channel 204.

If the first wireless network is reserved for discovery operations and synchronization operations within the NAN, the first traffic announcement message may identify the first electronic device as a sender, may identify the second electronic device as a recipient, may identify the data link as a delivery path for the first data, or a combination thereof. Alternatively, or in addition, the first traffic announcement message may include a traffic indication map. For example, the data announcement 120 of FIG. 1 may include a traffic indication map. The traffic indication map may include a bitmap, and values of one or more bits of the bitmap may identify one or more electronic devices as recipients of data transmissions from the first electronic device during a first transmission window. A first bit of the traffic indication map may indicate that first data is to be transmitted to the second electronic device and a second bit of the traffic indication map may indicate that second data is to be transmitted to a third electronic device of the data link. As an illustrative example, the traffic indication map may include fourteen bits, and a first subset of bits (e.g., the first seven bits) may correspond to the electronic devices 104-116, and a second subset of bits (e.g., the next seven bits) may correspond to devices of a second data link (not shown). The first bit may indicate that the first data is to be transmitted to the second electronic device 106, and the second bit may indicate that second data is to be transmitted to the third electronic device 108. Additionally, a location of the first bit in the traffic indication map may be based on an association identifier assigned by the first electronic device to the second electronic device. For example, when the first electronic device 104 associates with the second electronic device 106, the first electronic device 104 may generate and assign an association identifier of "01" to the second electronic device 106, and based on the association identifier 01, the first bit of the traffic indication map may correspond to the second electronic device 106. As another example, when the first electronic device 104 associates with the fourth electronic device 110, the first electronic device 104 may generate and assign an association identifier of "06" to the fourth electronic device 110, and based on the association identifier 06, the sixth bit of the traffic indication map may correspond to the fourth electronic device 110.

In other implementations, a start time of the first paging window may be determined based on an internal clock of the first electronic device. For example, the internal clock may be synchronized based on one or more synchronization beacons received at the first electronic device from a neighbor aware network (NAN). To illustrate, a start time of the first time period (e.g., the first paging window) may be determined by an internal clock (or other timing circuitry, such as the timing and/or counting circuitry 2274 of FIG. 22) included in the data announcement logic 130 of the first electronic device 104 or the data announcement logic 132 of the second electronic device 106. The internal clock may be synchronized by one or more synchronization beacons received from one or more electronic devices of the NAN 102, such as the synchronization beacon 140 of FIG. 1.

In a particular implementation, the method 1100 further includes generating a first announcement traffic indication message (ATIM) and a second ATIM at the first electronic device. The first ATIM may indicate second data is to be transmitted from the first electronic device to the second electronic device. The second ATIM may indicate third data is to be transmitted from the first electronic device to a third electronic device of the data link. The method 1100 includes transmitting the ATIM to the second electronic device during a second paging window of the data link. For example, the first electronic device 104 may transmit an ATIM to the second electronic device 106 via a unicast transmission, as described with reference to FIG. 1. The ATIM may indicate that traffic is to be transmitted to the second electronic device 106. The method 1100 further includes transmitting the second ATIM to the third electronic device during the second paging window. In some implementations, multiple ATIMs may be transmitted (and multiple ACKs may be received) during a single paging window.

In a particular implementation, the method 1100 includes receiving an acknowledgement from the second electronic device responsive to the traffic announcement message. The acknowledgement may be a quality of service null (QoS)_NULL frame. For example, the first electronic device 104 may receive the acknowledgement 124, which may be a QoS_NULL frame, from the second electronic device 106. Additionally, the QoS_NULL frame may include a reverse direction grant (RDG) that authorizes the first electronic device to transmit a response to the second electronic device within a short interframe space (SIFS) period without contention. For example, the acknowledgement 124 may include a RDG that enables the first electronic device 104 to transmit a response to the acknowledgement 124 within a SIFS without contention (for the wireless medium).

In a particular implementation, the method 1100 further includes selecting a first contention window parameter based on a duration of the first paging window, a size of paging messages, and a target collision probability of paging messages. For example, the first contention window parameter (CW) may be selected based on a duration of a paging window (PAGING SIZE), a size of paging messages, and a target collision probability of paging messages, as described with reference to FIG. 1. Additionally or alternatively, the method 1100 may further include selecting a second contention window parameter based on a duration of a first transmission window, a size of data transmissions, and a target collision probability of data transmissions. The first transmission window may include the first paging window. For example, the first contention window parameter (CW) may be selected based on a duration of a transmission portion of a transmission window $T_{Data}$, a size of data transmissions, and a target collision probability of data transmissions, as described with reference to FIG. 1.

The method 1100 enables a traffic announcement message to be transmitted via a NAN channel (e.g., the NAN channel 202) or a data link channel (e.g., the data link channel 204). One or more electronic devices of the data link may conserve power by changing an operating mode based on the traffic announcement message.

Figure 12:
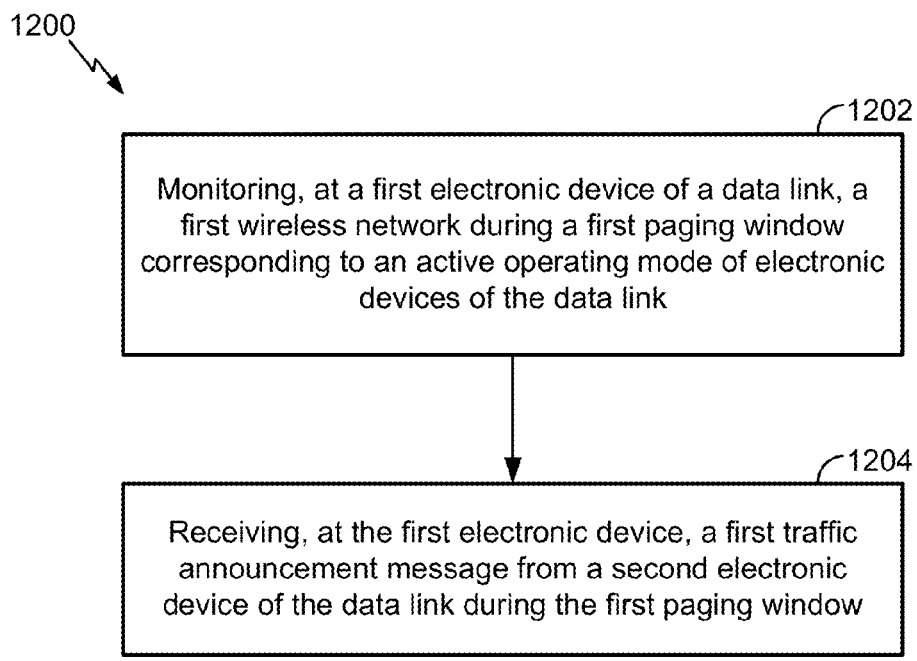
FIG. 12 is a flow diagram of a second illustrative method of operation at an electronic device of a data link.

Referring to FIG. 12, a method 1200 of operation at an electronic device of a data link is shown. The method 1200 may be performed at any of the electronic devices 104-116 of FIG. 1 (e.g., the method 1200 may correspond to a multi-hop data link) or any of the devices 612 of FIG. 6.

The method 1200 includes monitoring, at a first electronic device of a data link, a first wireless network during a first paging window corresponding to an active operating mode of the electronic devices of the data link, at 1202. For example, with reference to FIG. 1, the second electronic device 106 may monitor a first wireless network to detect the data announcement 120. The first time period may include or correspond to the first NAN paging window 220 or the first paging window 224.

The method 1200 further includes receiving, at the first electronic device, a first traffic announcement message from a second electronic device of the data link during the first paging window, at 1204. In a particular implementation, the first traffic announcement message may include or correspond to a broadcast message. For example, with reference to FIG. 1, each of the electronic devices 106-112 may receive the data announcement 120 transmitted by the first electronic device 104.

The first electronic device may be configured to determine whether the first traffic announcement message identifies the first electronic device as a recipient of data from a second electronic device during a first transmission window of the data link. In response to determining that the first traffic announcement message identifies the first electronic device as the recipient, the first electronic device may be maintained in the active operating mode during the first transmission window and may receive the data from the second electronic device during the first transmission window. For example, the second electronic device 106 may determine that the data announcement 120 identifies the second electronic device 106 as a recipient of the data 122 from the first electronic device 104. In response to determining that the data announcement 120 identifies the second electronic device 106, the second electronic device 106 may maintain an operating mode in the active operating mode during a time period corresponding to the data link. Alternatively, in response to determining that the first traffic announcement message does not identify the first electronic device as the recipient, the first electronic device may transition from the active operating mode to a low-power operating mode during the first transmission window. For example, in response to determining that the data announcement 120 does not identify the electronic devices 108-112 as recipients of the data 122, the electronic devices 108-112 may transition to the low-power operating mode. The first electronic device may transition from the low-power operating mode (back) to the active operating mode at a second start time of a second paging window of the data link. For example, the electronic devices 108-112 may transition (back) to the active operating mode at a start of the second NAN paging window 222 or the second paging window 226.

In some implementations, the first traffic announcement message may be received via the first wireless network and the first wireless network may be reserved for data transmissions corresponding to the data link. For example, communications via the first wireless network may be performed via the data link channel 204 of FIGS. 2-5. If the first traffic announcement message identifies and/or indicates the first electronic device as the recipient of data from the second electronic device, the first electronic device may receive the data from the second electronic device via the first wireless network. For example, if the data announcement 120 identifies the second electronic device 106 as a recipient of the data 122, the second electronic device 106 may receive the data 122 from the first electronic device 104 via the data link channel 204.

In other implementations, the first traffic announcement message may be received via the first wireless network and the first wireless network may be reserved for discovery operations and synchronization operations within a neighbor aware network (NAN). For example, communications via the first wireless network may be performed via the NAN channel 202 of FIGS. 2-5. If the first traffic announcement message indicates the first electronic device as the recipient, the first electronic device may receive the data from the second electronic device via a second wireless network. For example, if the data announcement 120 identifies the second electronic device 106 as a recipient of the data 122, the second electronic device 106 may receive the data 122 from the first electronic device 104 via the data link channel 204.

In other implementations, the first electronic device may determine whether a value of a particular bit of a traffic indication map identifies the first electronic device as the recipient. For example, the particular bit may correspond to the first electronic device. To illustrate, a location (or position) of the particular bit in the traffic identification map may be determined based on an association identification assigned by the second electronic device during an association process between the first electronic device and the second electronic device. For example, with reference to FIG. 1, the second electronic device 106 may be assigned an association identification by the first electronic device 104 during an association process between the first electronic device 104 and the second electronic device 106. The first electronic device may determine a particular data link network via which to receive the data based on an association identification space corresponding to the particular bit. For example, a first subset of bits (e.g., bits 1-10) of the traffic indication map may correspond to a first data link, a second subset of bits (e.g., bits, 11-20) of the traffic indication map may correspond to a second data link, and the second electronic device 106 of FIG. 1 may determine a data link network (e.g., a data link channel) via which to receive the data 122 based on a location of one or more bits corresponding to the second electronic device 106 in the traffic indication map. The location of the one or more bits may correspond to whether the one or more bits are included in the first subset of bits, the second subset of bits, or a combination thereof.

The method 1200 enables a traffic announcement message to be received via a NAN channel (e.g., the NAN channel 202) or a data link channel (e.g., the data link channel 204). One or more electronic devices of the data link may conserve power by changing an operating mode based on the traffic announcement message.

Figure 13:
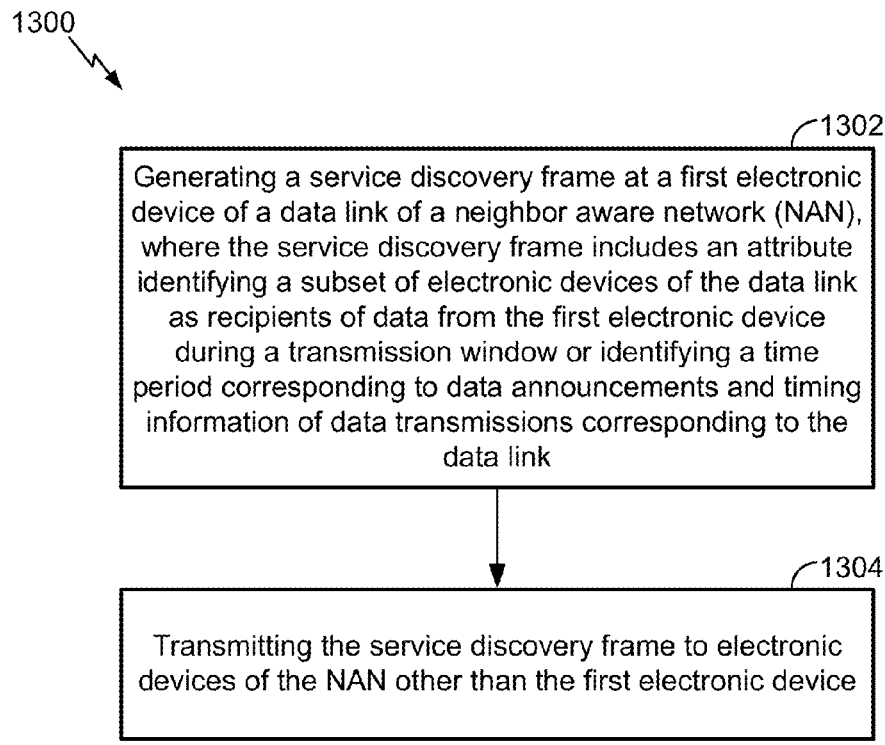
FIG. 13 is a flow diagram of a third illustrative method of operation at an electronic device of a data link.

Referring to FIG. 13, a method 1300 of operation at an electronic device of a data link is shown. The method 1300 may be performed at any of the electronic devices 104-112 of FIG. 1 (e.g., the method 1300 may correspond to a single-hop data link) or any of the devices 612 of FIG. 6.

The method 1300 includes generating a service discovery frame at a first electronic device of a data link of a neighbor aware network (NAN), where the service discovery frame includes an attribute identifying a subset of electronic devices of the data link as recipients of data from the first electronic device during a transmission window or identifying a time period corresponding to data announcements and timing information of data transmissions corresponding to the data link, at 1302. For example, with reference to FIG. 1, the first electronic device 104 may generate the service discovery frame (e.g., the data announcement 120 of FIG. 1 or the SDF 250 of FIGS. 2-5). In some implementations the first service descriptor attribute and the first service response filter field are formatted in accordance with a NAN protocol.

The method 1300 further includes transmitting the service discovery frame to electronic devices of the NAN other than the first electronic device, at 1304. For example, the data announcement 120 may correspond to the SDF 250 of FIG. 2, and the first electronic device 104 may transmit the SDF 250 to the second electronic device 106 via the NAN channel 202. In a particular implementation, the service discovery frame is transmitted during a discovery window of the NAN, which may be referred to as a NAN discovery window. To illustrate, with reference to FIG. 2, the SDF 250 may be transmitted via the NAN channel 202 during the first discovery window 210.

In a particular implementation, the attribute may be a service descriptor attribute. A service response filter field of the service descriptor attribute may identify the subset of electronic devices of the data link as recipients of the data from the first electronic device during the transmission window. The service discovery frame may be transmitted during a discovery window of the NAN, and wherein the NAN includes the subset of electronic devices of the data link. In another particular implementation, the attribute may be a data link attribute corresponding to the data link. A data link control field of the data link attribute may identify the time period and the timing information. The service discovery frame may be transmitted to the electronic devices of the data link during a discovery window.

In some implementations, the first electronic device may transmit at least a portion of the data to a second electronic device of the data link via a first wireless network corresponding to the data link during the first transmission window. For example, with reference to FIG. 1, the first electronic device 104 may transmit the data 122 to the second electronic device 106 via the data link channel 204. The first subset of electronic devices may include one or more electronic devices, such as the second electronic device. For example, in some implementations, the data announcement 120 may indicate multiple electronic devices of the electronic devices 106-112 as recipients of the data 122.

In at least some implementations, the first electronic device may correspond to a second data link of the NAN. For example, the first electronic device 104 may correspond to a second data link that includes one or more of the electronic devices 106-112. The service discovery frame generated by the first electronic device may include a second service descriptor attribute. A second service response filter field of the second service descriptor attribute may identify a second subset of electronic devices of the second data link as recipients of second data. The first electronic device may transmit at least a portion of the second data to a third electronic device of the second data link via a second wireless network during the first transmission window. For example, with reference to FIG. 1, the data announcement 120 may further identify the third electronic device 108 as a recipient of additional data, and the first electronic device 104 may transmit the additional data to the third electronic device 108 via a second data link network (e.g., a second data link channel) corresponding to the second data link. The second wireless network may correspond to the second data link and the second subset of electronic devices includes the third electronic device.

In a particular implementation, the first service discovery attribute includes a binding bitmap field. The binding bitmap field may indicate a data link attribute (e.g., a NDL attribute) and a second attribute. The second attribute may include a traffic indication map (TIM). For example, the data announcement 120 may include a SDA that includes a binding bitmap field. The binding bitmap field may indicate a data link attribute corresponding to the data link and a traffic announcement attribute, as described with reference to FIG. 1. In another implementation, the second attribute may include a traffic indicator for the data link. For example, the second attribute may include or correspond to the traffic announcement attribute described with reference to Table 1, and the traffic announcement attribute may include a traffic indicator. The traffic indicator may include a TIM, a Bloom filter, or a list of MAC addresses.

The method 1300 enables a first electronic device of a data link to transmit a SDF that corresponds to a data announcement (e.g., as the data announcement 120) to one or more electronic devices of a data link. One or more electronic devices of the data link may conserve power by changing an operating mode based on the SDF.

Figure 14:
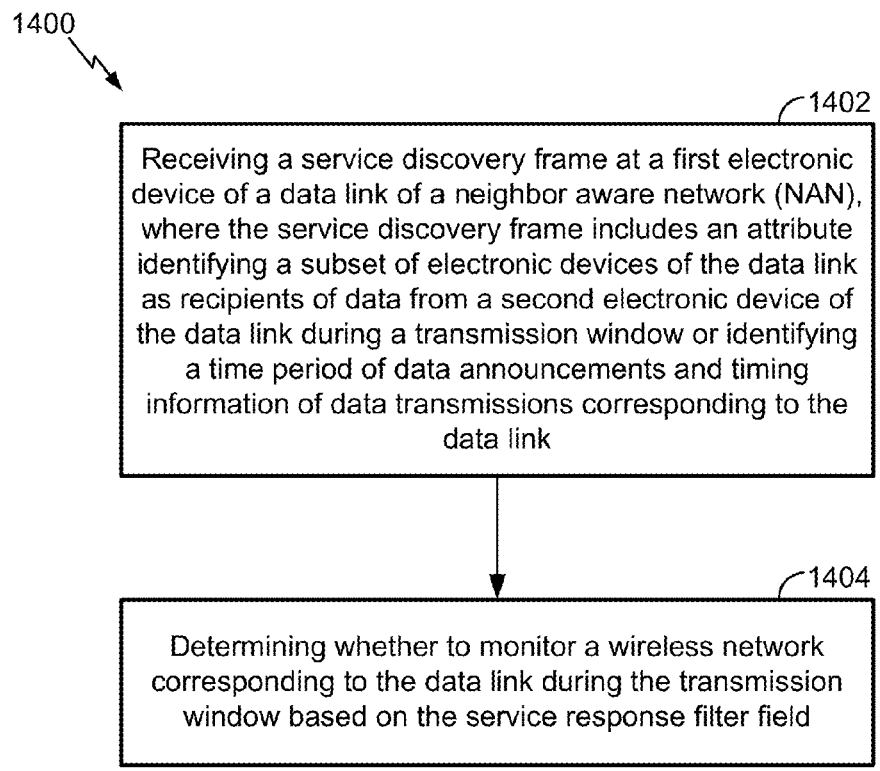
FIG. 14 is a flow diagram of a fourth illustrative method of operation at an electronic device of a data link.

Referring to FIG. 14, a method 1400 of operation at an electronic device of a data link is shown. The method 1400 may be performed at any of the electronic devices 104-112 of FIG. 1 (e.g., the method 1400 may correspond to a single-hop data link) or any of the devices 612 of FIG. 6.

The method 1400 includes receiving a service discovery frame at a first electronic device of a data link of a neighbor aware network (NAN), where the service discovery frame includes an attribute identifying a subset of electronic devices of the data link as recipients of data from a second electronic device of the data link during a transmission window or identifying a time period of data announcements and timing information of data transmissions corresponding to the data link, at 1402. For example, with reference to FIG. 1, the second electronic device 106 may receive the service discovery frame (e.g., the data announcement 120) from the first electronic device 104. To further illustrate, with reference to FIG. 2, the SDF 250 (corresponding to the data announcement 120) may be received via the NAN channel 202 during the first discovery window 210.

The method 1400 further includes determining whether to monitor a wireless network corresponding to the data link during the transmission window based on the service response filter field, at 1404. For example, the second electronic device 106 may determine whether to monitor the data link channel 204 during the first transmission window 240.

In a particular implementation, the attribute may be a service descriptor attribute. A service response filter field of the service descriptor attribute may identify the subset of electronic devices of the data link as recipients of the data from the second electronic device of the data link during the transmission window. Determining whether to monitor the wireless network may be based on the service response filter field. In another particular embodiment, the attribute may be a data link attribute corresponding to the data link. A data link control field of the data link attribute may identify the time period of the data announcements and the timing information. The wireless network may be monitored for at least one data frame from the second electronic device during the transmission window. The transmission window may be determined based on the data link attribute.

In some implementations, the first electronic device may monitor the wireless network for the data. For example, the first electronic device may monitor the wireless network based on determining that the first electronic device is included in the first subset of electronic devices. The first electronic device may receive at least a portion of the data from the second electronic device via the wireless network during the transmission window. For example, the second electronic device 106 may monitor the data link channel 204 and receive at least a portion of the data 122 from the first electronic device 104 via the data link channel 204.

In a particular implementation, the service discovery attribute may include a binding bitmap field. The binding bitmap field may indicate a data link attribute (e.g., a NDL attribute) and a second attribute. The second attribute may include a traffic indication map (TIM). For example, the data announcement 120 may include a SDA that includes a binding bitmap field. The binding bitmap field may indicate a data link attribute corresponding to the data link and a traffic announcement attribute, as described with reference to FIG. 1. In another implementation, the second attribute may include a traffic indicator for the data link. For example, the second attribute may include or correspond to the traffic announcement attribute described with reference to Table 1, and the traffic announcement attribute may include a traffic indicator. The traffic indicator may include a TIM, a Bloom filter, or a list of MAC addresses.

In a particular implementation, a paging window repetition rate may be indicated or represented as a number NUM_PW. Paging windows may be defined for one transmission window of each NUM_PW transmission windows between consecutive discovery windows. For example, if the number NUM_PW is greater than one, multiple paging windows may occur between consecutive discovery windows. In other implementations, the periodicity of paging windows is indicated or determined during data link schedule negotiation between electronic devices of the data link. If the number NUM_PW is zero, the corresponding service provided by the second electronic device may not have paging windows. For example, a streaming service may not have paging windows. In this implementation, the method 1400 may further include maintaining the first electronic device in an active operating mode during an entirety of a data link time block corresponding to the data link if the number NUM_PW is zero. For example, for a streaming service, a transmission window may extend for an entirety of a data link time block (e.g., an NDL time block) corresponding to the data link because the streaming service has no paging windows. In this example, devices that receive the data announcement 120 may remain in the active operating mode for the entirety of the data link time block. The method 1400 may further include transitioning the first electronic device into a low-power operating mode based on a "MORE" bit included in data received at the first electronic device, an end-of-service-period (EOSP) bit included in the data, or idle time detection of the wireless network. In some implementations, if the NUM_PW is zero, an electronic device may transition into the low power operating mode instead of remaining in the active operating mode. For example, if the first electronic device receives data that includes a MORE bit or an EOSP bit, the first electronic device may transition into the low-power operating mode. As another example, if the first electronic device detects that the wireless network is idle for a threshold period of time, the first electronic device may transition to the low-power operating mode.

The method 1400 enables a first electronic device of a data link to receive a SDF that corresponds to a data announcement (e.g., as the data announcement 120) from one or more electronic devices of a data link. The first electronic device may conserve power by changing an operating mode based on the SDF.

Figure 15:
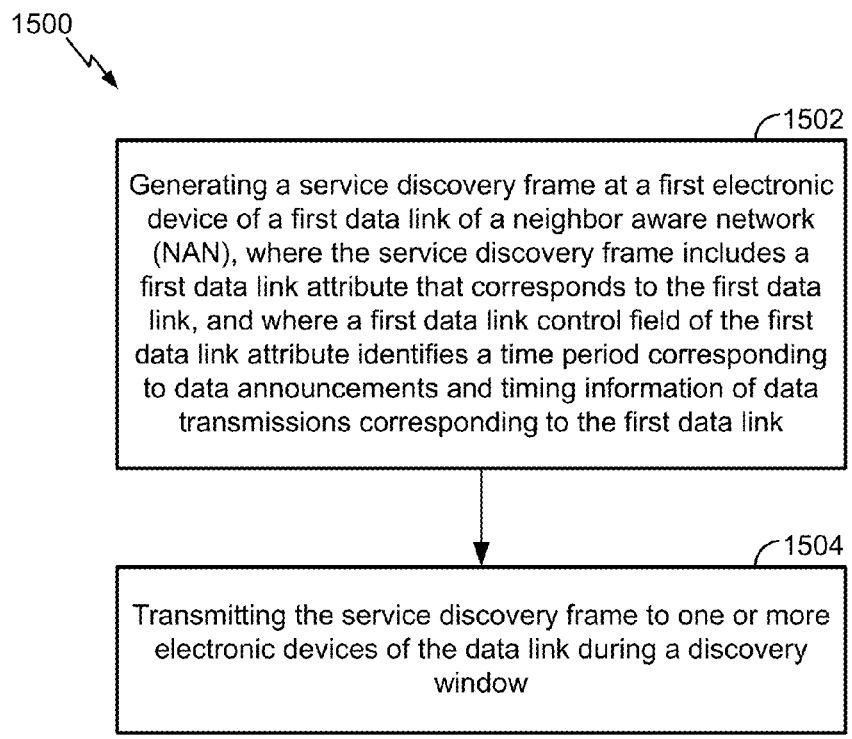
FIG. 15 is a flow diagram of a fifth illustrative method of operation at an electronic device of a data link.

Referring to FIG. 15, a method 1500 of operation at an electronic device of a data link is shown. The method 1500 may be performed at any of the electronic devices 104-116 of FIG. 1 or any of the devices 612 of FIG. 6.

The method 1500 includes generating a service discovery frame at a first electronic device of a first data link of a neighbor aware network (NAN), where the service discovery frame includes a first data link attribute that corresponds to the first data link, and where a first data link control field of the first data link attribute identifies a time period corresponding to data announcements and timing information of data transmissions corresponding to the first data link, at 1502. For example, with reference to FIG. 1, the first electronic device 104 may generate the service discovery frame (e.g., the data announcement 120).

The method 1500 further includes transmitting the service discovery frame to one or more electronic devices of the data link during a discovery window, at 1504. For example, with reference to FIG. 1, the first electronic device 104 may transmit the service discovery frame (e.g., the data announcement 120) to the second electronic device 106. To further illustrate, with reference to FIG. 2, the SDF 250 (corresponding to the data announcement 120) may be transmitted via the NAN channel 202 during the first discovery window 210.

In some implementations, a first subset of bits of the first data link control field may identify the time period as one of a data link paging window, a NAN paging window, or a discovery window corresponding to a service discovery frame, as illustrative, non-limiting implementations. For example, the first subset of bits of the first data link control filed may identify the time period as one of the data link paging windows 224, 226, the NAN paging windows 220, 222, or the first discovery window 210 of FIG. 2. The first subset of bits and a second subset of bits of the first data link control field identify the timing information. If the first subset of bits identifies the time period as the data link paging window, the timing information may include a duration of the data link paging window. If the first subset of bits identifies the time period as the NAN paging window, the timing information may include a number of repetitions of the NAN paging window between two consecutive discovery windows of the NAN. If the first subset of bits identifies time period as the discovery window, the timing information may include a duration of time that data recipient assignments identified in a service response filter field of the service descriptor attribute of the service discovery frame are repeated. For example, particular values of the data link control field are further explained with reference to FIG. 1 and to Table 6.

In other implementations, the service discovery frame may include a second data link attribute that corresponds to a second data link. A second data link control field of the second data link attribute may identify and/or indicate a second time period corresponding to data announcements and second timing information corresponding to the second data link. For example, the SDF 250 may include multiple data link attributes that each correspond to a different data link.

In a particular implementation, the first service response filter identifies a Bloom filter that identifies the first subset of electronic devices as recipients of the data. For example, with reference to FIG. 1, the SRF (included in the data announcement 120) may include the address list 152 that is represented by a Bloom filter. A service response filter control field of the service response filter may include a Bloom filter index that indicates a set of hash functions corresponding to the Bloom filter. For example, a service response filter control field of the SRF (included the data announcement 120) may include a Bloom filter index that indicates a set of hash functions that correspond to the Bloom filter (that represents the address list 152). A size of the Bloom filter may be selected based on a target false positive percentage corresponding to the Bloom filter. For example, the size of the Bloom filter may be increased by the first electronic device 104 to decrease a false positive percentage corresponding to the Bloom filter. The method 1500 may further include receiving an acknowledgement from a second electronic device responsive to the service discovery frame and transmitting a negative-acknowledgement (NACK) to the second electronic device based on determining that the second electronic device is not a recipient of the data. For example, with reference to FIG. 1, the first electronic device 104 may receive the acknowledgement 144 from the fifth electronic device 112 and may transmit the NACK 154 to the fifth electronic device 112 in response to determining that the fifth electronic device 112 is not a recipient of the data 122.

In a particular implementation, the data link attribute includes a field that indicates a periodicity of transmission windows designated for multicast traffic. For example, the data link attribute may include a multicast periodicity field that indicates which transmission windows are designated for multicast traffic, as described with reference to FIG. 1. Data may be transmitted during a transmission window that is designated for multicast traffic, and the transmission window may not include a paging window, as described with reference to FIG. 1. Additionally, a data announcement may not be transmitted to indicate the multicast traffic, as described with reference to FIG. 1.

The method 1500 enables a first electronic device of a data link to transmit a SDF that that includes a data link attribute. A data link control field of the data link attribute may identify information corresponding to the data link to other electronic devices of the data link.

Figure 16:
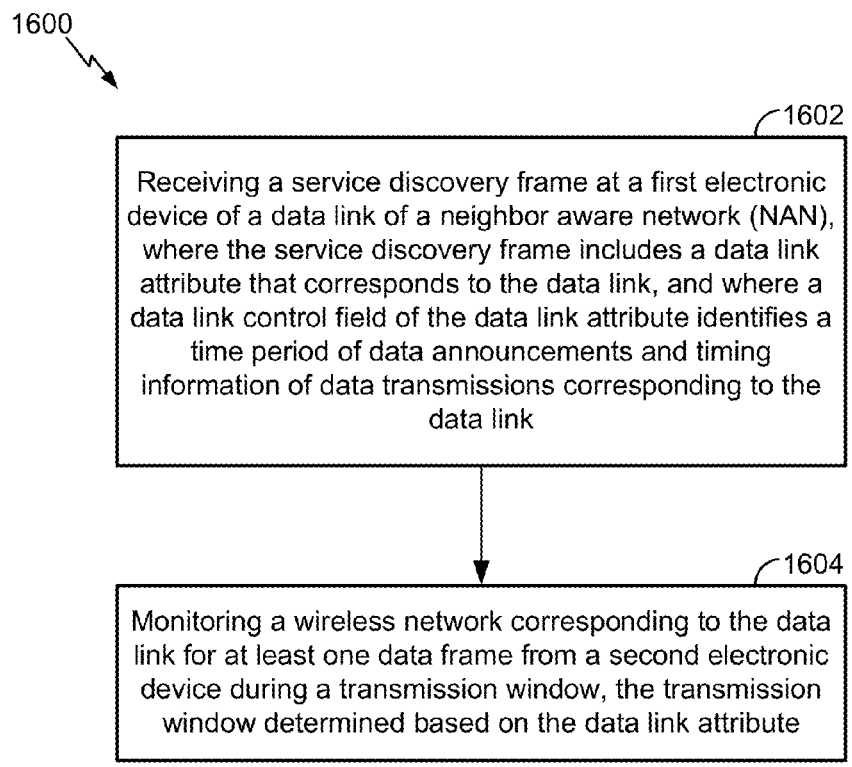
FIG. 16 is a flow diagram of a sixth illustrative method of operation at an electronic device of a data link.

Referring to FIG. 16, a method 1600 of operation at an electronic device of a data link is shown. The method 1600 may be performed at any of the electronic devices 104-116 of FIG. 1 or any of the devices 612 of FIG. 6.

The method 1600 includes receiving a service discovery frame at a first electronic device of a data link of a neighbor aware network (NAN), where the service discovery frame includes a data link attribute that corresponds to the data link, and where a data link control field of the data link attribute identifies a time period of data announcements and timing information of data transmissions corresponding to the data link, at 1602. For example, with reference to FIG.

1, the second electronic device 106 may receive the service discovery frame (e.g., the data announcement 120).

The method 1600 further includes monitoring a wireless network corresponding to the data link for at least one data frame from a second electronic device during a transmission window, where the transmission window is determined based on the data link attribute, at 1604. For example, the second electronic device 106 may monitor the data link channel 204 for at least one data frame of the data 122 from the first electronic device 104.

In some implementations, the wireless network may be reserved for data transmission within the data link. For example, communications via the wireless network may be performed via the data link channel 204. Alternatively, or in addition, the first electronic device may determine the time period of data announcements based on a first set of bits of the data link control field. Additionally, the first electronic device may determine the timing information based on the first set of bits and based on a second set of bits of the data link control field. For example, the second electronic device 106 may determine the time period and the timing information based on multiple bits of the data link control field, as further described with reference to FIG. 1 and to Table 6.

In a particular implementation, the service response filter field identifies a Bloom filter, and determining to monitor the wireless network is based on determining that the first electronic device is identified as a recipient of the data by the Bloom filter. For example, with reference to FIG. 1, the address list 152 included in the data announcement 120 (e.g., the NAN SDF that includes the SRF) may be represented by a Bloom filter, and the second electronic device 106 may determine to monitor the data link channel 204 based on the Bloom filter. The method 1600 may further include transmitting an acknowledgement to the second electronic device in response to determining that the first electronic device is indicated as a recipient of the data, receiving a NACK from the second electronic device, and transitioning the first electronic device from an active operating mode to a low-power operating mode in response to receiving the NACK. For example, with reference to FIG. 1, the fifth electronic device 112 may transmit the acknowledgement 144 to the first electronic device based on a false positive match resulting from the Bloom filter (e.g., the address list 152). The first electronic device 104 may determine that the fifth electronic device 112 is not a recipient of the data 122 and may transmit the NACK 154 to the fifth electronic device 112. The fifth electronic device 112 may receive the NACK 154 and may transition into the low-power operating mode based on the NACK 154.

The method 1600 enables a first electronic device of a data link to receive a SDF that that includes a data link attribute. The first electronic device may determine information corresponding to the data link based on a data link control field of the data link attribute.

Figure 17:
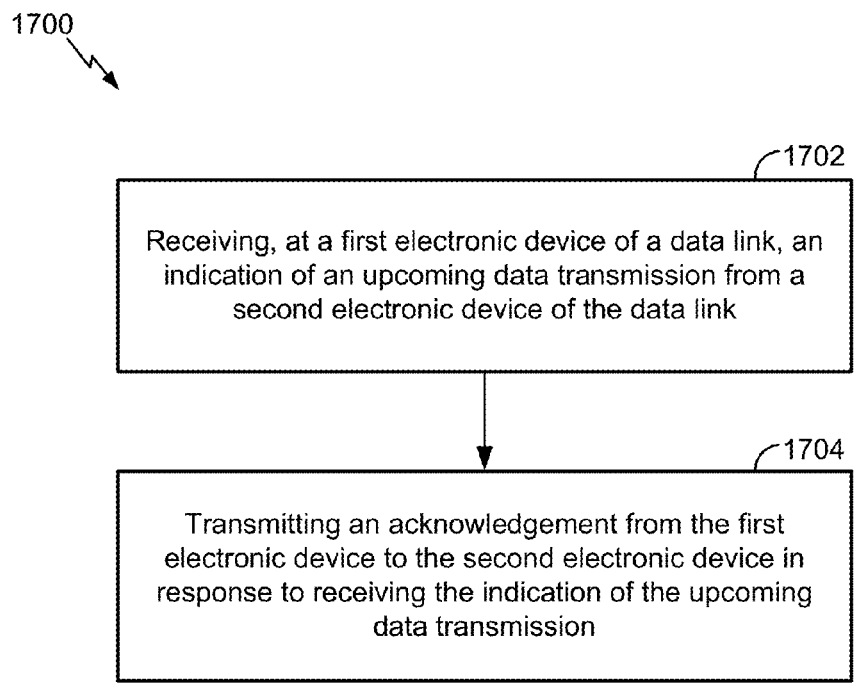
FIG. 17 is a flow diagram of a seventh illustrative method of operation at an electronic device of a data link.

Referring to FIG. 17, a method 1700 of operation at an electronic device of a data link is shown. The method 1700 may be performed at any of the electronic devices 104-112 of FIG. 1 or any of the devices 612 of FIG. 6.

The method 1700 includes receiving, at a first electronic device of a data link, an indication of an upcoming data transmission from a second electronic device of the data link, at 1702. For example, with reference to FIG. 1, the second electronic device 106 may receive the indication of the upcoming data transmission (e.g., the data announcement 120) from the first electronic device 104.

The method 1700 further includes transmitting an acknowledgement from the first electronic device to the second electronic device in response to receiving the indication of the upcoming data transmission, at 1704. For example, with reference to FIG. 1, the second electronic device 106 may transmit the acknowledgement 124 to the first electronic device 104.

In some implementations, the indication of the upcoming data transmission may include a traffic announcement message (e.g., a data announcement message). For example, the data announcement 120 may include or correspond to the traffic announcement messages 252, 254, 256, and 258. In some implementations, the indication of the upcoming data transmission may correspond to a service response filter field of a service descriptor attribute included in a service discovery frame. For example, the data announcement 120 may include or correspond to the SDF 250.

In some implementations, the acknowledgement may serve as or represent a PS-POLL message. The acknowledgement may be transmitted during an acknowledgement window that is included in a transmission window. For example, the transmission window may include a paging window, the acknowledgement window, and a data transmission portion. The acknowledgement window may occur subsequent to the paging window and prior to the data transmission portion. To further illustrate, the acknowledgement 124 may serve as or represent a PS-POLL message and may be transmitted during the acknowledgement windows 230, 232 of the transmission windows 240, 242.

If the acknowledgement serves as the PS-POLL message, the first electronic device may be in an active operating mode during and/or immediately after transmitting the acknowledgement. In some implementations, the first electronic device may determine a duration of a first time period that a first wireless network is idle. The first time period occurs subsequent to transmitting the acknowledgement. The first electronic device may transition from the active operating mode to a low-power operating mode in response to determining that the duration of the first time period exceeds a first threshold value. For example, the second electronic device 106 may transition from the active operating mode to the low-power operating mode in response to determining that the duration of the first time period exceeds the minimum wait time 2270 of FIG. 22. In other implementations, the first electronic device may determine a duration of a second time period that the first wireless network is busy. The second time period occurs subsequent to transmitting the acknowledgement. The first electronic device may transition from an active operating mode to a low-power operating mode in response to determining that the duration of the second time period exceeds a second threshold value. For example, the second electronic device 106 may transition from the active operating mode to the low-power operating mode in response to determining that the duration of the first time period exceeds the maximum wait time 2272 of FIG. 22. In other implementations, after transmitting the acknowledgement, the first electronic device may receive at least one data frame from the second electronic device and may maintain the active operating mode in response to determining that one or more particular bits included in the at least one data frame indicate an additional upcoming data transmission, such as an additional upcoming data transmission to be received by the first electronic device. For example, the second electronic device 106 may receive at least one frame of the data 122 from the first electronic device and may maintain the active operating mode in response to determining that a MORE bit or an EOSP bit of the at least one frame of the data 122 indicates an additional upcoming data transmission.

In a particular implementation, after transmitting the acknowledgement, the first electronic device may receive at least one data frame from the second electronic device, and after expiration of a threshold time period, the first electronic device may transition from an active operation mode to a low-power operating mode in response to determining that a first wireless network corresponding to the data link is idle. For example, after transmitting the acknowledgement 124, the second electronic device 106 may receive at least one data frame (e.g., the data 122) from the first electronic device 104. The second electronic device 106 may transition from the active operating mode to the low power operating mode in response to determining that the NAN channel 202 is idle.

The acknowledgement may be a QoS_NULL frame. In some implementations, the QoS_NULL frame includes a reverse direction grant (RDG) that authorizes the second electronic device to transmit a response to the first electronic device within a short interframe space (SIFS) period. For example, the acknowledgement 124 may be a QoS_NULL frame that includes a RDG that authorizes the first electronic device 104 to transmit a response (e.g., a frame of the data 122) to the second electronic device 106 within a SIFS period. In other implementations, the QoS_NULL frame does not include the RDG. If the acknowledgement is the QoS_NULL frame, the first electronic device may receive a data frame from the second electronic device responsive to the QoS_NULL frame. Based on the data frame, the first electronic device may maintain or stay in an active operating mode in response to determining that one or more particular bits included in the data frame indicate an additional upcoming data transmission, such as an additional upcoming data transmission to be received by the first electronic device. For example, the second electronic device 106 may receive at least one frame of the data 122 from the first electronic device responsive to the acknowledgement 124 and may maintain the active operating mode in response to determining that a MORE bit or an EOSP bit of the at least one frame of the data 122 indicates an additional upcoming data transmission.

In some implementations, the first electronic device may receive a NULL frame from the second electronic device prior to transmitting the acknowledgement. For example, with reference to FIG. 1, the second electronic device 106 may receive the NULL frame 126 from the first electronic device 104. In a particular implementation, the NULL frame may include or correspond to a QoS_NULL frame. The first electronic device may transmit the acknowledgement in response to receiving the NULL frame. For example, the second electronic device 106 may transmit the acknowledgement 124 in response to receiving the NULL frame 126.

Thus, the method 1700 enables one or more electronic devices of the data link to transmit an acknowledgement in response to receiving an indication of an upcoming data transmission from a first electronic device. The first electronic device may be able to prevent data transmissions when the one or more electronic devices are unable to receive the data transmissions based on the acknowledgement.

Figure 18:
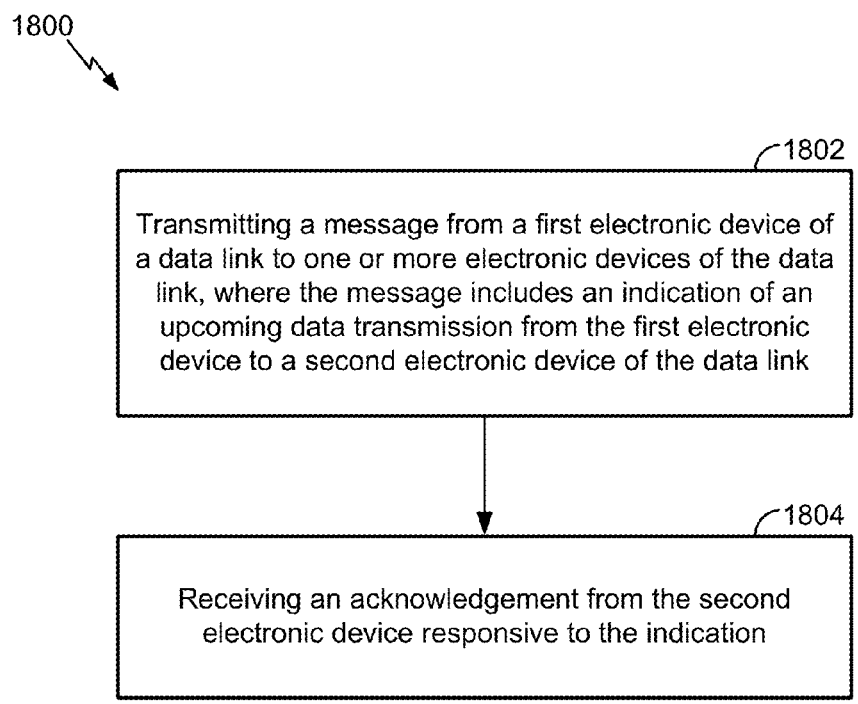
FIG. 18 is a flow diagram of a eighth illustrative method of operation at an electronic device of a data link.

Referring to FIG. 18, a method 1800 of operation at an electronic device of a data link is shown. The method 1800 may be performed at any of the electronic devices 104-112 of FIG. 1 or any of the devices 612 of FIG. 6.

The method 1800 includes transmitting a message from a first electronic device of a data link to one or more electronic devices of the data link, where the message includes an indication of an upcoming data transmission from the first electronic device to a second electronic device of the data link, at 1802. For example, with reference to FIG. 1, the first electronic device 104 may transmit the message (e.g., the data announcement 120) to the second electronic device 106.

The method 1800 further includes receiving an acknowledgement from the second electronic device responsive to the indication, at 1804. For example, with reference to FIG. 1, the first electronic device 104 may receive the acknowledgement 124 from the second electronic device 106. The acknowledgement may serve as or represent a PS-POLL message or may be a QoS_NULL frame.

In some implementations, prior to receiving the acknowledgement, the first electronic device may transmit a NULL frame to the second electronic device and the acknowledgement may be received in response to the NULL frame. For example, the first electronic device 104 may transmit the NULL frame 126 to the second electronic device 106, and the acknowledgement 124 may be received by the first electronic device 104 in response to the NULL frame 126. In a particular implementation, NULL frame may be the QoS_NULL frame.

Alternatively, or in addition, the first electronic device may transmit at least one data frame to the second electronic device. The first electronic device may transmit the at least one data frame in response to receiving the acknowledgement at the first electronic device. For example, the first electronic device 104 may transmit at least one frame of the data 122 to the second electronic device 106 in response to receiving the acknowledgement 124.

Thus, the method 1800 enables one or more electronic devices of the data link to receive an acknowledgement in response to transmitting an indication of an upcoming data transmission from a first electronic device. The first electronic device may be able to prevent data transmissions when the one or more electronic devices are unable to receive the data transmissions based on the acknowledgement.

Figure 19:
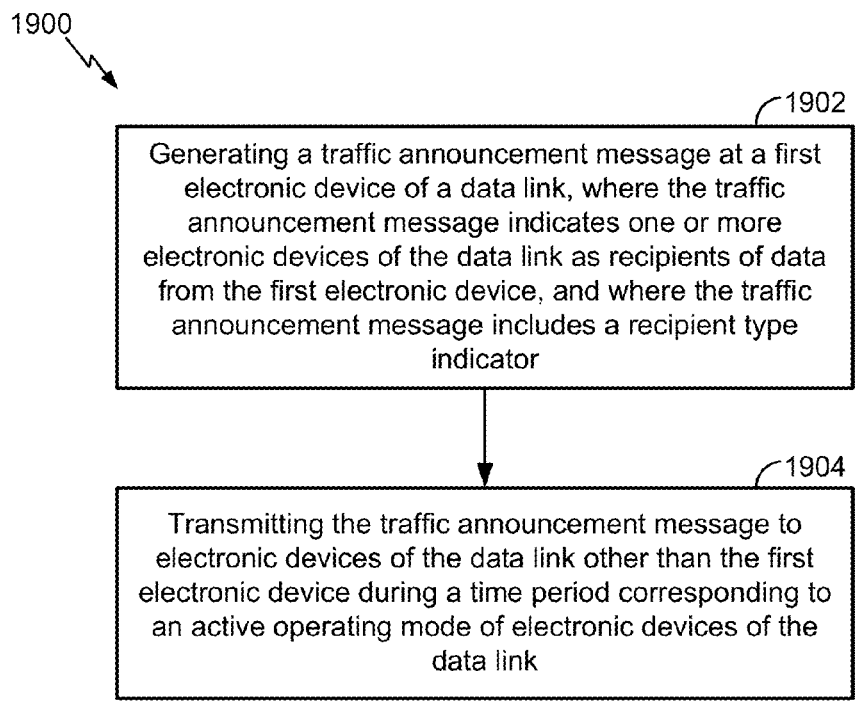
FIG. 19 is a flow diagram of a ninth illustrative method of operation at an electronic device of a data link.

Referring to FIG. 19, a method 1900 of operation at an electronic device of a data link is shown. The method 1900 may be performed at any of the electronic devices 104-112 of FIG. 1 or any of the devices 612 of FIG. 6.

The method 1900 includes generating a traffic announcement message at a first electronic device of a data link, at 1902. The traffic announcement message indicates one or more electronic devices of the data link as recipients of data from the first electronic device and includes a recipient type indicator. For example, with reference to FIG. 1, the first electronic device 104 may generate the traffic announcement message (e.g., the data announcement 120) to indicate the data 122 for transmission to the second electronic device 106. The traffic announcement message may include the recipient type indicator 150 and the address list 152 that indicates one or more electronic devices as recipients of the data 122.

The method 1900 further includes transmitting the first traffic announcement message to electronic devices of the data link other than the first electronic device during a first time period corresponding to an active operating mode of electronic devices of the data link, at 1904. For example, with reference to FIG. 1, the first electronic device 104 may transmit the data announcement 120 to the second electronic device 106. In a particular implementation, the particular wireless network traffic announcement message is transmitted via a particular wireless network that is reserved for data transmissions of the electronic devices of the data link and the time period corresponds to a paging window. For example, the traffic announcement message may be transmitted via the data link channel 204 and the time period may include or correspond to the first paging window 224 of FIGS. 2-5. In another particular implementation, the particular wireless network traffic announcement message is transmitted via a particular wireless network that is reserved for discovery operations and synchronization operations within a NAN and the time period corresponds to a paging window. For example, the traffic announcement message may be transmitted via the NAN channel 202 and the time period may include or correspond to the first NAN paging window 220 of FIGS. 2-5.

In a particular implementation, the recipient type indicator indicates whether an address set of the one or more electronic devices is represented by a TIM or by a Bloom filter. The address set may be represented by the TIM if the recipient type indicator has a first value, and the traffic announcement message may identify the TIM. For example, with reference to FIG. 1, the value of the recipient type indicator 150 may indicate that the address list 152 is represented by a TIM, and the TIM (e.g., the address list 152) may be identified by the traffic announcement message. The address set may be represented by the Bloom filter if the recipient type indicator has a second value, and the traffic announcement message may identify the Bloom filter. For example, with reference to FIG. 1, the value of the recipient type indicator 150 may indicate that the address list 152 is represented by a Bloom filter, and the address list 152 may be identified by the traffic announcement message. The traffic announcement message may indicate a size of the Bloom filter and a Bloom filter index that indicates a set of hash functions corresponding to the Bloom filter. For example, the data announcement 120 may include a size of the Bloom filter (e.g., the address list 152) and a Bloom filter index, as shown in Table 2. The Bloom filter may be determined based on the set of hash functions and based on one or more MAC addresses corresponding to the one or more electronic devices. For example, the first electronic device 104 may determine the Bloom filter by passing a MAC address of the second electronic device 106 (e.g., a recipient of the data 122) through the set of hash functions indicated by the Bloom filter index to generate a set of bit positions and by setting bits in the Bloom filter corresponding to the set of bit positions to a particular value (e.g., a logical one value), as described with reference to FIG. 1.

In the implementation where the address list 152 is represented by the Bloom filter, the method 1900 may further include receiving a first acknowledgement from a second electronic device of the data link responsive to the traffic announcement message and transmitting a portion of the data to the second electronic device based on determining that the second electronic device is correctly identified as a recipient of the data. For example, with reference to FIG. 1, the first electronic device 104 may receive the acknowledgement 124 from the second electronic device 106 and may transmit the data 122 (or a portion thereof) to the second electronic device 106 based on determining that the second electronic device 106 is correctly identified as a recipient of the data 122. The method 1900 may further include receiving a second acknowledgement from a third electronic device of the data link responsive to the traffic announcement message and transmitting a NACK to the third electronic device based on determining that the third electronic device is not a recipient of the data. For example, with reference to FIG. 1, the first electronic device 104 may receive the acknowledgement 144 from the fifth electronic device 112 and may transmit the NACK 154 to the fifth electronic device 112 based on determining that the fifth electronic device 112 is to receive the data 122.

The method 1900 enables a traffic announcement message to be transmitted via a NAN channel (e.g., the NAN channel 202) or a data link channel (e.g., the data link channel 204). The traffic announcement message may indicate recipients of data using a TIM or a Bloom filter. Indicating recipients using the Bloom filter may reduce overhead used to transmit the traffic announcement message, as compared to using the TIM.

Figure 20:
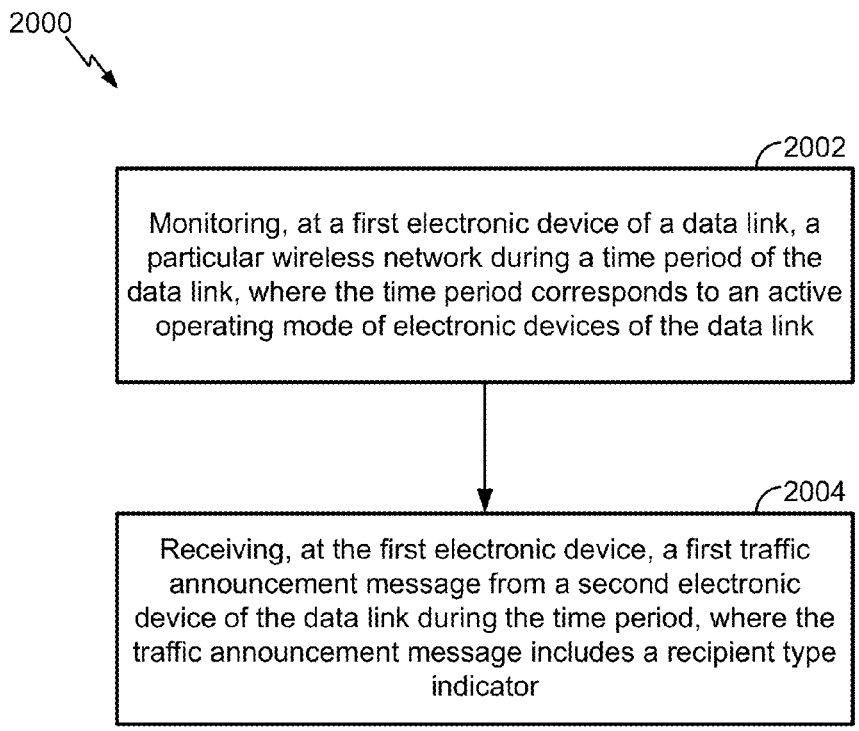
FIG. 20 is a flow diagram of a tenth illustrative method of operation at an electronic device of a data link.

Referring to FIG. 20, a method 2000 of operation at an electronic device of a data link is shown. The method 2000 may be performed at any of the electronic devices 104-112 of FIG. 1 or any of the devices 612 of FIG. 6.

The method 2000 includes monitoring, at a first electronic device of a data link, a particular wireless network during a time period corresponding to an active operating mode of electronic devices of the data link, at 2002. In a particular implementation, the second electronic device 106 monitors the data link channel 204 during the first paging window 224. In other implementations, the second electronic device 106 monitors the NAN channel 202 during the first NAN paging window 220 or during the first discovery window 210. The traffic announcement message may include the recipient type indicator 150 and the address list 152 that indicates one or more electronic devices as recipients of the data 122.

The method 2000 further includes receiving, at the first electronic device, a traffic announcement message from a second electronic device of the data link during the time period, at 2004. The traffic announcement message includes a recipient type indicator. For example, with reference to FIG. 1, the second electronic device 106 may receive the traffic announcement message (e.g., the data announcement 120) from the first electronic device 104, and the traffic announcement may include the recipient type indicator 150 and the address list 152.

The recipient type indicator 150 may indicate whether the address list 152 is represented by a TIM or by a Bloom filter. The method 2000 may further include determining whether the first electronic device is indicated as a recipient of data from the second electronic device based on a TIM if the recipient type indicator has a first value, and the TIM may be identified by the traffic announcement message. For example, with reference to FIG. 1, if the value of the recipient type indicator 150 has a first value (e.g., a logical zero value), the address list 152 may be represented by the TIM, and the second electronic device 106 may determine whether it is a recipient of the data 122 based on the TIM.

The method 2000 may further include determining whether the first electronic device is indicated as a recipient of data from the second electronic device based on a Bloom filter if the recipient type indicator has a second value, and the Bloom filter may be identified by the traffic announcement message. For example, with reference to FIG. 1, if the value of the recipient type indicator 150 has a second value (e.g., a logical one value), the address list 152 may be represented by the Bloom filter, and the second electronic device 106 may determine whether it is a recipient of the data 122 based on the Bloom filter. Determining whether the first electronic device is indicated as a recipient may include determining a set of bit positions in the Bloom filter based on a set of hash functions corresponding to the Bloom filter and based on a MAC address of the first electronic device and determining whether a bit located at each bit position of the set of bit positions in the Bloom filter is a particular value. For example, the second electronic device 106 may determine a set of bit positions by passing a MAC address of the second electronic device 106 through the set of hash functions indicated by the Bloom filter index and may determine whether a bit located at each bit position of the set of bit positions is a particular value (e.g., a logical one value), as described with reference to FIG. 1.

Additionally or alternatively, the method 2000 may further include transmitting an acknowledgement to the second electronic device in response to determining that the first electronic device is indicated as a recipient of the data. For example, the second electronic device 106 may transmit the acknowledgement 124 to the first electronic device 104. The acknowledgement may be a power save poll (PS-POLL) message or a quality of service null (QoS_NULL) frame, as described with reference to FIG. 1. The method 1900 may further include maintaining the first electronic device in an active operating mode in response to determining that the first electronic device is indicated as a recipient of the data. For example, with reference to FIG. 1, the second electronic device 106 may remain in the active operating mode in response to determining that the second electronic device 106 is indicated as a recipient of the data 122, and the second electronic device 106 may receive the data 122 (or a portion thereof) from the first electronic device 104. Alternatively, the method 2000 may further include maintaining the first electronic device in an active operating mode in response to determining that the first electronic device is indicated as a recipient of the data, receiving a NACK from the second electronic device, and transitioning the first electronic device from the active operating mode to a low-power operating mode in response to receiving the NACK. For example, with reference to FIG. 1, the fifth electronic device 112 may remain in the active operating mode until the NACK 154 is received from the first electronic device 104, and the fifth electronic device 112 may transition into the low-power operating mode in response to receiving the NACK 154.

The method 2000 enables an electronic device to receive a traffic announcement message that indicates recipients of data using a TIM or a Bloom filter. Indicating recipients using the Bloom filter may reduce overhead used to receive the traffic announcement message, as compared to using the TIM.

Figure 21:
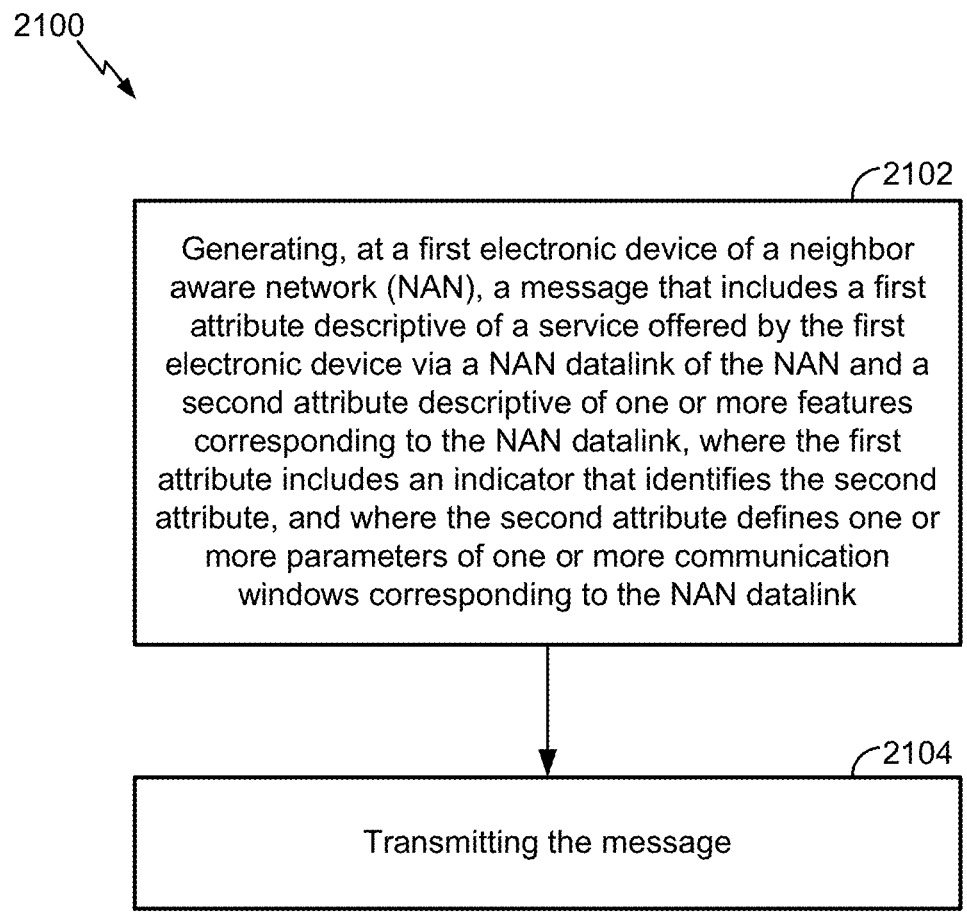
FIG. 21 is a flow diagram of an eleventh method of operation at an electronic device of a data link.

Referring to FIG. 21, a method 2100 of operation at an electronic device of a data link is shown. The method 2100 may be performed at any of the electronic devices 104-116 of FIG. 1 (e.g., the method 2100 may correspond to a multi-hop data link) or any of the devices 612 of FIG. 6.

The method 2100 includes generating, at a first electronic device of a neighbor aware network (NAN), a message that includes a first attribute descriptive of a service offered by the first electronic device via a NAN data link of the NAN and a second attribute descriptive of one or more features corresponding to the NAN data link, at 2102. The first attribute may include an indicator that identifies the second attribute and the second attribute may define one or more parameters of one or more communication windows corresponding to the NAN data link. For example, with reference to FIG. 1, the first electronic device 104 may generate the data announcement 120 (e.g., a SDF) that includes the one or more service attributes 170 and the one or more NAN-DL attributes 180. The one or more communication windows may include paging windows, transmission windows, or both. In a particular implementation, the indicator may include a bitmap. For example, the indicator may include the binding bitmap included in the binding bitmap field 814 of the service attribute 810 of FIG. 8.

The method 2100 further includes transmitting the message, at 2104. In a particular implementation, the message may be transmitted to other devices of the NAN. For example, with reference to FIG. 1, the first electronic device 104 may transmit the data announcement 120 to the electronic devices 106-112.

In a particular implementation, the one or more features may include a NAN data link channel corresponding to the NAN data link, a group identifier corresponding to the NAN data link, the one or more communication windows corresponding to the NAN data link, or a combination thereof. For example, the second service attribute 904 may include a NAN-DL channel field 822, the NAN-DL control field 823, and the NAN-DL group ID field 824. In another particular implementation, the first attribute may include a service identifier that identifies the service and a first instance identifier that identifies a first instance of the service. For example, the first service attribute 902 may include the service ID field 812 that identifies the service and the instance ID field 813 that identifies the first instance. Additionally, the message may further include a third attribute descriptive of the service. The third attribute may include the service identifier and a second instance identifier that identifies a second instance of the service. For example, with reference to FIG. 9, the second service attribute 904 may include the service ID field 812 that identifies the service and the instance ID field 813 that identifies the second instance. Additionally, the third attribute includes a second indicator that identifies the second attribute. For example, the second service attribute 904 may include the binding bitmap field 814 that indicates the NAN-DL attribute 906.

In another particular implementation, the second attribute indicates a paging window repetition rate corresponding to the NAN data link. For example, the second attribute may include the NAN-DL control field 823 that includes the paging window repetition indicator 1017. Additionally, the paging window repetition rate may include a number NUM_PW, and paging windows may be defined for one transmission window of each NUM_PW transmission windows between consecutive discovery windows. For example, with reference to FIG. 10, the paging window repetition indicator 1017 may indicate NUM_PW, and paging windows may be defined for one of each NUM_PW transmission windows, as described with reference to the first example 1020 and the second example 1022. Additionally or alternatively, a first transmission window and a second transmission window may correspond to the NAN data link. The first transmission window may include a first paging window and the second transmission window may not include a paging window. For example, with reference to FIG. 10, the first transmission window in the second example 1022 includes a paging window and the second transmission window does not include a paging window.

In a particular implementation, the NAN data link includes at least the first electronic device. The method 2100 may further include remaining in a low power operating mode at the first electronic device during the second transmission window if the first electronic device does not participate in a traffic session during the first transmission window. For example, the first electronic device 104 may be included in the NAN data link, and the first transmission window and the second transmission window of the second example 1022 of FIG. 10 may correspond to the NAN data link. The first electronic device 104 may remain in the low power operating mode during the second transmission window if the first electronic device 104 does not participate in a traffic session (e.g., does not transmit or receive data) during the first transmission window (and thus the first electronic device 104 transitioned into the low power operating mode during the data portion of the first transmission window). In another particular implementation, the method 2100 may include remaining in an active operating mode at the first electronic device during the second transmission window if the first electronic device participates in a traffic session during the first transmission window. For example, with reference to the second example 1022 of FIG. 10, the first electronic device 104 may remain in the active operating mode during the second transmission window if the first electronic device 104 participates in a traffic session (e.g., transmits or receives data) during the first transmission window.

In another particular implementation, the message may further include a third attribute descriptive of the service and a fourth attribute descriptive of one or more features corresponding to a second NAN data link of the NAN. The third attribute may include a second indicator that identifies the fourth attribute, and the fourth attribute may define one or more parameters of one or more communication windows corresponding to the second NAN data link. For example, with reference to FIG. 9, the message may include the second service attribute 912 and the second NAN-DL attribute 916. Additionally, the first attribute may include a service identifier that identifies the service and a first instance identifier that identifies a first instance of the service, and the second attribute may include the service identifier and a second instance identifier that identifies a second instance of the service. For example, with reference to FIG. 9, the first service attribute 910 may identify the service and the first instance (e.g., chess), and the second service attribute 912 may identify the service and the second instance (e.g., checkers). Additionally, the second attribute may indicate a first paging window repetition rate corresponding to the first NAN data link, and the fourth attribute may indicate a second paging window repetition rate (different from the first paging window repetition rate) corresponding to the second NAN data link. For example, with reference to FIG. 9, the first NAN-DL attribute 914 and the second NAN-DL attribute 916 may define different paging window repetition rates using corresponding paging window repetition indicators 1017.

In another particular implementation, the second attribute defines a discovery window offset, a transmission window offset, a transmission window size, a paging window size, a transmission window repetition indicator, a network heartbeat, or combination thereof. For example, the second attribute may include the discovery window offset indicator 1011, the DL transmission window offset indicator 1012, the DL transmission window size indicator 1013, the paging window size indicator 1014, the DL transmission window repeat indicator 1015, the data link heartbeat indicator 1016, and the paging window repetition indicator 1017 of FIG. 10. Additionally or alternatively, a group of bits of a control field of the second attribute may define the parameters. For example, with reference to FIG. 10, the NAN-DL control field 823 may include the indicators 1011-1017. In another particular implementation, the message is included in a NAN service discovery message. For example, the message may be included in the data announcement 120 of FIG. 1. As another example, the message may be included in the NAN information element 720 or the NAN public action frame 730 of FIG. 7. Alternatively, the message is included in a NAN beacon message. For example, the message may correspond to a NAN beacon message that includes the NAN information element 720 of FIG. 7 that includes one or more service attributes and one or more NAN-DL attributes.

The method 2100 enables an electronic device to generate advertisements that identify services offered via a NAN-DL and describe how the services may be accessed by other electronic devices via the NAN-DL. Additionally, one or more parameters of one or more communication windows corresponding to the NAN-DL may be defined by the advertisements.

Figure 22:
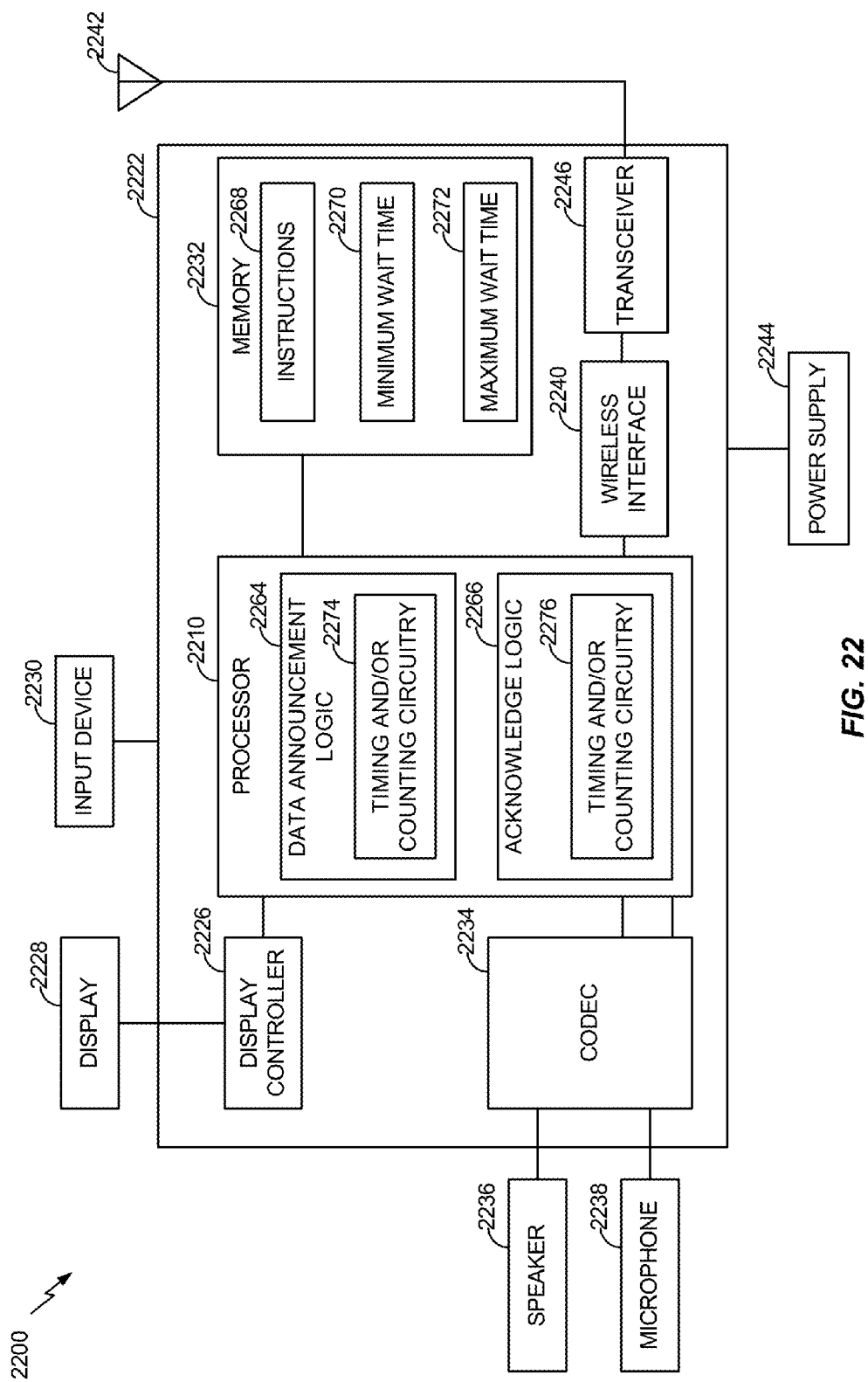
FIG. 22 is a diagram of a wireless device that is operable to support various aspects of one or more methods, systems, apparatuses, and/or computer-readable media disclosed herein.

Referring to FIG. 22, a particular illustrative wireless communication device is depicted and generally designated 2200. The device 2200 includes a processor 2210, such as a digital signal processor, coupled to a memory 2232. In an illustrative implementation, the device 2200, or components thereof, may correspond to the electronic devices 104-116 of FIG. 1, the devices 612 of FIG. 6, or components thereof.

The processor 2210 may be configured to execute software (e.g., a program of one or more instructions 2268) stored in the memory 2232 (e.g., a non-transitory computer readable medium). Additionally or alternatively, the processor 2210 may be configured to implement one or more instructions stored in a memory of a wireless interface 2240 (e.g., an Institute of Electrical and Electronics Engineers (IEEE) 802.11 compliant interface). For example, the wireless interface 2240 may be configured to operate in accordance with one or more wireless communication standards, including one or more IEEE 802.11 standards and one or more NAN standards. In a particular implementation, the processor 2210 may be configured to operate in accordance with one or more of the methods of FIGS. 11-21. The processor 2210 may include data announcement logic 2264 and acknowledge logic 2266. The data announcement logic 2264 and/or the acknowledge logic 2266 may execute one or more of the methods of FIGS. 11-21. In particular implementations, the data announcement logic 2264 may include timing and/or counting circuitry 2274 and the acknowledge logic 2266 may include timing and/or counting circuitry 2276. The timing and/or counting circuitry 2274 and the timing and/or counting circuitry 2276 may be used in determining starting times of paging windows or transmission windows, as described with reference to FIG. 1. In some implementations, the memory 2232 may store a minimum wait time 2270 and a maximum wait time 2272 that correspond to the minimum wait time and the maximum wait time, respectively, as described with reference to FIG. 1.

The wireless interface 2240 may be coupled to the processor 2210 and to an antenna 2242. For example, the wireless interface 2240 may be coupled to the antenna 2242 via a transceiver 2246, such that wireless data received via the antenna 2242 and may be provided to the processor 2210.

A coder/decoder (CODEC) 2234 can also be coupled to the processor 2210. A speaker 2236 and a microphone 2238 can be coupled to the CODEC 2234. A display controller 2226 can be coupled to the processor 2210 and to a display device 2228. In a particular implementation, the processor 2210, the display controller 2226, the memory 2232, the CODEC 2234, and the wireless interface 2240 are included in a system-in-package or system-on-chip device 2222. In a particular implementation, an input device 2230 and a power supply 2244 are coupled to the system-on-chip device 2222. Moreover, in a particular implementation, as illustrated in FIG. 22, the display device 2228, the input device 2230, the speaker 2236, the microphone 2238, the antenna 2242, and the power supply 2244 are external to the system-on-chip device 2222. However, each of the display device 2228, the input device 2230, the speaker 2236, the microphone 2238, the antenna 2242, and the power supply 2244 can be coupled to one or more components of the system-on-chip device 2222, such as one or more interfaces or controllers.

In conjunction with the described implementations, a first apparatus includes means for generating a traffic announcement message at a first electronic device of a data link. The traffic announcement message may indicate data is to be transmitted from the first electronic device to a second electronic device of the data link. For example, the means for generating may include the first electronic device 104, the data announcement logic 130 of FIG. 1, one of the devices 612 of FIG. 6, the processor 2210 programmed to execute the instructions 2268, the data announcement logic 2264 of FIG. 22, one or more other devices, circuits, modules, or instructions to generate the traffic announcement message, or any combination thereof.

The first apparatus also includes means for transmitting the traffic announcement message to one or more electronic devices of the data link during a first paging window. For example, the means for transmitting may include the first electronic device 104, the data announcement logic 130 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to transmit the traffic announcement message, or any combination thereof.

In conjunction with the described implementations, a second apparatus includes means for monitoring, at a first electronic device of a data link, a wireless network during a paging window corresponding to an active operating mode of electronic devices of the data link. For example, the means for monitoring may include the second electronic device 106, the data announcement logic 132 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to monitor the wireless network, or any combination thereof.

The second apparatus also includes means for receiving, at the first electronic device, a traffic announcement message from a second electronic device of the data link during the paging window. For example, the means for receiving may include the second electronic device 106, the data announcement logic 132 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to receive the traffic announcement message, or any combination thereof.

In conjunction with the described implementations, a third apparatus includes means for generating a service discovery frame at a first electronic device of a data link of a neighbor aware network (NAN). The service discovery frame may include an attribute identifying a subset of electronic devices of the data link as recipients of data from the first electronic device during a transmission window or identifying a time period corresponding to data announcements and timing information of data transmissions corresponding to the data link. For example, the means for generating may include the first electronic device 104, the data announcement logic 130 of FIG. 1, one of the devices 612 of FIG. 6, the processor 2210 programmed to execute the instructions 2268, the data announcement logic 2264 of FIG. 22, one or more other devices, circuits, modules, or instructions generate the service discovery frame, or any combination thereof.

The third apparatus also includes means for transmitting the service discovery frame to electronic devices other than the first electronic device. For example, the means for transmitting may include the first electronic device 104, the data announcement logic 130 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to transmit the service discovery frame, or any combination thereof.

In conjunction with the described implementations, a fourth apparatus includes means for receiving a service discovery frame at a first electronic device of a data link of a neighbor aware network (NAN). The service discovery frame may include an attribute identifying a subset of electronic devices of the data link as recipients of data from a second electronic device of the data link during a transmission window or identifying a time period of data announcements and timing information of data transmissions corresponding to the data link. For example, the means for receiving may include the second electronic device 106, the data announcement logic 132 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to receive the service discovery frame, or any combination thereof.

The fourth apparatus also includes means for determining whether to monitor a wireless network corresponding to the data link during the transmission window based on the attribute. For example, the means for determining may include the second electronic device 106, the data announcement logic 132 of FIG. 1, one of the devices 612 of FIG. 6, the processor 2210 programmed to execute the instructions 2268, the data announcement logic 2264 of FIG. 22, one or more other devices, circuits, modules, or instructions to determine whether to monitor the second wireless network, or any combination thereof.

In conjunction with the described implementations, a fifth apparatus includes means for generating a service discovery frame at a first electronic device of a data link of a neighbor aware network (NAN). The service discovery frame may include a data link attribute that corresponds to the data link. A data link control field of the data link attribute may identify and/or indicate a time period corresponding to data announcements and timing information of data transmissions corresponding to the data link. For example, the means for generating may include the first electronic device 104, the data announcement logic 130 of FIG. 1, one of the devices 612 of FIG. 6, the processor 2210 programmed to execute the instructions 2268, the data announcement logic 2264 of FIG. 22, one or more other devices, circuits, modules, or instructions to generate the service discovery frame, or any combination thereof.

The fifth apparatus also includes means for transmitting the service discovery frame to one or more electronic devices of the data link during a discovery window. For example, the means for transmitting may include the first electronic device 104, the data announcement logic 130 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to transmit the service discovery frame, or any combination thereof.

In conjunction with the described implementations, a sixth apparatus includes means for receiving a service discovery frame at a first electronic device of a data link of a neighbor aware network (NAN). The service discovery frame includes a data link attribute that may correspond to the data link. A data link control field of the data link attribute may identify and/or indicate a time period corresponding to data announcements and timing information of data transmissions corresponding to the data link. For example, the means for receiving may include the second electronic device 106, the data announcement logic 132 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to receive the service discovery frame, or any combination thereof.

The sixth apparatus also includes means for monitoring a wireless network corresponding to the data link for at least one data frame from a second electronic device during a transmission window. The transmission window may be determined based on the data link attribute. For example, the means for monitoring may include the second electronic device 106, the data announcement logic 132 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to monitor the second wireless network, or any combination thereof.

In conjunction with the described implementations, a seventh apparatus includes means for receiving, at a first electronic device of a data link, an indication of an upcoming data transmission from a second electronic device of the data link. For example, the means for receiving may include the second electronic device 106, the data announcement logic 132 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to receive the indication, or any combination thereof.

The seventh apparatus also includes means for transmitting an acknowledgement from the first electronic device to the second electronic device in response to receiving the indication of the upcoming data transmission. For example, the means for transmitting may include the second electronic device 106, the acknowledge logic 136 of FIG. 1, one of the devices 612 of FIG. 6, the processor 2210 programmed to execute the instructions 2268, the acknowledge logic 2266, the wireless interface 2240 of FIG. 22, one or more other devices, circuits, modules, or instructions to transmit the acknowledgement, or any combination thereof.

In conjunction with the described implementations, an eighth apparatus includes means for transmitting a message from a first electronic device of a data link to one or more electronic devices of the data link. The message may include an indication of an upcoming data transmission from the first electronic device to a second electronic device of the data link. For example, the means for transmitting may include the first electronic device 104, the data announcement logic 130 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to transmit the message, or any combination thereof.

The eighth apparatus also includes means for receiving an acknowledgement from the second electronic device responsive to the indication. For example, the means for receiving may include the first electronic device 104, the acknowledge logic 134 of FIG. 1, one of the devices 612 of FIG. 6, the processor 2210 programmed to execute the instructions 2268, the acknowledge logic 2266, the wireless interface 2240 of FIG. 22, one or more other devices, circuits, modules, or instructions to receive the acknowledgement, or any combination thereof.

In conjunction with the described implementations, a ninth apparatus includes means for generating a traffic announcement message at a first electronic device of a data link. The traffic announcement message may indicate one or more electronic devices of the data link as recipients of data from the first electronic device and may include a recipient type indicator. For example, the means for generating may include the first electronic device 104, the data announcement logic 130 of FIG. 1, one of the devices 612 of FIG. 6, the processor 2210 programmed to execute the instructions 2268, the data announcement logic 2264 of FIG. 22, one or more other devices, circuits, modules, or instructions to generate the traffic announcement message, or any combination thereof. The traffic announcement message may include the recipient type indicator 150 and the address list 152 of FIG. 1.

The ninth apparatus also includes means for transmitting the traffic announcement message to electronic devices of the data link other than the first electronic device during a time period corresponding to an active operating mode of electronic devices of the data link. For example, the means for transmitting may include the first electronic device 104, the data announcement logic 130 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to transmit the traffic announcement message, or any combination thereof.

In conjunction with the described implementations, a tenth apparatus includes means for monitoring, at a first electronic device of a data link, a particular wireless network during a time period corresponding to an active operating mode of electronic devices of the data link. For example, the means for monitoring may include the second electronic device 106, the data announcement logic 132, the fifth electronic device 112 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to monitor the wireless network, or any combination thereof.

The tenth apparatus also includes means for receiving, at the first electronic device, a traffic announcement message from a second electronic device of the data link during the time period, where the traffic announcement message includes a recipient type indicator. For example, the means for receiving may include the second electronic device 106, the data announcement logic 132, the fifth electronic device 112 of FIG. 1, one of the devices 612 of FIG. 6, the processor 2210 programmed to execute the instructions 2268, the data announcement logic 2264, the wireless interface 2240 of FIG. 22, one or more other devices, circuits, modules, or instructions to receive the traffic announcement message, or any combination thereof. The traffic announcement message may include the recipient type indicator 150 and the address list 152 of FIG. 1.

In conjunction with the described implementations, an eleventh apparatus includes means for generating, at a first electronic device of a NAN, a message that includes a first attribute descriptive of a service offered by the first electronic device via a NAN data link of the NAN and a second attribute descriptive of one or more features corresponding to the NAN data link. The first attribute may include an indicator that identifies the second attribute, and the second attribute may define one or more parameters of one or more communication windows corresponding to the NAN data link. For example, the means for generating may include the first electronic device 104, the data announcement logic 132, one of the devices 612 of FIG. 6, the processor 2210 programmed to execute the instructions 2268, the data announcement logic 2264, the wireless interface 2240 of FIG. 22, one or more other devices, circuits, modules, or instructions to generate a message that includes a first attribute descriptive of a service offered by a first electronic device via a NAN data link of a NAN and a second attribute descriptive of the NAN data link, or any combination thereof.

The eleventh apparatus also includes means for transmitting the message. For example, the means for transmitting may include the first electronic device 104, the data announcement logic 132, one of the devices 612 of FIG. 6, the processor 2210 programmed to execute the instructions 2268, the data announcement logic 2264, the wireless interface 2240 of FIG. 22, one or more other devices, circuits, modules, or instructions to transmit the message, or any combination thereof. The traffic announcement message may include the recipient type indicator 150 and the address list 152 of FIG. 1.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method of communicating between electronic devices, the method comprising:
   synchronizing a clock at a first electronic device of a data link based on a synchronization operation associated with a first wireless network, the first wireless network associated with service discovery and synchronization within a neighbor aware network (NAN), wherein the NAN includes a first group of electronic devices associated with common discovery windows;
   monitoring, at the first electronic device, a second wireless network during a first paging window determined based on the synchronized clock, the second wireless network associated with data sharing by at least one service corresponding to the data link, wherein the data link includes a second group of electronic devices associated with common paging windows, and wherein the first group of electronic devices includes the second group of electronic devices; and
   receiving, via the second wireless network at the first electronic device, a traffic announcement message from a second electronic device of the data link during the first paging window, wherein a first portion of a first transmission window includes the first paging window, and wherein the traffic announcement message indicates that one or more electronic devices of the data link are scheduled to receive data via the second wireless network during a second portion of the first transmission window.

2. The method of claim 1, wherein the traffic announcement message includes a broadcast message.

3. The method of claim 1, further comprising determining, at the first electronic device, whether the traffic announcement message identifies the first electronic device as being included in the one or more electronic devices that are scheduled to receive the data.

4. The method of claim 3, further comprising:
   maintaining the first electronic device in an active operating mode during the second portion of the first transmission window in response to determining the traffic announcement message identifies the first electronic device as being included in the one or more electronic devices; and
   receiving, at the first electronic device, at least a portion of the data from the second electronic device during the second portion of the first transmission window.

5. The method of claim 3, further comprising:
   transitioning the first electronic device from an active operating mode to a low-power operating mode during the second portion of the first transmission window in response to determining the traffic announcement message does not identify the first electronic device as being included in the one or more electronic devices; and transitioning the first electronic device from the low-power operating mode to the active operating mode at a second start time of a second paging window.

6. The method of claim 3, further comprising, if the traffic announcement message identifies the first electronic device as as being included in the one or more electronic devices, receiving at least a portion of the data from the second electronic device at the first electronic device via the second wireless network.

7. The method of claim 3, further comprising determining whether a value of a particular bit of a traffic indication map identifies the first electronic device as being included in the one or more electronic devices, the particular bit corresponding to the first electronic device.

8. The method of claim 7, wherein a location of the particular bit in the traffic indication map is determined based on an association identification assigned by the second electronic device during an association process between the first electronic device and the second electronic device.

9. The method of claim 7, further comprising determining a particular data link via which to receive the data based on an association identification space corresponding to the particular bit.

10. The method of claim 1, further comprising transmitting an acknowledgement from the first electronic device to the second electronic device in response to receiving the traffic announcement message, wherein the acknowledgement serves as a power save poll (PS-POLL) message.

11. The method of claim 10, wherein the acknowledgement is transmitted during an acknowledgement window, wherein a third portion of the first transmission window includes the acknowledgement window, and wherein the acknowledgement window occurs subsequent to the first paging window and prior to the second portion of the first transmission window.

12. The method of claim 10, further comprising:
determining a duration of a first time period that the second wireless network is idle, the first time period occurring subsequent to transmitting the acknowledgement; and
transitioning the first electronic device from an active operating mode to a low-power operating mode in response to determining the duration of the first time period exceeds a first threshold value.

13. The method of claim 10, further comprising:
determining a duration of a second time period that the second wireless network is busy, the second time period occurring subsequent to transmitting the acknowledgement; and
transitioning the first electronic device from an active operating mode to a low-power operating mode in response to determining the duration of the second time period exceeds a second threshold value.

14. The method of claim 10, further comprising:
after transmitting the acknowledgement, receiving at least one data frame at the first electronic device from the second electronic device; and
after expiration of a threshold time period, transitioning the first electronic device from an active operating mode to a low-power operating mode in response to determining the second wireless network is idle.

15. The method of claim 10, further comprising:
after transmitting the acknowledgement, receiving at least one data frame at the first electronic device from the second electronic device; and
maintaining the first electronic device in an active operating mode in response to determining one or more bits included in the at least one data frame indicates an additional upcoming data transmission.

16. The method of claim 1, further comprising transmitting a quality of service null (QoS_NULL) frame from the first electronic device to the second electronic device in response to receiving the traffic announcement message.

17. The method of claim 16, wherein the QoS_NULL frame includes a reverse direction grant (RDG) authorizing the second electronic device to transmit a response to the first electronic device within a short interframe space (SIFS) period.

18. The method of claim 17, further comprising:
receiving a data frame from the second electronic device responsive to the QoS_NULL frame; and
maintaining the first electronic device in an active operating mode in response to determining one or more bits included in the data frame indicates an additional upcoming data transmission.

19. The method of claim 1, wherein the traffic announcement message identifies the second electronic device as a sender, identifies the first electronic device as being included in the one or more electronic devices, and identifies the second wireless network as a delivery path for first data.

20. The method of claim 1, further comprising determining whether the first electronic device is included in the one or more electronic devices based on a traffic indication map indicated by the traffic announcement message, wherein a recipient type indicator included in the traffic announcement message has a first value.

21. The method of claim 1, further comprising determining whether the first electronic device is included in the one or more electronic devices based on a Bloom filter indicated by the traffic announcement message, wherein a recipient type indicator included in the traffic announcement message has a second value.

22. The method of claim 21, wherein determining whether the first electronic device is included in the one or more electronic devices comprises:
determining a set of bit positions in the Bloom filter based on a set of hash functions corresponding to the Bloom filter and based on a media access control (MAC) address of the first electronic device; and
determining whether a bit located at each bit position of the set of bit positions in the Bloom filter has a particular value.

23. The method of claim 21, further comprising:
transmitting an acknowledgement to the second electronic device in response to determining the first electronic device is included in the one or more electronic devices;
maintaining the first electronic device in an active operating mode during the second portion of the first transmission window; and
receiving at least a portion of the data from the second electronic device.

24. The method of claim 21, further comprising:
transmitting an acknowledgement to the second electronic device in response to determining the first electronic device is included in the one or more electronic devices;

maintaining the first electronic device in an active operating mode at a start time of the second portion of the first transmission window;
receiving a negative-acknowledgement (NACK) from the second electronic device; and
transitioning the first electronic device from the active operating mode to a low-power operating mode for a remainder of the second portion of the first transmission window in response to receiving the NACK.

25. The method of claim 1, wherein the synchronization operation comprises receiving a synchronization beacon from an electronic device of the NAN via the first wireless network, and wherein the clock is synchronized based on the synchronization beacon.

26. The method of claim 1, further comprising, prior to synchronizing the clock, performing one or more association operations at the first electronic device with respect to an electronic device of the NAN to cause the first electronic device to join the NAN.

27. The method of claim 1, wherein the first wireless network comprises a first wireless channel corresponding to the NAN, and wherein the second wireless network comprises a second wireless channel corresponding to the data link.

28. An apparatus comprising:
a processor; and
a memory coupled to the processor, wherein the memory stores instructions executable by the processor to perform operations comprising:
synchronizing a clock at a first electronic device of a data link based on a synchronization operation associated with a first wireless network, the first wireless network associated with service discovery and synchronization within a neighbor aware network (NAN), wherein the NAN includes a first group of electronic devices associated with common discovery windows;
monitoring, at the first electronic device, a second wireless network during a first paging window determined based on the synchronized clock, the second wireless network associated with data sharing by at least one service corresponding to the data link, wherein the data link includes a second group of electronic devices associated with common paging windows, and wherein the first group of electronic devices includes the second group of electronic devices; and
receiving, via the second wireless network at the first electronic device, a traffic announcement message from a second electronic device of the data link during the first paging window, wherein a first portion of a first transmission window includes the first paging window, and wherein the traffic announcement message indicates that one or more electronic devices of the data link are scheduled to receive data via the second wireless network during a second portion of the first transmission window.

29. The apparatus of claim 28, wherein the traffic announcement message includes a broadcast message.

30. The apparatus of claim 28, wherein the operations further comprise determining, at the first electronic device, whether the traffic announcement message identifies the first electronic device as a recipient of at least a portion of the data.

31. The apparatus of claim 30, wherein the operations further comprise:

maintaining the first electronic device in an active operating mode during the second portion of the first transmission window in response to determining the traffic announcement message identifies the first electronic device as the recipient; and
receiving, at the first electronic device, the at least a portion of the data from the second electronic device during the second portion of the first transmission window.

32. The apparatus of claim 30, wherein the operations further comprise:
transitioning the first electronic device from an active operating mode to a low-power operating mode during the second portion of the first transmission window in response to determining the traffic announcement message does not identify the first electronic device as the recipient; and
transitioning the first electronic device from the low-power operating mode to the active operating mode at a second start time of a second paging window.

33. The apparatus of claim 30, wherein the operations further comprise receiving the at least a portion of the data from the second electronic device at the first electronic device via the second wireless network.

34. The apparatus of claim 30, wherein the operations further comprise determining whether a value of a particular bit of a traffic indication map identifies the first electronic device as the recipient, the particular bit corresponding to the first electronic device.

35. The apparatus of claim 34, wherein a location of the particular bit in the traffic indication map is determined based on an association identification assigned by the second electronic device during an association process between the first electronic device and the second electronic device.

36. The apparatus of claim 34, wherein the operations further comprise determining a particular data link via which to receive the data based on an association identification space corresponding to the particular bit.

37. The apparatus of claim 28, wherein the operations further comprise transmitting an acknowledgement from the first electronic device to the second electronic device in response to receiving the traffic announcement message, wherein the acknowledgement serves as a power save poll (PS-POLL) message.

38. The apparatus of claim 37, wherein the acknowledgement is transmitted during an acknowledgement window, wherein a third portion of the first transmission window includes the acknowledgement window, and wherein the acknowledgement window occurs subsequent to the first paging window and prior to the second portion of the first transmission window.

39. The apparatus of claim 37, wherein the operations further comprise:
determining a duration of a first time period that the second wireless network is idle, the first time period occurring subsequent to transmitting the acknowledgement; and
transitioning the first electronic device from an active operating mode to a low-power operating mode in response to determining the duration of the first time period exceeds a first threshold value.

40. The apparatus of claim 37, wherein the operations further comprise:
determining a duration of a second time period that the second wireless network is busy, the second time period occurring subsequent to transmitting the acknowledgement; and transitioning the first electronic device from an active operating mode to a low-power operating mode in response to determining the duration of the second time period exceeds a second threshold value.

41. The apparatus of claim 37, wherein the operations further comprise:
    after transmitting the acknowledgement, receiving at least one data frame at the first electronic device from the second electronic device; and
    after expiration of a threshold time period, transitioning the first electronic device from an active operating mode to a low-power operating mode in response to determining the second wireless network is idle.

42. The apparatus of claim 37, wherein the operations further comprise:
    after transmitting the acknowledgement, receiving at least one data frame at the first electronic device from the second electronic device; and
    maintaining the first electronic device in an active operating mode in response to determining one or more bits included in the at least one data frame indicates an additional upcoming data transmission.

43. The apparatus of claim 28, wherein the operations further comprise transmitting a quality of service null (QoS_NULL) frame from the first electronic device to the second electronic device in response to receiving the traffic announcement message.

44. The apparatus of claim 43, wherein the QoS_NULL frame includes a reverse direction grant (RDG) authorizing the second electronic device to transmit a response to the first electronic device within a short interframe space (SIFS) period.

45. The apparatus of claim 44, wherein the operations further comprise:
    receiving a data frame from the second electronic device responsive to the QoS_NULL frame; and
    maintaining the first electronic device in an active operating mode in response to determining one or more bits included in the data frame indicates an additional upcoming data transmission.

46. The apparatus of claim 28, wherein the traffic announcement message identifies the second electronic device as a sender, identifies the first electronic device as being included in the one or more electronic devices, and identifies the second wireless network as a delivery path for first data.

47. The apparatus of claim 28, wherein the operations further comprise determining whether the first electronic device is included in the one or more electronic devices based on a traffic indication map indicated by the traffic announcement message, and wherein a recipient type indicator included in the traffic announcement message has a first value.

48. The apparatus of claim 28, wherein the operations further comprise determining whether the first electronic device is included in the one or electronic devices based on a Bloom filter indicated by the traffic announcement message, and wherein a recipient type indicator included in the traffic announcement message has a second value.

49. The apparatus of claim 48, wherein determining whether the first electronic device is included in the one or more electronic devices comprises:
    determining a set of bit positions in the Bloom filter based on a set of hash functions corresponding to the Bloom filter and based on a media access control (MAC) address of the first electronic device; and
    determining whether a bit located at each bit position of the set of bit positions in the Bloom filter has a particular value.

50. The apparatus of claim 48, wherein the operations further comprise:
    transmitting an acknowledgement to the second electronic device in response to determining the first electronic device is included in the one or more electronic devices;
    maintaining the first electronic device in an active operating mode during the second portion of the first transmission window; and
    receiving a portion of the data from the second electronic device.

51. The apparatus of claim 48, wherein the operations further comprise:
    transmitting an acknowledgement to the second electronic device in response to determining the first electronic device is included in the one or more electronic devices;
    maintaining the first electronic device in an active operating mode at a start time of the second portion of the first transmission window;
    receiving a negative-acknowledgement (NACK) from the second electronic device; and
    transitioning the first electronic device from the active operating mode to a low-power operating mode for a remainder of the second portion of the first transmission window in response to receiving the NACK.

52. The apparatus of claim 28, further comprising:
    a receiver configured to receive the traffic announcement message via the first wireless network; and
    a transmitter configured to transmit an acknowledgement frame to the second electronic device via the second wireless network responsive to receipt of the traffic announcement message at the receiver.

53. An apparatus comprising:
    means for synchronizing a clock at a first electronic device of a data link based on a synchronization operation associated with a first wireless network, the first wireless network associated with service discovery and synchronization within a neighbor aware network (NAN), wherein the NAN includes a first group of electronic devices associated with common discovery windows;
    means for monitoring, at the first electronic device, a second wireless network during a paging window determined based on the synchronized clock, the second wireless network associated with data sharing by at least one service corresponding to the data link, wherein the data link includes a second group of electronic devices associated with common paging windows, and wherein the first group of electronic devices includes the second group of electronic devices; and
    means for receiving, via the second wireless network at the first electronic device, a traffic announcement message from a second electronic device of the data link during the paging window, wherein a first portion of a transmission window includes the paging window, and wherein the traffic announcement message indicates that one or more electronic devices of the data link are scheduled to receive data via the second wireless network during a second portion of the transmission window.

54. The apparatus of claim 53, further comprising means for transmitting an acknowledgement message to the second electronic device via the second wireless network in response to determining the first electronic device is included in the one or more electronic devices.

55. A non-transitory computer readable medium storing instructions that, when executed by a processor, cause the processor to:
   synchronize a clock at a first electronic device of a data link based on a synchronization operation associated with a first wireless network, the first wireless network associated with service discovery and synchronization within a neighbor aware network (NAN), wherein the NAN includes a first group of electronic devices associated with common discovery windows
   monitor, at the first electronic device, a second wireless network during a paging window determined based on the synchronized clock, the second wireless network associated with data sharing by at least one service corresponding to the data link, wherein the data link includes a second group of electronic devices associated with common paging windows, and wherein the first group of electronic devices includes the second group of electronic devices; and
   receive, via the second wireless network at the first electronic device, a traffic announcement message from a second electronic device of the data link during the paging window, wherein a first portion of a transmission window includes the paging window, and wherein the traffic announcement message indicates that one or more electronic devices of the data link are scheduled to receive data via the second wireless network during a second portion of the transmission window.

56. The non-transitory computer readable medium of claim 55, wherein the instructions, when executed by the processor, further cause the processor to receive at least a portion of the data from the second electronic device during the second portion of the transmission window.

* * * * *